United States Patent
Hashimoto

(10) Patent No.: US 11,789,194 B2
(45) Date of Patent: Oct. 17, 2023

(54) LIGHT EMITTING MODULE AND PLANAR LIGHT SOURCE

(71) Applicant: NICHIA CORPORATION, Anan (JP)

(72) Inventor: Toru Hashimoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 30 days.

(21) Appl. No.: 17/488,050

(22) Filed: Sep. 28, 2021

(65) Prior Publication Data

US 2022/0099880 A1  Mar. 31, 2022

(30) Foreign Application Priority Data

Sep. 29, 2020 (JP) .................... 2020-163261
Nov. 26, 2020 (JP) .................... 2020-195694

(Continued)

(51) Int. Cl.
*F21V 8/00* (2006.01)

(52) U.S. Cl.
CPC ......... *G02B 6/0055* (2013.01); *G02B 6/0051* (2013.01); *G02B 6/0068* (2013.01); *G02B 6/0083* (2013.01)

(58) Field of Classification Search
CPC .. G02B 6/0055; G02B 6/1833; G02B 6/0025; G02B 6/0068; G02B 6/0083; G02B 6/0051

See application file for complete search history.

(56) References Cited

U.S. PATENT DOCUMENTS

2018/0335559 A1   11/2018  Cho
2019/0294004 A1*   9/2019  Hashimoto ......... H01L 25/0753
(Continued)

FOREIGN PATENT DOCUMENTS

JP   2009-150940 A    7/2009
JP   2012-209088 A   10/2012
(Continued)

*Primary Examiner* — Andrew J Coughlin
*Assistant Examiner* — Jessica M Apenteng
(74) *Attorney, Agent, or Firm* — Foley & Lardner LLP

(57) ABSTRACT

A light emitting module includes: a light source part including a first light source and a second light source; a light guide member including: a first light guide part having a $1^{st}$ A principal face, a $1^{st}$ B principal face located opposite to the $1^{st}$ A principal face, a first lateral face positioned between the $1^{st}$ A principal face and the $1^{st}$ B principal face, and a first hole in which the first light source is disposed; and a second light guide part having a $2^{nd}$ A principal face, a $2^{nd}$ B principal face located opposite to the $2^{nd}$ A principal face, a second lateral face positioned between the $2^{nd}$ A principal face and the $2^{nd}$ B principal face, the second lateral face facing the first lateral face, and a second hole in which the second light source is disposed.

10 Claims, 45 Drawing Sheets

(30) Foreign Application Priority Data

Dec. 21, 2020 (JP) .................................. 2020-210971
Apr. 14, 2021 (JP) .................................. 2021-068618
Aug. 27, 2021 (JP) .................................. 2021-138477

(56) References Cited

U.S. PATENT DOCUMENTS

2019/0369316 A1  12/2019  Imada et al.
2019/0371985 A1  12/2019  Imada
2020/0049877 A1   2/2020  Watanabe et al.

FOREIGN PATENT DOCUMENTS

| | | |
|---|---|---|
| JP | 2018-101521 A | 6/2018 |
| JP | 2019-530967 A | 10/2019 |
| JP | 2019-212662 A | 12/2019 |
| JP | 2019-212739 A | 12/2019 |
| JP | 2019-215956 A | 12/2019 |
| TW | 202020364 A | 6/2020 |
| WO | WO-2018/116815 A1 | 6/2018 |

* cited by examiner

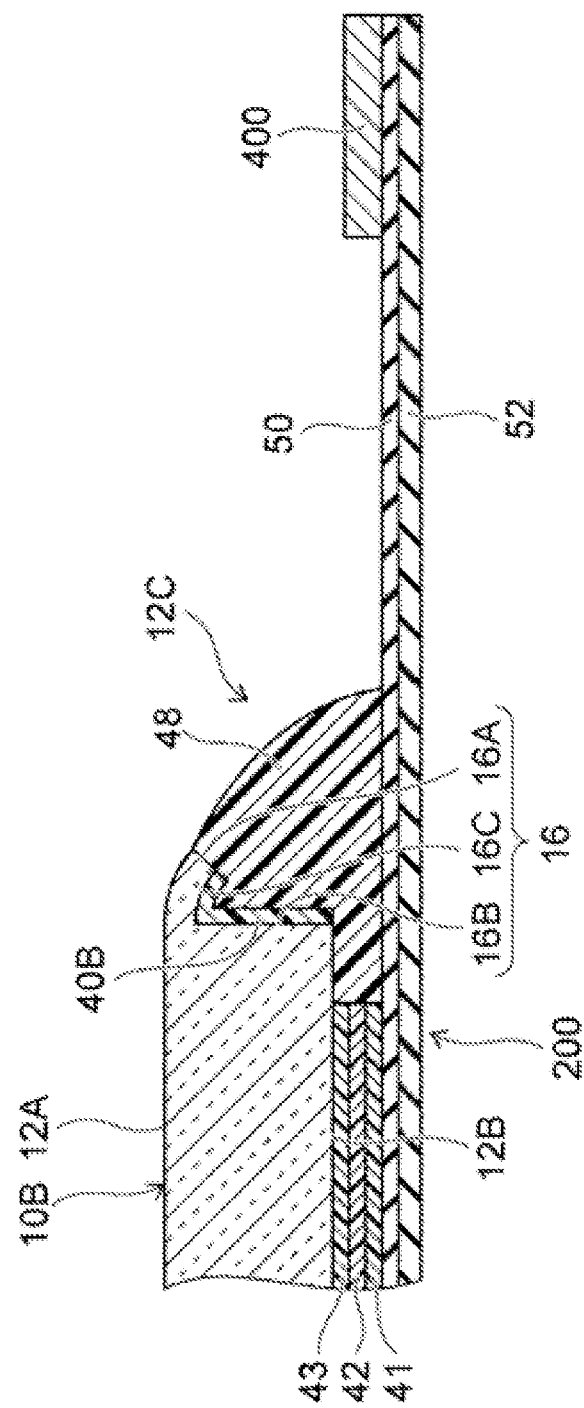

LIGHT EMITTING MODULE AND PLANAR LIGHT SOURCE

CROSS-REFERENCE TO RELATED APPLICATIONS

This application claims priority to Japanese Patent Application No. 2020-163261 filed on Sep. 29, 2020, Japanese Patent Application No. 2020-195694 filed on Nov. 26, 2020, Japanese Patent Application No. 2020-210971 filed on Dec. 21, 2020, Japanese Patent Application No. 2021-068618 filed on Apr. 14, 2021, and Japanese Patent Application No. 2021-138477 filed on Aug. 27, 2021, the disclosures of which are hereby incorporated by reference in their entireties.

BACKGROUND

The present disclosure relates to a light emitting module and a planar light source.

Light emitting modules structured by combining light emitting elements such as light emitting diodes and light guide plates are widely utilized as planar light sources, for example, as backlights for liquid crystal display devices. A planar light source in which the light guide plate is sectioned by sectioning groove into multiple regions which allows for lighting control per region has also been proposed. See, for example, Japanese Patent Publication 2018-101521.

SUMMARY

One of the objects of certain embodiments of the present invention is to provide a light emitting module and a planar light source that can lessen the luminance decline along the boundaries between adjacent light guide parts that are compartmentalized by the groove created in the light guide member.

According to an embodiment of the present invention, a light emitting module includes
a light source part including a first light source and a second light source, a light guide member, and light reflecting members. The light guide member includes a first light guide part and a second light guide part. The first light guide part has a $1^{st}$ A principal face, a $1^{st}$ B principal face located opposite to the $1^{st}$ A principal face, first lateral faces positioned between the $1^{st}$ A principal face and the $1^{st}$ B principal face, and a first hole in which the first light source is disposed. The second light guide part has a $2^{nd}$ A principal face, a $2^{nd}$ B principal face located opposite to the $2^{nd}$ A principal face, second lateral faces positioned between the $2^{nd}$ A principal face and the $2^{nd}$ B principal face, and a second hole in which the second light source is disposed. The second lateral faces respectively face the first lateral faces. The light reflecting member is disposed between the first lateral faces and the second lateral faces. The first lateral faces include a $1^{st}$ A lateral face and a $1^{st}$ B lateral face. The second lateral faces include a $2^{nd}$ A lateral face facing the $1^{st}$ A lateral face, and a $2^{nd}$ B lateral face facing the $1^{st}$ B lateral face. The light reflecting member is disposed on at least one of the $1^{st}$ B lateral face or the $2^{nd}$ B lateral face while exposing the $1^{st}$ A lateral face and the $2^{nd}$ A lateral face. A distance between the $1^{st}$ A lateral face and the $2^{nd}$ A lateral face is smaller than a distance between the $1^{st}$ B lateral face and the $2^{nd}$ B lateral face.

According to an embodiment of the present invention, the luminance decline that can occur along the boundaries between adjacent light guide parts compartmentalized by the sectioning groove formed in the light guide member can be reduced.

BRIEF DESCRIPTION OF THE DRAWINGS

FIG. 29 is a schematic cross-sectional view of an example of a peripheral portion of a planar light source according to an embodiment of the present invention.

DETAILED DESCRIPTION

Figure 1:
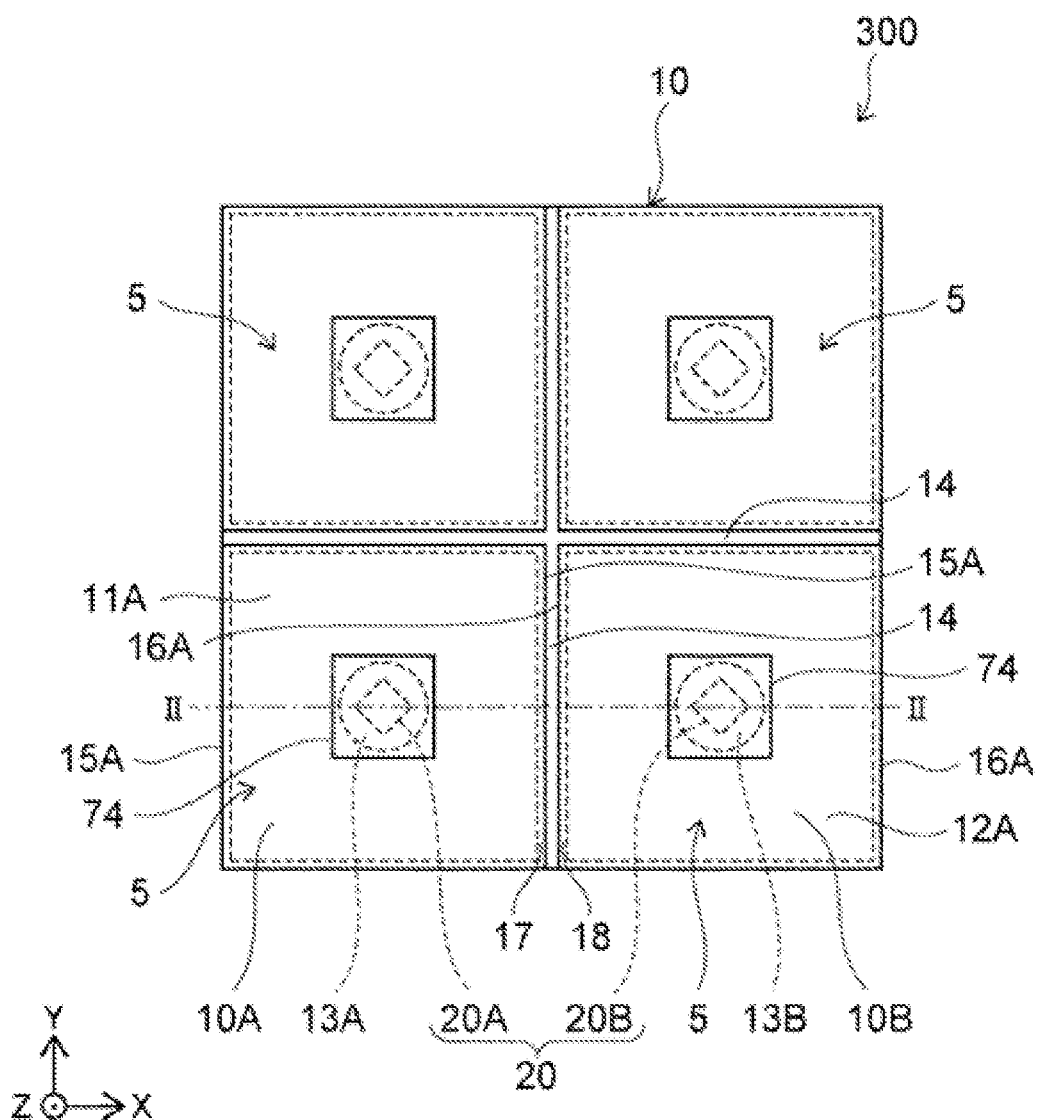
FIG. 1 is a schematic plan view of a planar light source according to a first embodiment of the present invention.

Certain embodiments of the present invention will be explained below with reference to the accompanying drawings. Each drawing shows an embodiment schematically. Thus, the sizes, spacing, and relative positions of the members might be exaggerated, certain members might be omitted, or only a cut end face might be shown as a cross-sectional view. The same constituents in the drawings are denoted by the same reference numerals.

First Embodiment

FIG. 1 is a schematic plan view of a planar light source 300 according to a first embodiment of the present invention. FIG. 1 is a plan view of the light emission face of the planar light source 300. The two directions that are in parallel with the planar face of the planar light source 300 and orthogonal to one another are denoted as the X and Y directions. The direction orthogonal to both the X and Y directions is denoted as the Z direction.

The planar light source 300 includes a light guide member 10 and a light source part 20. The light guide member 10 has light transmissivity with respect to the light emitted by the light source part 20. The light source part 20, as described below, includes at least a light emitting element. The light emitted by the light source part 20 includes at least the light emitted by the light emitting element. When the light source part 20 includes a phosphor, for example, the light emitted by the light source part 20 also includes the light emitted by the phosphor. The transmittance of the light guide member 10 with respect to the light from the light source part 20 is preferably at least 80%, for example, more preferably at least 90%.

The light guide member 10 is compartmentalized into a plurality of light guide parts using sectioning groove 14. The sectioning groove 14 is formed in a lattice pattern in a plan view to compartmentalize the light guide member 10 such that at least one light source part 20 is included in each light guide part. FIG. 1 shows, as an example, a planar light source 300 that includes four light guide parts in two rows by two columns along the X direction and the Y direction. Each light guide part compartmentalized by the sectioning groove 14 can serve as an emission region 5 that is a driving unit for local dimming, for example. The number of the light guide parts (emission regions 5) configuring a planar light source 300 is not limited to that shown in FIG. 1.

Figure 2:
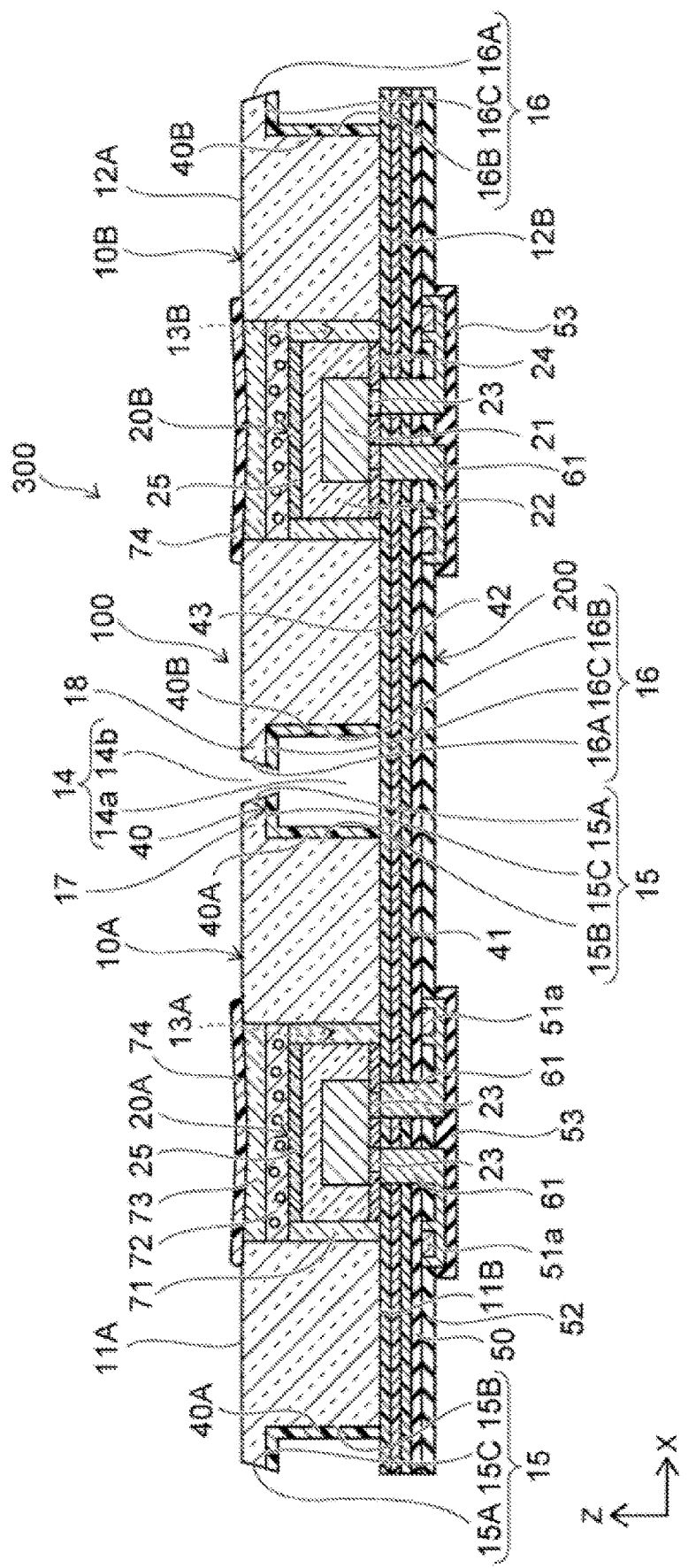
FIG. 2 is a schematic cross-sectional view taken along line II-II in FIG. 1.

FIG. 2 is a schematic cross-sectional view of any two adjacent light guide parts in the planar light source 300, and is a schematic cross-sectional view taken along line II-II in FIG. 1.

One of the two adjacent light guide parts is denoted as a first light guide part 10A, and the other as a second light guide part 10B. The light source part 20 includes a first light source 20A disposed in the first light guide part 10A and a second light source 20B disposed in the second light guide part 10B. The first light guide part 10A and the second light guide part 10B hereinafter might simply be referred to as the light guide parts 10A and 10B, and the first light source 20A and the second light source 20B simply as the light sources 20A and 20B.

As shown in FIG. 2, the planar light source 300 includes a light emitting module 100 and a support member 200. The light emitting module 100 includes at least a first light guide part 10A, a second light guide part 10B, a first light source 20A, and a second light source 20B.

For the material for the light guide parts 10A and 10B, for example, a thermoplastic resin, such as acrylic, polycarbonate, cyclic polyolefin, polyethylene terephthalate, or polyester, a thermosetting resin, such as epoxy or silicone, or glass can be used.

The thickness of the light guide parts 10A and 10B, for example, is preferably in a range of 200 μm to 800 μm. The light guide parts 10A and 10B may be constructed with a single layer in the thickness direction or as a stack structure of multiple layers. In the case in which the light guide parts 10A and 10B have a stack structure, a light transmissive adhesive material may be disposed between layers. A different primary material may be used for each layer in such a stack structure. For the adhesive material, for example, a thermoplastic resin, such as acrylic, polycarbonate, cyclic polyolefin, polyethylene terephthalate, or polyester, or a thermosetting resin, such as epoxy or silicone, can be used.

The first light guide part 10A has a $1^{st}$ A principal face 11A, which is a light emission face of the planar light source 300, and a $1^{st}$ B principal face 11B located opposite to the $1^{st}$ A principal face 11A. The second light guide part 10B has a $2^{nd}$ A principal face 12A, which is a light emission face of the planar light source 300, and a $2^{nd}$ B principal face 12B located opposite to the $2^{nd}$ A principal face 12A. The $1^{st}$ A principal face 11A and the $2^{nd}$ A principal face 12A hereinafter might simply be referred to as the A principal faces 11A and 12A. The $1^{st}$ B principal face 11B and the $2^{nd}$ B principal face 12B hereinafter might simply be referred to as the B principal faces 11B and 12B.

The first light guide part 10A further has a first hole 13A in which a first light source 20A is disposed. The second light guide part 10B further has a second hole 13B in which a second light source 20B is disposed. The first hole 13A is a through hole extending through from the $1^{st}$ A principal face 11A to the $1^{st}$ B principal face 11B. The second hole 13B is a through hole extending through from the $2^{nd}$ A principal face 12A to the $2^{nd}$ B principal face 12B. The first hole 13A and the second hole 13B hereinafter might simply be referred to as the holes 13A and 13B.

As shown in FIG. 1, the holes 13A and 13B in a plan view can have a circular shape, for example. In a plan view, the holes 13A and 13B can have an elliptical shape, or a polygonal shape, such as a triangle, quadrangle, hexagon, or octagon, for example.

As shown in FIG. 2, the first light guide part 10A includes first lateral faces 15 positioned between the $1^{st}$ A principal face 11A and the $1^{st}$ B principal face 11B. The second light guide part 10B includes second lateral faces 16 positioned between the $2^{nd}$ A principal face 12A and the $2^{nd}$ B principal face 12B.

The first lateral faces 15 include a $1^{st}$ A lateral face 15A and a $1^{st}$ B lateral face 15B. The second lateral faces 16 include a $2^{nd}$ A lateral face 16A and a $2^{nd}$ B lateral face 16B. At one side of the second light guide part 10B, the $2^{nd}$ A lateral face faces the $1^{st}$ A lateral face 15A, and the $2^{nd}$ B lateral face faces the $1^{st}$ B lateral face 15B.

The first lateral faces 15 and the second lateral faces 16 define sectioning groove 14. The sectioning groove 14 include a first groove portion 14a defined by the $1^{st}$ B lateral face 15B and the $2^{nd}$ B lateral face 16B, and a second groove portion 14b defined by the $1^{st}$ A lateral face 15A and the $2^{nd}$ A lateral face 16A. In this embodiment, moreover, the first groove portion 14a is further defined in part by a $1^{st}$ C lateral face 15C and a $2^{nd}$ C lateral face 16C. Each first groove portion 14a is in communication with a second groove portion 14b in the thickness direction of the light guide parts 10A and 10B.

More specifically, the $1^{st}$ A lateral faces 15A are continuous with the $1^{st}$ A principal face 11A, and the $1^{st}$ B lateral faces 15B are continuous with the $1^{st}$ B principal face 11B. Each first lateral face 15 further includes a $1^{st}$ C lateral face 15C positioned between the $1^{st}$ A lateral face 15A and the $1^{st}$ B lateral face 15B, providing a stepped part between the $1^{st}$ A lateral face 15A and the $1^{st}$ B lateral face 15B. In other words, the first lateral faces 15 of the first light guide part 10A form a first protruded part 17 including the $1^{st}$ C lateral faces 15C and the $1^{st}$ A lateral faces 15A that are positioned closer than the $1^{st}$ B lateral faces 15B to the second lateral faces 16 of the second light guide part 10B. The first protruded part 17 is located on the $1^{st}$ A principal face 11A side such that the faces located opposite to the $1^{st}$ C lateral faces 15C are coplanar with the $1^{st}$ A principal face 11A. The $1^{st}$ C lateral faces 15C and the faces located opposite to the $1^{st}$ C lateral faces 15C of the first protruded part 17 may be in parallel with or oblique to the $1^{st}$ A principal face 11A.

The $2^{nd}$ A lateral faces 16A are continuous with the $2^{nd}$ A principal face 12A, and the $2^{nd}$ B lateral faces 16B are continuous with the $2^{nd}$ B principal face 12B. Each second lateral face further includes a $2^{nd}$ C lateral face 16C positioned between the $2^{nd}$ A lateral face 16A and the $2^{nd}$ B lateral face 16B 16, providing a stepped part between the $2^{nd}$ A lateral face 16A and the $2^{nd}$ B lateral face 16B 16. In other words, the second lateral faces 16 of the second light guide part 10B form a second protruded part 18 including the $2^{nd}$ C lateral faces 16C and the $2^{nd}$ A lateral faces 16A that are positioned closer than the $2^{nd}$ B lateral faces 16B to the first lateral faces 15 of the first light guide part 10A. The second protruded part 18 is located on the $2^{nd}$ A principal face 12A side such that the faces located opposite to the $2^{nd}$ C lateral faces 16C are coplanar with the $2^{nd}$ A principal face 12A. The $2^{nd}$ C lateral faces 16C and the faces located opposite to the $2^{nd}$ C lateral faces 16C of the second protruded part 18 may be in parallel with or oblique to the $2^{nd}$ A principal face 12A.

Having a structure in which a first protruded part 17 including a face coplanar with the $1^{st}$ A principal face 11A faces a second protruded part 18 including a face coplanar with the $2^{nd}$ A principal face 12A, when the first light guide part 10A and the second light guide part 10B are simultaneously lit, for example, the light propagates between the first protruded part 17 and the second protruded part 18 near the A principal faces 11A and 12A. This can lessen the luminance decline in the vicinity of the sectioning groove 14.

The distance between a $1^{st}$ A lateral face 15A and a $2^{nd}$ A lateral face 16A is smaller than the distance between a $1^{st}$ B lateral face 15B and a $2^{nd}$ B lateral face 16B. The distance here represents the shortest distance between the $1^{st}$ A lateral face 15A and the $2^{nd}$ A lateral face 16A, and between the $1^{st}$ B lateral face 15B and the $2^{nd}$ B lateral face 16B. In other words, the width (smallest width) of a second groove portion 14b is smaller than the width (smallest width) of a first groove portion 14a.

The thickness direction of the first light guide part 10A is along the shortest straight line connecting the $1^{st}$ A principal face 11A and the $1^{st}$ B principal face 11B. In this embodiment, the $1^{st}$ A principal face 11A and the $1^{st}$ B principal face 11B are in parallel with one another, and the direction perpendicular to the $1^{st}$ A principal face 11A and the $1^{st}$ B principal face 11B is the thickness direction of the first light guide part 10A, which is the Z direction. Similarly, the thickness direction of the second light guide part 10B is along the shortest straight line connecting the $2^{nd}$ A principal face 12A and the $2^{nd}$ B principal face 12B. In this embodiment, the $2^{nd}$ A principal face 12A and the $2^{nd}$ B principal face 12B are in parallel with one another, and the direction perpendicular to the $2^{nd}$ A principal face 12A and the $2^{nd}$ B principal face 12B is the thickness direction of the second light guide part 10B, which is the Z direction. The length of a $1^{st}$ B lateral face 15B in the Z direction is larger than the length of a $1^{st}$ A lateral face 15A in the Z direction. The length of a $2^{nd}$ B lateral face 16B in the Z direction is larger than the length of a $2^{nd}$ A lateral face 16A in the Z direction. In other words, the length of the first groove portion 14a in the depth direction of a sectioning groove 14 is larger than the length of the second groove portion 14b in the depth direction of the sectioning groove 14.

The first light source 20A is positioned on the $1^{st}$ B principal face 11B side of the first light guide part 10A. In other words, the distance between the center of the first light source 20A in the thickness direction and the $1^{st}$ B principal face 11B is smaller than the distance between the center of the first light source 20A in the thickness direction and the $1^{st}$ A principal face 11A. The positions of the $1^{st}$ A lateral faces 15A and the second groove portion(s) 14b in the thickness direction of the first light guide part 10A are higher than the upper face of the first light source 20A.

The second light source 20B is positioned on the $2^{nd}$ B principal face 11B side of the second light guide part 10B. In other words, the distance between the center of the second light source 20B in the thickness direction and the $2^{nd}$ B principal face 12B is smaller than the distance between the center of the second light source 20B in the thickness direction and the $2^{nd}$ A principal face 12A. The positions of the $2^{nd}$ A lateral faces 16A in the thickness direction of the second light guide part 10B are higher than the upper face of the second light source 20B.

A light reflecting member 40 is disposed between a first lateral face 15 and a second lateral face 16. The light reflecting member 40 is disposed on at least one of the $1^{st}$ B lateral face 15B or the $2^{nd}$ B lateral face 16B while exposing the $1^{st}$ A lateral face 15A and the $2^{nd}$ A lateral face 16A. In this embodiment, the light reflecting member 40 includes a first light reflecting member 40A disposed on the $1^{st}$ B lateral face 15B and a second light reflecting member 40B disposed on the $2^{nd}$ B lateral face 16B apart from the first light reflecting member 40A. The first light reflecting member 40A covers the $1^{st}$ B lateral face 15B in contact with the $1^{st}$ B lateral face 15B. The second light reflecting member 40B covers the $2^{nd}$ B lateral face 16B in contact with the $2^{nd}$ B lateral face 16B.

No light reflecting member 40 is disposed on the $1^{st}$ A lateral face 15A or the $2^{nd}$ A lateral face 16A. The $1^{st}$ A lateral face 15A and the $2^{nd}$ A lateral face 16A face each other via a second groove portion 14b that has an air layer inside. Accordingly, the $1^{st}$ A lateral face 15A and the $2^{nd}$ A lateral face 16A are in contact with the air. The $1^{st}$ A lateral face 15A and the $2^{nd}$ A lateral face 16A are not covered by and exposed from the light reflecting members 40.

In a first groove portion 14a, there is an air layer between the first light reflecting member 40A disposed on a $1^{st}$ B lateral face 15B and the second light reflecting member 40B disposed on a $2^{nd}$ B lateral face 16B. Accordingly, the light reflecting member 40 (the first light reflecting member 40A and the second light reflecting member 40B) and the air layer are provided between the $1^{st}$ B lateral face 15B and the $2^{nd}$ B lateral face 16B. The light reflecting member 40 is in contact with the air.

The first light reflecting member 40A is also disposed on the $1^{st}$ C lateral face 15C. The first light reflecting member 40A is disposed between the $1^{st}$ B lateral face 15B and the air layer, and between the $1^{st}$ C lateral face 15C and the air layer. The first light reflecting member 40A covers in contact with the $1^{st}$ C lateral face 15C.

The second light reflecting member 40B is also disposed on the $2^{nd}$ C lateral face 16C. The second light reflecting member 40B is disposed between the $2^{nd}$ B lateral face 16B and the air layer, and between the $2^{nd}$ C lateral face 16C and the air layer. The second light reflecting member 40B covers in contact with the $2^{nd}$ C lateral face 16C.

In the example shown in FIG. 2, the light reflecting member 40 is disposed on both the $1^{st}$ B lateral face 15B and the $2^{nd}$ B lateral face 16B. Alternatively, the first light reflecting member 40A can be disposed on the $1^{st}$ B lateral face 15B without disposing a second light reflecting member 40B on the $2^{nd}$ B lateral face 16B. Conversely, the second light reflecting member 40B can be disposed on the $2^{nd}$ B lateral face 16B without disposing a first light reflecting member 40A on the $1^{st}$ B lateral face 15B. Alternatively, the first groove portion 14a may be filled with the light reflecting member 40 to be in contact with both the $1^{st}$ B lateral face 15B and the $2^{nd}$ B lateral face 16B.

For the light reflecting members 40 (the first light reflecting members 40A and the second light reflecting members 40B), for example, a resin member containing a light diffusing agent can be used. Examples of the light diffusing agents include $TiO_2$ particles. Other examples of light diffusing agents include particles of $Nb_2O_5$, $BaTiO_3$, $Ta_2O_5$, $Zr_2O_3$, ZnO, $Y_2O_3$, $Al_2O_3$, MgO, $BaSO_4$, or the like. For the light reflecting members 40, for example, a metal member, such as Al or Ag, may be used.

The light emitting module 100 is disposed on a support member 200 such that the $1^{st}$ B principal face 11B and the $2^{nd}$ B principal face 12B face the upper face of the support member 200. The upper face of the support member 200, for example, is exposed from the light guide parts 10A and 10B at the bottoms of the sectioning groove 14.

The first light source 20A is disposed on the support member 200 in the first hole 13A of the first light guide part 10A. The second light source 20B is disposed on the support member 200 in the second hole 13B of the second light guide part 10B. The number of light sources 20A (20B) disposed in one light guide part 10A (10B) is not limited to one, and multiple light sources may be disposed in one light guide part.

Figure 3A:
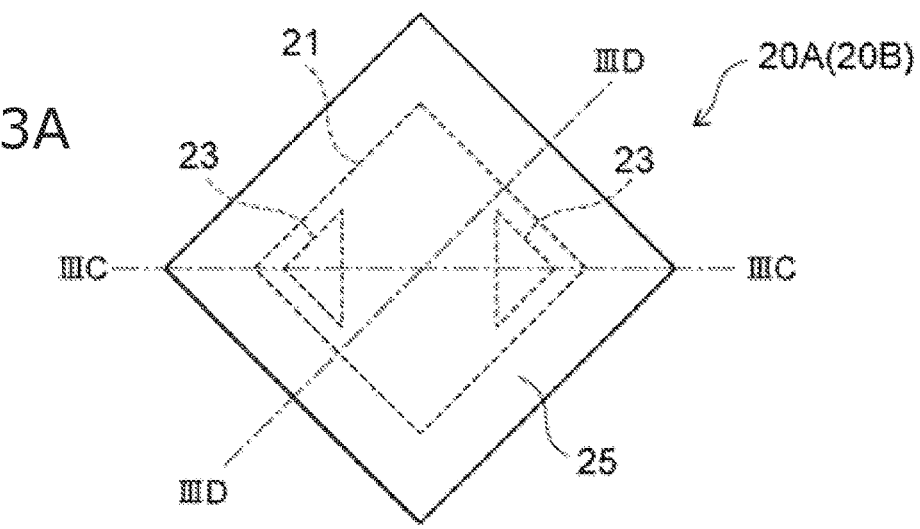
FIG. 3A is a schematic top view of a light source of the planar light source according to the first embodiment of the present invention.

FIG. 3A is a schematic top view of an example of a light source 20A/20B. In FIG. 3A, the light emitting element 21 and the electrodes 23 covered and concealed by the first light adjusting member 25 and the first light transmissive member 22 are indicated by broken lines.

Figure 3B:
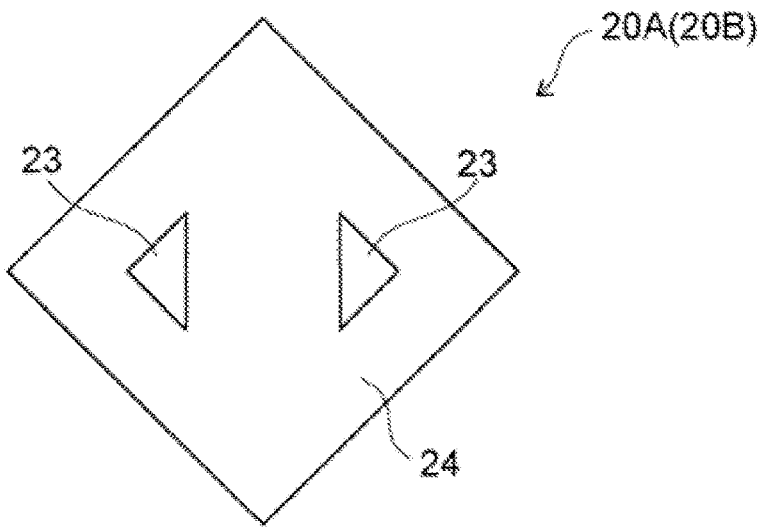
FIG. 3B is a schematic bottom view of the light source of the planar light source according to the first embodiment of the present invention.

FIG. 3B is a schematic bottom view of the light source 20A/20B.

Figure 3C:
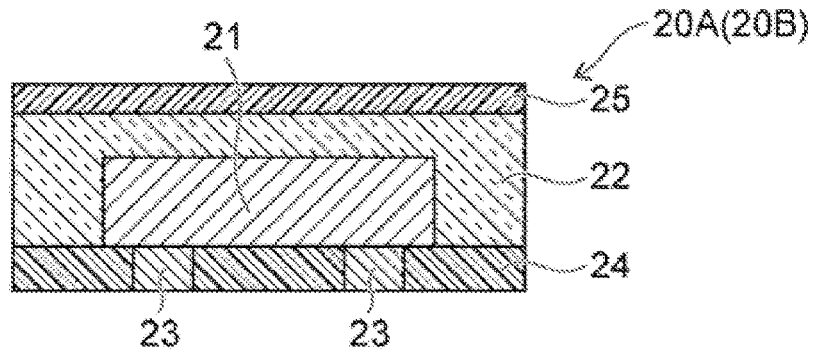
FIG. 3C is a schematic cross-sectional view taken along line IIIC-IIIC in FIG. 3A.

FIG. 3C is a schematic cross-sectional view taken along line IIIC-IIIC in FIG. 3A.

Figure 3D:
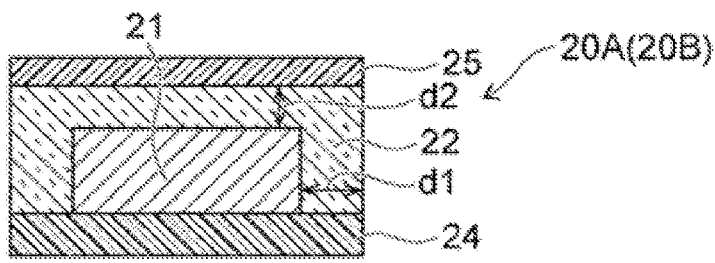
FIG. 3D is a schematic cross-sectional view taken along line IIID-IIID in FIG. 3A.

FIG. 3D is a schematic cross-sectional view taken along line IIID-IIID in FIG. 3A. The first light source 20A and the second light source 20B have the same structure.

The light sources 20A and 20B may be configured only as a light emitting element, or have a structure that combines a light transmissive member or the like and a light emitting element. In this embodiment, as shown in FIGS. 3A to 3D, the light source 20A/20B includes a light emitting element 21, a first light transmissive member 22, electrodes 23, a cover member 24, and a first light adjusting member 25. Moreover, the light source 20A/20B may include only a cover member 24 or a first light adjusting member 25 depending on the desired light distribution. For example, in the case of not disposing a first light adjusting member 25 on the first light transmissive member 22, the upper face of the light source 20A/20B can be constituted by the upper face of the first light transmissive member 22. In the case of not disposing a cover member 24 under the first light transmissive member 22, the lower face of the light source 20A/20B can be constituted by the lower face of the first light transmissive member 22 and the lower face of the light emitting element 21.

The light emitting element 21 includes a semiconductor stack structure. The semiconductor stack structure, for example, includes a sapphire or gallium nitride support substrate, an n-type semiconductor layer and a p-type semiconductor layer disposed on the support substrate, an emission layer interposed between these two layers, an n-side electrode and a p-side electrode electrically connected to the n-type semiconductor layer and the p-type semiconductor layer, respectively. A semiconductor stack structure from which the support substrate has been removed may be used. An emission layer may have a structure having a single active layer, such as in a double heterostructure or single quantum well structure (SQW), or a structure having a group of active layers such as in a multiquantum well structure (MQW). The emission layer can emit visible light or ultraviolet light. As for the visible light, the emission layer can emit blue to red light. The semiconductor stack structure including such an emission layer can include, for example, $In_xAl_yGa_{1-x-y}N$ ($0 \le x$, $0 \le y$, $x+y \le 1$). The semiconductor stack structure can include at least one such emission layer. For example, the semiconductor stack structure may be a structure that includes one or more emission layers between an n-type semiconductor layer and a p-type semiconductor layer, or one in which a structure that successively includes an n-type semiconductor layer, an emission layer, and a p-type semiconductor layer is repeatedly stacked. The multiple emission layers may include a layer having a different or the same peak emission wavelength. The same peak emission wavelength may include a variation of about several nanometers. A combination of such emission layers can be suitably selected, and in the case where the semiconductor stack structure includes two emission layers, for example, emission layers can be selected in combinations, such as blue light and blue light, green light and green light, red light and red light, ultraviolet light and ultraviolet light, blue light and green light, blue light and red light, green light and red light, or the like. The emission layer may include a plurality of active layers emitting light having the same or different peak emission wavelengths.

The first light transmissive member 22 covers the upper face and the lateral faces of the light emitting element 21. As shown in FIG. 3D, the distance d1 from a lateral face of the light emitting element 21 to the facing lateral face of the first light transmissive member 22 may be larger than the distance d2 from the upper face of the light emitting element 21 to the upper face of the first light transmissive member 22. This allows the light exiting the lateral faces of the light emitting element 21 to propagate towards the lateral faces of the first light transmissive member 22 more easily than towards the upper face of the first light transmissive member 22, thereby increasing the percentage of the light extracted laterally from the light source 20A/20B. This can increase the percentage of the light that enters the light guide member 10. The distance d1 from a lateral face of the light emitting element 21 to the facing lateral face of the first light transmissive member 22 is preferably 1.5 to 2.5 times, more preferably about twice the distance d2 from the upper face of the light emitting element 21 to the upper face of the first light transmissive member 22. The first light transmissive member 22 protects the light emitting element 21 and has wavelength conversion and light diffusion functions in accordance with the particles added to the first light transmissive member 22. Specifically, the first light transmissive member 22 includes a light transmissive resin, and may further contain a phosphor. For the light transmissive resin, for example, a silicone or epoxy resin can be used. For the phosphors, yttrium aluminum garnet-based phosphors (e.g., $Y_3(Al,Ga)_5O_{12}$:Ce), lutetium aluminum garnet-based phosphors (e.g., $Lu_3(Al,Ga)_5O_{12}$:Ce), terbium aluminum garnet-based phosphors (e.g., $Tb_3(Al,Ga)_5O_{12}$:Ce), β-SiAlON-based phosphors (e.g., $(Si,Al)_3(O,N)_4$:Eu), α-SiAlON-based phosphors (e.g., $M_z(Si,Al)_{12}(O,N)_{16}$:Eu where $0<z\leq2$ and M is an element selected from the group consisting of Li, Mg, Ca, Y, and lanthanide elements excluding La and Ce), nitride-based phosphors, such as CASN-based phosphors (e.g., $CaAlSiN_3$:Eu) or SCASN-based phosphors (e.g., (Sr, Ca)$AlSiN_3$:Eu), fluoride-based phosphors, such as KSF-based phosphors (e.g., $K_2SiF_6$:Mn), KSAF-based phosphors (e.g., $K_2(SiAl)F_6$:Mn) or MGF-based phosphors (e.g., $3.5MgO·0.5MgF_2·GeO_2$:Mn), phosphors having a perovskite structure (e.g., $CsPb(F,Cl,Br,I)_3$), or quantum dot phosphors (e.g., CdSe, InP, $AgInS_2$ or $AgInSe_2$) can be used. One or several different phosphors can be added to the first light transmissive member 22.

KSAF-based phosphors can have a composition represented by the formula (I) below:

$$M_2[Si_pAl_qMn_rF_s] \quad (I)$$

In the formula (I), M represents an alkali metal, and may include at least K. Mn can be tetravalent Mn ions. P, q, r, and s can satisfy $0.9\leq p+q+r\leq1.1$, $0<q\leq0.1$, $0<r\leq0.2$, and $5.9\leq s\leq6.1$, preferably, $0.95\leq p+q+r\leq1.05$ or $0.97\leq p+q+r\leq1.03$, $0<q\leq0.03$, $0.002\leq q\leq0.02$ or $0.003\leq q\leq0.015$, $0.005\leq r\leq0.15$, $0.01\leq r\leq0.12$ or $0.015\leq r\leq0.1$, $5.92\leq s\leq6.05$ or $5.95\leq s\leq6.025$. Examples include the compositions represented by $K_2[Si_{0.946}Al_{0.005}Mn_{0.049}F_{5.995}]$, $K_2[Si_{0.942}Al_{0.008}Mn_{0.50}F_{5.992}]$, and $K_2[Si_{0.939}Al_{0.014}Mn_{0.047}F_{5.986}]$. Such KSAF-based phosphors can emit high brightness red light having a peak emission wavelength with a narrow full width at half maximum.

A wavelength conversion sheet containing the phosphors described above may be disposed on the planar light source. The wavelength conversion sheet can produce a white light emitting planar light source by absorbing a portion of the blue light from a light source and emitting yellow light, green light, and/or red light. For example, white light can be achieved by combining a light source capable of emitting blue light and a wavelength conversion sheet containing a phosphor capable of emitting yellow light. A light source capable of emitting blue light may be combined with a wavelength conversion sheet containing a red light-emitting phosphor and a green light-emitting phosphor. A light source capable of emitting blue light may be combined with multiple wavelength conversion sheets. For multiple wavelength conversion sheets, for example, a wavelength conversion sheet containing a red light-emitting phosphor and a wavelength conversion sheet containing a green light-emitting phosphor can be selected. A light emitting element capable of emitting blue light may be combined with a light source having a light transmissive member containing a red light-emitting phosphor and a wavelength conversion sheet containing a green light-emitting phosphor.

The cover member 24 is disposed at least on the lower face of the light emitting element 21. The cover member 24 is disposed such that the lower faces of the electrodes 23 of the light emitting element 21 that are connected to the p-side electrode and the n-side electrode are exposed from the cover member 24 as shown in FIG. 3B. The cover member 24 is also disposed on the lower face of the first light transmissive member 22 that covers the lateral faces of the light emitting element 21. The cover member 24 in this embodiment has a uniform thickness across the lower face of the light emitting element 21 and the lower face of the first light transmissive member 22. Alternatively, the cover member 24 may be disposed so as to increase in thickness towards the electrodes 23, for example.

The cover member 24 has reflectivity with respect to the light emitted by the light source 20A/20B. The cover member 24, for example, is a resin member containing a light diffusing agent. Specifically, the cover member 24 is a silicone, epoxy, or acrylic resin containing a light diffusing agent, such as particles of $TiO_2$, $SiO_2$, $Al_2O_3$, ZnO or glass.

The first light adjusting member 25 is disposed on the upper face of the first light transmissive member 22 and controls the amount or the output direction of the light exiting the upper face of the first light transmissive member 22. The first light adjusting member 25 has reflectivity and light transmissivity with respect to the light emitted by the light source 20A/20B. A portion of the light exiting the upper face of the first light transmissive member 22 is reflected by the first light adjusting member 25 and the other portion of the light transmits through the first light adjusting member 25. The transmittance of the first light adjusting member 25 is preferably 1% to 50%, for example, more preferably 3% to 30%. This can reduce the luminance immediately above the light source 20A/20B, thereby reducing the in-plane luminance nonuniformity of the planar light source 300. The first light adjusting member 25 can be configured as a light transmissive resin and a light diffusing agent or the like contained in the light transmissive resin. The light transmissive resin, for example, is a silicone, epoxy, or acrylic resin. The light diffusing agent, for example, can be particles of $TiO_2$, $SiO_2$, $Al_2O_3$, ZnO or glass. The first light adjusting member 25, for example, may be a metal member such as Al or Ag, or a multilayer dielectric film.

As shown in FIG. 2, the light emitting module 100 can further include a second light transmissive member 71, a wavelength conversion member 72, a third light transmissive member 73, and a second light adjusting member 74.

The second light transmissive member 71, the wavelength conversion member 72, and the third light transmissive member 73 are disposed in each of the holes 13A and 13B of the light guide parts 10A and 10B.

The second light transmissive member 71 and the third light transmissive member 73 have light transmissivity with respect to the light emitted by the light sources 20A and 20B, and can be formed, for example, by using the same resin as that employed for the light guide parts 10A and 10B or a resin having a small refractive index difference from that for the light guide parts 10A and 10B.

The second light transmissive members 71 are disposed between the lateral faces of the light sources 20A and 20B and the lateral faces of the holes 13A and 13B, respectively.

The second light transmissive members 71 are preferably disposed so as not to create any space such as an air layer between the lateral faces of the light sources 20A and 20B and the second light transmissive members 71 or between the lateral faces of the holes 13A and 13B and the second light transmissive members 71. This can facilitate the entry of the light from the light sources 20A and 20B into the light guide parts 10A and 10B.

The wavelength conversion members 72 cover the upper faces of the light sources 20A and 20B. The wavelength conversion members 72 also cover the upper faces of the second light transmissive members 71. The wavelength conversion members 72 are light transmissive resin members containing phosphors for adjusting the colors of the light from the light sources 20A and 20B.

The third light transmissive members 73 cover the upper faces of the wavelength conversion members 72. Each third light transmissive member 73 can be formed to have a flat upper face, or a convex or concave curved upper face.

The second light adjusting members 74 are disposed on the third light transmissive members 73. The second light adjusting members 74 have reflectivity and light transmissivity with respect to the light emitted by the light sources 20A and 20B. The second light adjusting members 74 can be configured as a light transmissive resin and a light diffusing agent or the like contained in the light transmissive resin. The light transmissive resin, for example, is a silicone, epoxy, or acrylic resin. The light diffusing agent, for example, can be particles of $TiO_2$, $SiO_2$, $Al_2O_3$, ZnO or glass. The second light adjusting members 74 can be disposed to cover the upper faces of the third light transmissive members 73 in whole or part. The second light adjusting members 74 covering the upper faces of the third transmissive members 73 can be extended over the light guide parts 10A and 10B in the periphery of the third transmissive members 73.

As shown in FIG. 1, the second light adjusting members 74 are disposed in the positions that overlap the light sources 20A and 20B in a plan view. In the example shown in FIG. 1, the second light adjusting members 74 have square shapes larger than the light sources 20A and 20B in a plan view. The second light adjusting members 74 can have a shape such as a circle, triangle, hexagon, octagon, or the like in a plan view.

The first light adjusting members 25 reflect a portion of the light exiting the light sources 20A and 20B directly upward while transmitting the other portion. This can hinder the area in each of the A principal faces 11A and 12A, the light emission faces (light exiting faces) of the planar light source 300, that is directly above the light source 20A or 20B from having extremely higher luminance than the other area. This, in other words, can reduce the luminance nonuniformity of the light exiting each of the light guide parts 10A and 10B compartmentalized by the sectioning groove 14.

The thickness of each second light adjusting member 74 is preferably 0.005 mm to 0.2 mm, more preferably 0.01 mm to 0.075 mm. The reflectance of the second light adjusting members 74 is preferably set lower than the reflectance of the first light adjusting members 25; for example, the reflectance of the second light adjusting members 74 may be in a range of 20% to 90%, more preferably in a range of 30% to 85% with respect to the light from the light sources 20A and 20B.

The third light transmissive members 73 are disposed between the second light adjusting members 74 and the first light adjusting members 25. The third light transmissive members 73 have a higher transmittance with respect to the light emitted by the light sources 20A and 20B than those of the first light adjusting members 25 and the second light adjusting members 74. The transmittance of the third light transmissive members 73 with respect to the light emitted by the light sources 20A and 20B can be set to 2 to 100 times the transmittances of the first light adjusting members 25 and the second light adjusting members 74 within the range not exceeding 100%. This can hinder the areas immediately above the light sources 20A and 20B from having excessively high or low luminance, thereby reducing the luminance nonuniformity in the light emission faces of the light guide parts 10A and 10B.

A single layer of a second light transmissive member 71 may be disposed in the holes 13A and 13B without any wavelength conversion member 72 or third light transmissive member 73. In this case, the second light adjusting member 74 is disposed on the second light transmissive member 71. The second light transmissive member 71 itself can contain a phosphor in order to function as a wavelength conversion member.

The support member 200 includes a wiring substrate 50, a first adhesive member 41, a third light reflecting member 42, and a second adhesive member 43. On the wiring substrate 50, the first adhesive member 41, the third light reflecting member 42, and the second adhesive member 43 are successively disposed.

The first adhesive member 41 is disposed between the wiring substrate 50 and the third light reflecting member 42, adhering the wiring substrate 50 to the third light reflecting member 42. The second adhesive member 43 is disposed between the third light reflecting member 42 and the B principal faces 11B and 12B of the light guide parts 10A and 10B, adhering the third light reflecting member 42 to the light guide parts 10A and 10B.

The first light source 20A is disposed on the second adhesive member 43 in the first hole 13A. The second light source 20B is disposed on the second adhesive member 43 in the second hole 13B.

The second adhesive member 43 has light transmissivity with respect to the light emitted by the light sources 20A and 20B. The first adhesive member 41 and the second adhesive member 43 can be, for example, an epoxy, acrylic, or cyclic polyolefin resin.

The third light reflecting member 42 is disposed under the B principal faces 11B and 12B of the light guide parts 10A and 10B, under the light sources 20A and 20B, and under the sectioning groove 14. In other words, the third light reflecting member 42 is disposed across the entire lower face of the light emitting module 100.

The third light reflecting member 42 has reflectivity with respect to the light emitted by the light sources 20A and 20B. For the third light reflecting member 42, for example, a resin material containing a large number of air bubbles or a light diffusing agent can be used. Examples of resin materials include polyethylene terephthalate (PET), cyclic polyolefin, acrylic, silicone, urethane, or epoxy resins. For the light diffusing agent, for example, $SiO_2$, $CaF_2$, $MgF_2$, $TiO_2$, $Nb_2O_5$, $BaTiO_3$, $Ta_2O_5$, $Zr_2O_3$, ZnO, $Y_2O_2$, $Al_2O_3$, MgO or $BaSO_4$ can be used.

The wiring substrate 50 includes an insulation base, and at least one wiring layer. Connection parts 51a, which are parts of the wiring layer are disposed on the rear face of the wiring substrate 50 that is located opposite to the face on which the first adhesive member 41 is disposed. The rear face of the wiring substrate 50 is covered by an insulation film 52. The connection parts 51a are not covered by and exposed from the insulation film 52.

In the support member 200, connection members 61 are disposed under the light sources 20A and 20B. At least a portion of each electrode 23 of the light sources 20A and 20B is disposed on and connected to a connection member 61.

The connection members 61 pass through the second adhesive member 43 and the insulation film 52, and further extend from the through portions to the connection parts 51a disposed on the rear face of the wiring substrate 50. The connection members 61 are conductive, electrically connecting the electrodes 23 of the light sources 20A and 20B to the connection parts 51a. For the connection members 61, for example, a conductive paste formed of a resin binder in which a conductive filler is dispersed can be used. The connection members 61 can contain as a filler a metal such as copper or silver, for example. The filler is in the form of particles or flakes.

Each of the light sources 20A and 20B includes a pair of positive and negative electrodes 23. For each light source, the connection member 61 connected to the positive electrode 23 is isolated from and not electrically connected to the connection member 61 connected to the negative electrode 23. An insulation film 53 is disposed on the surface of the insulation film 52 so as to cover the connection members 61. The insulation film 53 is formed to cover the spaces between the pairs of the connection members 61 corresponding to the pairs of positive and negative electrodes 23 to enhance the insulation between the pairs of positive and negative connection members 61.

In the planar light source 300 constructed as above, the light guided through the light guide parts 10A and 10B towards the B principal faces 11B and 12B is reflected by the third light reflecting member 42 towards the A principal faces 11A and 12A, which are the light emission faces of the planar light source 300. This can increase the luminance of the light extracted through the A principal faces 11A and 12A.

In the portions of the light guide plate between the third light reflecting member 42 and the A principal faces 11A and 12A, the light is guided through the light guide parts 10A and 10B towards the sectioning groove 14 while repeating total internal reflection off the third light reflecting member 42 and the A principal faces 11A and 12A. A portion of the light that has advanced towards the A principal faces 11A and 12A is extracted from the light guide parts 10A and 10B through the A principal faces 11A and 12A.

The light reflecting members 40 disposed on the first lateral faces 15 and the second lateral faces 16 that configures the lateral faces of the sectioning groove 14 can hinder the propagation of the light between two adjacent light guide parts 10A and 10B. This, for example, can reduce the propagation of the light from a light guide part 10A (or 10B) in the lit state to an adjacent light guide part 10B (or 10A) in the unlit state. This allows for local dimming using the individual light guide parts 10A and 10B compartmentalized by the sectioning groove 14 as driving units.

In this embodiment, because the light reflecting members 40 contain a light diffusing agent, the light from the light sources 20A and 20B that reached the light reflecting members 40 is diffuse reflected and also extracted upwards. This can increase the luminance in the areas near the first lateral faces 15 and the second lateral faces 16 that are farthest from the light sources 20A and 20B.

Particularly, the light reflecting members 40 on the $1^{st}$ C lateral faces 15C and the $2^{nd}$ C lateral faces 16C are located opposite to the A principal faces 11A and 12A at the positions closer to the A principal faces 11A and 12A than to the B principal faces 11B and 12B. Thus, the light reflecting members 40 disposed on the $1^{st}$ C lateral faces 15C and the $2^{nd}$ C lateral faces 16C can increase the upward light outputs.

The first lateral face 15 has a $1^{st}$ A lateral face 15A without a light reflecting member 40. The second lateral face 16 has a $2^{nd}$ A lateral face 16A without a light reflecting member 40. Accordingly, when both of two adjacent light guide parts 10A and 10B are simultaneously lit, the light can propagate between the $1^{st}$ A lateral face 15A and the $2^{nd}$ A lateral face 16A, thereby reducing the generation of a dark line along the boundary (sectioning groove 14) between the first light guide part 10A and the second light guide part 10B. Because the distance between the $1^{st}$ A lateral face 15A and the $2^{nd}$ A lateral face 16A is smaller than the distance between the $1^{st}$ B lateral face 15B and the $2^{nd}$ B lateral face 16B, the light propagation between the $1^{st}$ A lateral face 15A and the $2^{nd}$ A lateral face 16A can be facilitated.

According to this embodiment, the amount of the light propagating between two adjacent light guide parts 10A and 10B separated by a sectioning groove 14 can be adjusted, and the potential luminance decline along the boundary between the light guide parts 10A and 10B can be lessened, by adjusting the cross-sectional shape of the sectioning groove 14 and the percent distribution of the light reflecting members 40 disposed on the first lateral face 15 and the second lateral face 16, or the like.

For example, in the Z direction, the length of the $1^{st}$ B lateral face 15B where the first light reflecting member 40A is disposed is set larger than the length of the $1^{st}$ A lateral face 15A. Furthermore, in the Z direction, the length of the $2^{nd}$ B lateral face 16B where the second light reflecting member 40B is disposed is set larger than the length of the $2^{nd}$ A lateral face 16A. This can enhance the effect of reducing the propagation of the light from the light guide part 10A (or 10B) in the lit state to the light guide part 10B (or 10A) in the non-lit state.

A method of manufacturing a planar light source 300 will be explained next with reference to FIG. 4 to FIG. 20.

Figure 4:
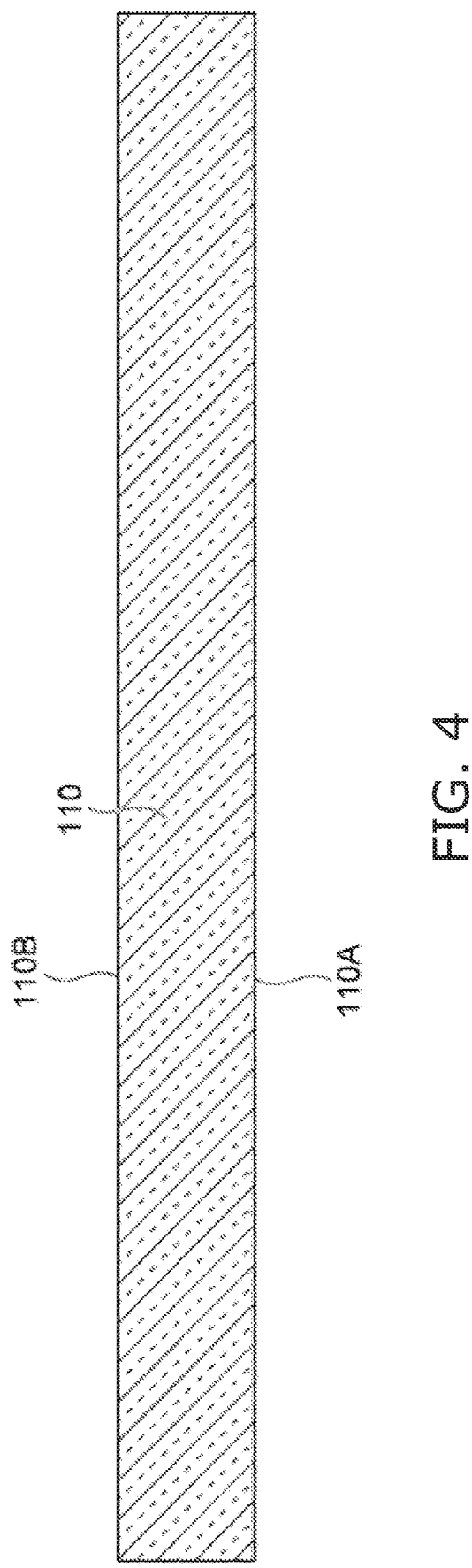
FIG. 4 is a schematic cross-sectional view showing a method of manufacturing a planar light source according to the first embodiment of the present invention.
Figure 8:
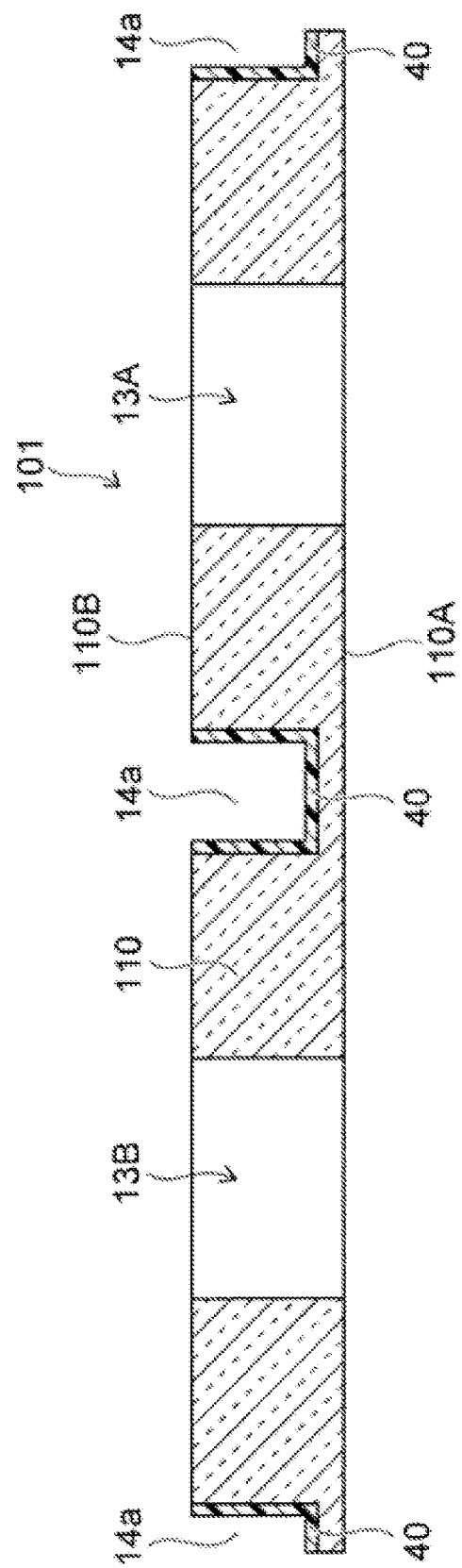
FIG. 8 is a schematic cross-sectional view showing the method of manufacturing the planar light source according to the first embodiment of the present invention.
Figure 9:
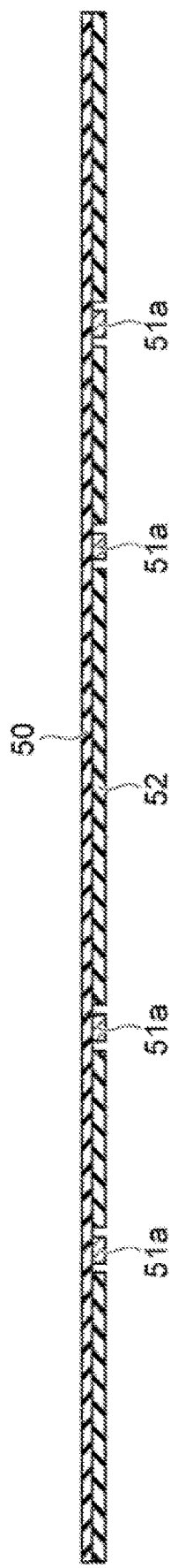
FIG. 9 is a schematic cross-sectional view showing the method of manufacturing the planar light source according to the first embodiment of the present invention.

A method of manufacturing a planar light source 300 according to an embodiment has a process for providing the structure 101 shown in FIG. 8, and the process for providing the structure 101 includes a process for providing the light guide plate 110 shown in FIG. 4. The light guide plate 110 has a first principal face 110A and a second principal face 110B located opposite to the first principal face 110A. The structure 101 shown in FIG. 8 may be a purchased component.

Figure 5:
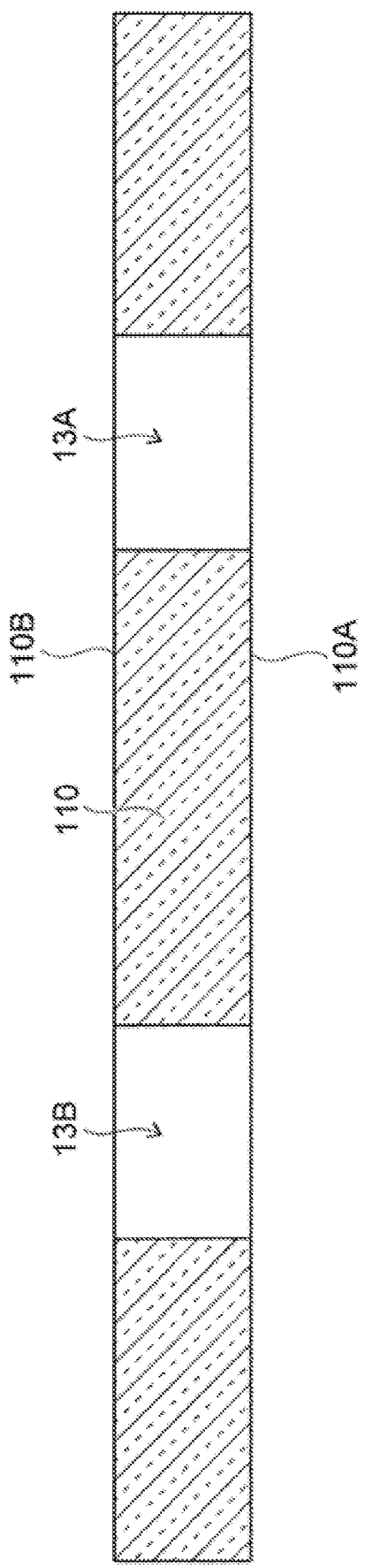
FIG. 5 is a schematic cross-sectional view showing the method of manufacturing the planar light source according to the first embodiment of the present invention.

As shown in FIG. 5, a first hole 13A and a second hole 13B are formed in the light guide plate 110. The first hole 13A and the second hole 13B are formed through the light guide plate 110, for example, by drilling, punching, or laser processing.

Figure 6:
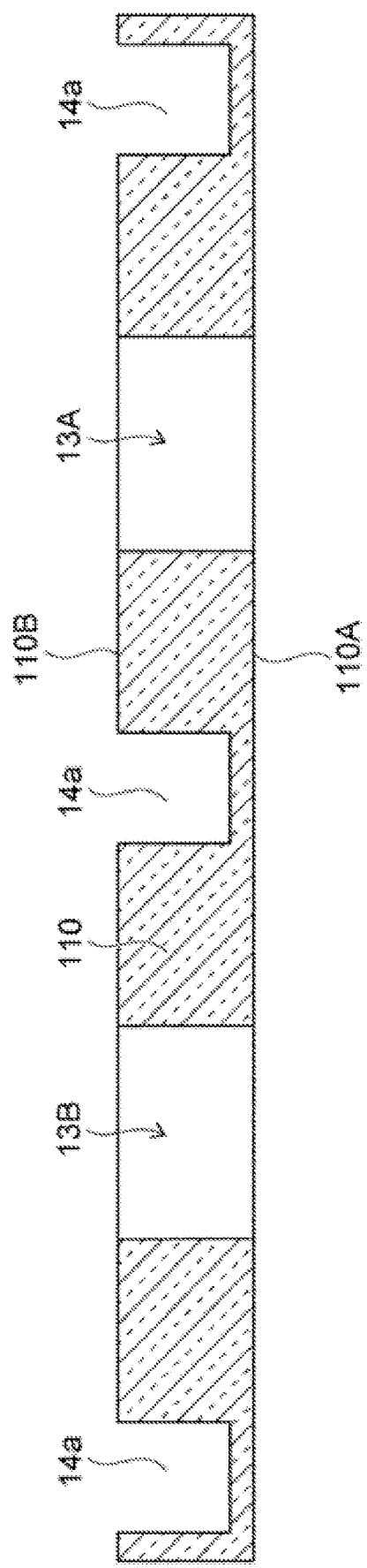
FIG. 6 is a schematic cross-sectional view showing the method of manufacturing the planar light source according to the first embodiment of the present invention.

As shown in FIG. 6, first groove portions 14a are further formed in the light guide plate 110. The first groove portions 14a are formed as bottomed grooves being open on the second principal face 110B side. The depth of each first groove portion 14a is greater than the distance between the bottom face of the first groove portion 14a and the first principal face 110A. The first groove portions 14a are formed, for example, by machining or laser processing.

Figure 7:
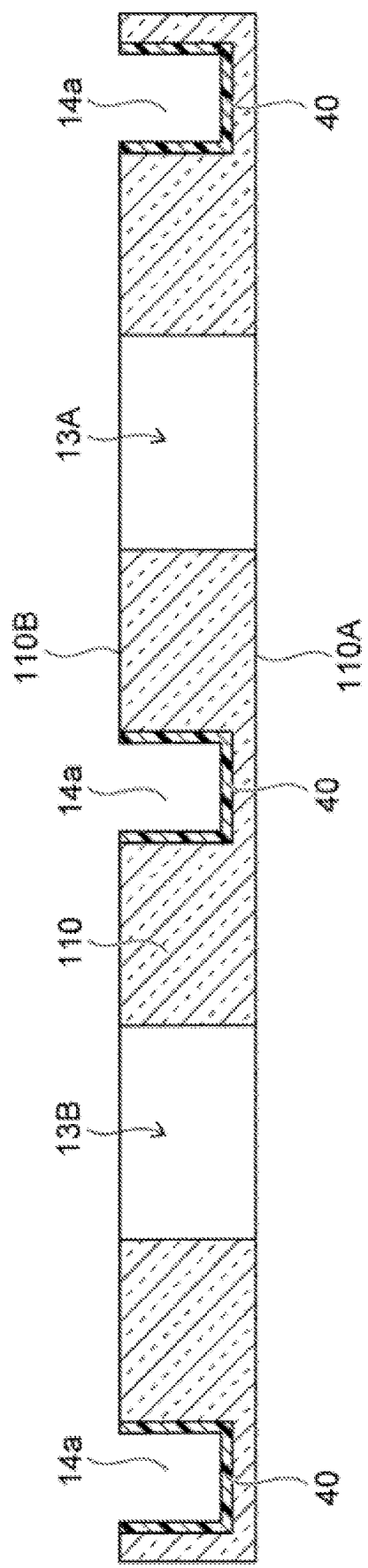
FIG. 7 is a schematic cross-sectional view showing the method of manufacturing the planar light source according to the first embodiment of the present invention.

As shown in FIG. 7, a light reflecting member 40 is formed on the bottom face and the lateral faces of each first groove portion 14a. The light reflective member 40 is formed, for example, by printing, potting, spraying, or the like. The light reflecting members 40 in this embodiment does not fill the first groove portions 14a. Thus, spaces remain in the first groove portions 14a inward of the light reflecting members 40.

As shown in FIG. 8, the light guide plate 110 is cut into a desired planar size to obtain the structure 101.

Figure 11:
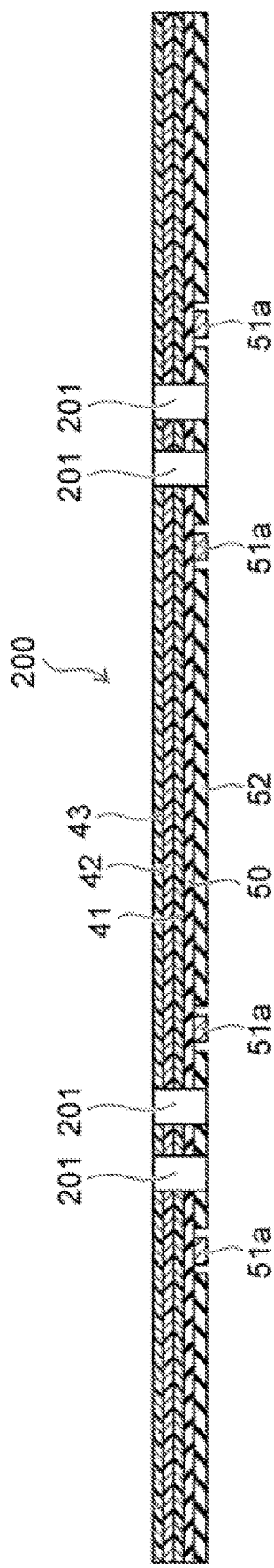
FIG. 11 is a schematic cross-sectional view showing the method of manufacturing the planar light source according to the first embodiment of the present invention.

The method of manufacturing the planar light source 300 according to this embodiment has a process for providing the support member 200 shown in FIG. 11. The process for providing the support member 200 has a process for providing the wiring substrate 50 shown in FIG. 9. Connection parts 51a and an insulation film 52 are disposed on the rear face of the wiring substrate 50. The connection parts 51a are disposed in the openings formed in the insulation film 52, and are exposed from the insulation film 52. The support member 200 shown in FIG. 11 may be a purchased component.

Figure 10:
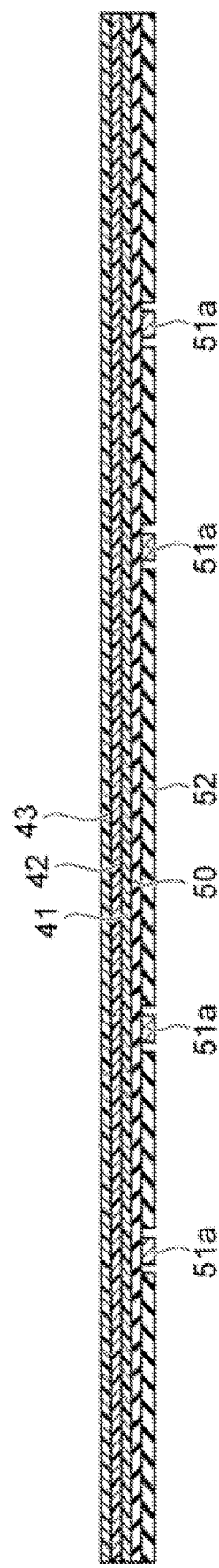
FIG. 10 is a schematic cross-sectional view showing the method of manufacturing the planar light source according to the first embodiment of the present invention.

As shown in FIG. 10, on the face of the wiring substrate 50 located opposite to the face on which the connection parts 51a are disposed, a first adhesive member 41, a third light reflecting member 42, and a second adhesive member 43 are stacked.

As shown in FIG. 11, connection holes 201 that pass through the second adhesive member 43, the third light reflecting member 42, the first adhesive member 41, the wiring substrate 50, and the insulation film 52 are formed to obtain the support member 200. The connection holes 201 are formed, for example, by punching, drilling, or laser processing. In a plan view, each connection hole 201 has a circular shape. The plan view shape of a connection hole 201 may be an ellipse or polygon, besides a circle. The connection holes 201 are arranged such that one connection hole faces one of the pair of positive and negative electrodes 23 (for example, the positive electrode) of the light source 20A or 20B and another connection hole faces the other electrode 23 (for example, the negative electrode). At this time, each connection hole 201 in a plan view can have a size that is large enough to expose at least one portion of the lower face of an electrode 23 from the wiring substrate 50. In other words, in a plan view, one connection hole 201 overlaps one electrode 23.

Figure 12:
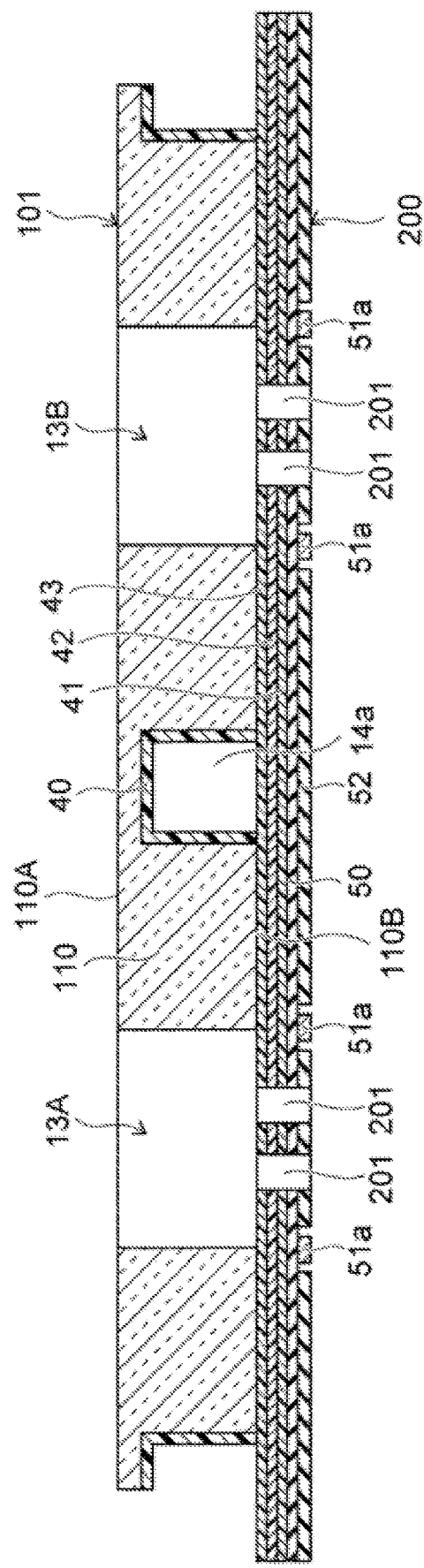
FIG. 12 is a schematic cross-sectional view showing the method of manufacturing the planar light source according to the first embodiment of the present invention.

As shown in FIG. 12, the structure 101 is disposed on the support member 200. The second principal face 110B of the light guide plate 110 is adhered to the second adhesive member 43 of the support member 200. The connection holes 201 formed in the support member 200 are positioned to overlap and be in communication with the first hole 13A and the second hole 13B. The first hole 13A overlaps two connection holes 201 and the second hole 13B overlaps two connection holes 201. The openings of the first sectioning groove portions 14a face the second adhesive member 43, which is at the upper face of the support member 200. The first groove portions 14a are positioned between the first principal face 110A of the light guide plate 110 and the upper face of the support member 200.

After placing the structure 101 on the support member 200, the sections of the light guide plate 110 connected above the first groove portions 14a are cut off. At this time, the sections of the light reflecting members 40 connected in the first groove portions 14a are also cut off. The light guide plate 110 and the light reflecting members 40 are cut by using, for example, a cutting tool, such as a draw cutting or push cutting cutter, or a laser. When cutting the light guide plate 110 and the light reflecting member 40, the support member 200 may remain uncut as in the case of this embodiment, or a portion of the support member 200 may be cut. In the case of cutting a portion of the support member 200, a groove (hereinafter referred to as a third groove) extending along each first groove portion 14a is created on the upper face of the support member 200. The third grooves can reduce the warping of the support member 200 attributable to the thermal expansion coefficient differences among the members making up the support member 200 caused by the heat treatment (e.g., the heat treatment performed after disposing the structure 101 on the support member 200), thereby reducing the generation of cracks in the connection members 61. The support member 200 can be partially cut to a depth that does not reach the wiring layer of the wiring substrate 50. More specifically, at least a portion of the second adhesive member 43 can be cut. Moreover, the second adhesive member 43 and at least a portion of the third light reflecting member 42 may be cut. The second adhesive member 43, the third light reflecting member 42, and at least a portion of the first adhesive member 41 may be cut. In other words, the depth of the third groove can be suitably set such that the first adhesive member 41, the third light reflecting member 42, or the second adhesive member 43 becomes the bottom face of the third groove.

Figure 13:
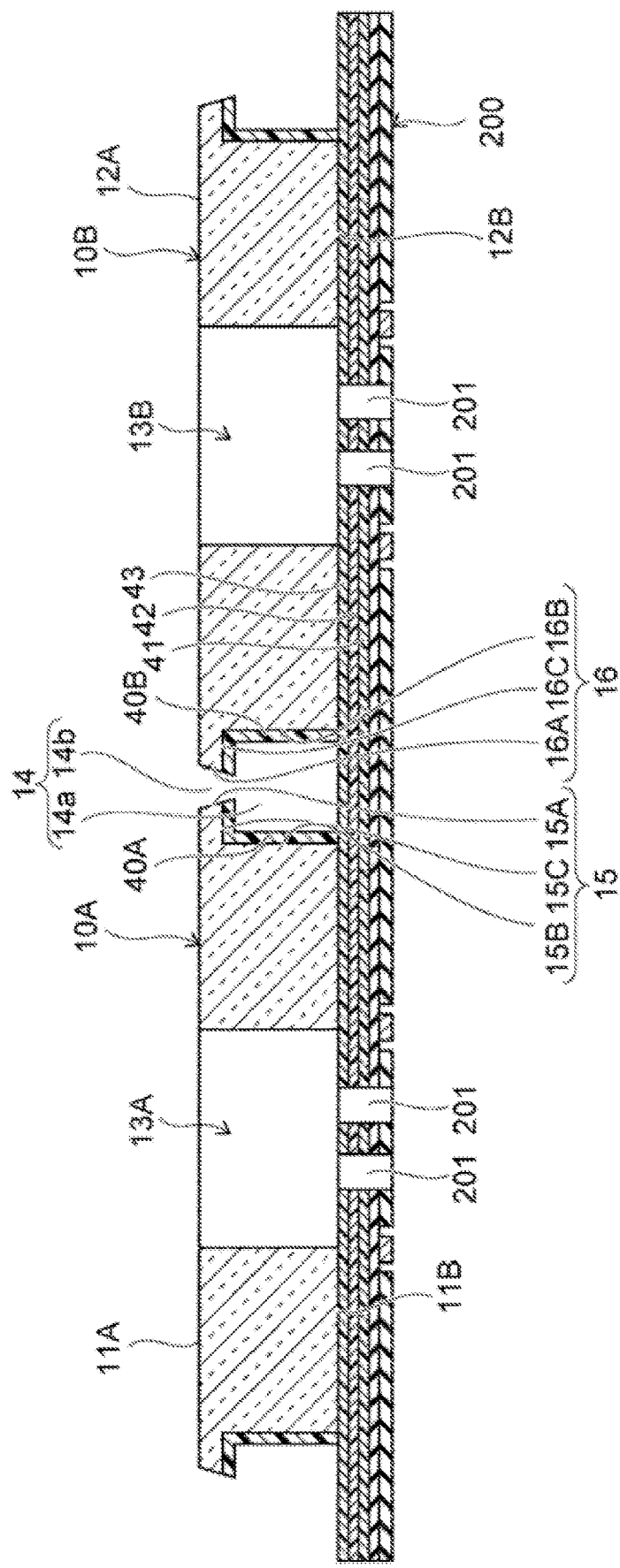
FIG. 13 is a schematic cross-sectional view showing the method of manufacturing the planar light source according to the first embodiment of the present invention.

In this embodiment, as shown in FIG. 13, a second groove portion 14b is formed above and in communication with a first groove portion 14a, and the first groove portion 14a and the second groove portion 14b configuring a sectioning groove 14. The light guide plate 110 is divided into a first light guide part 10A and a second light guide part 10B by using a sectioning groove 14.

Because of the thermal expansion coefficient difference between the light guide plate 110 and the wiring substrate 50, the heat treatment performed after disposing a structure 101 on a support member 200 might allow the light guide plate 110 to warp. According to this embodiment, the warping that can result from subsequent heat treatment can be reduced by completely separating the light guide parts 10A and 10B of the light guide plate 110 as compared to the case in which the light guide plate 110 are connected at the locations of the sectioning groove 14.

If the light guide plate 110 are disposed on the support member 200 subsequent to the process shown in FIG. 5 and sectioning groove 14 are formed in the light guide plate 110 supported by the support member 200, the wiring layer of the wiring substrate 50 might be inadvertently cut because of the varied thicknesses of the support member 200 or the like. According to this embodiment, the wiring layer of the wiring substrate 50 is less likely to be cut when forming first groove portions 14a and second groove portions 14b because the light guide plate 110 that has already been provided with the first groove portions 14a is disposed on the support member 200 before cutting the sections of the light guide plate 110 connected above the first groove portions 14a.

If the light guide plate 110 are divided into multiple light guide parts 10A and 10B using sectioning groove 14 prior to disposing the light guide plate 110 on the support member 200, the separated light guide parts 10A and 10B would have to be individually disposed on the support member 200.

In contrast, in this embodiment, the light guide plate 110 is not yet divided into multiple parts when the light guide plate 110 is disposed on the support member 200, and the multiple light guide parts 10A and 10B can be collectively disposed on the support member 200. This can reduce the number of processes.

Figure 14:
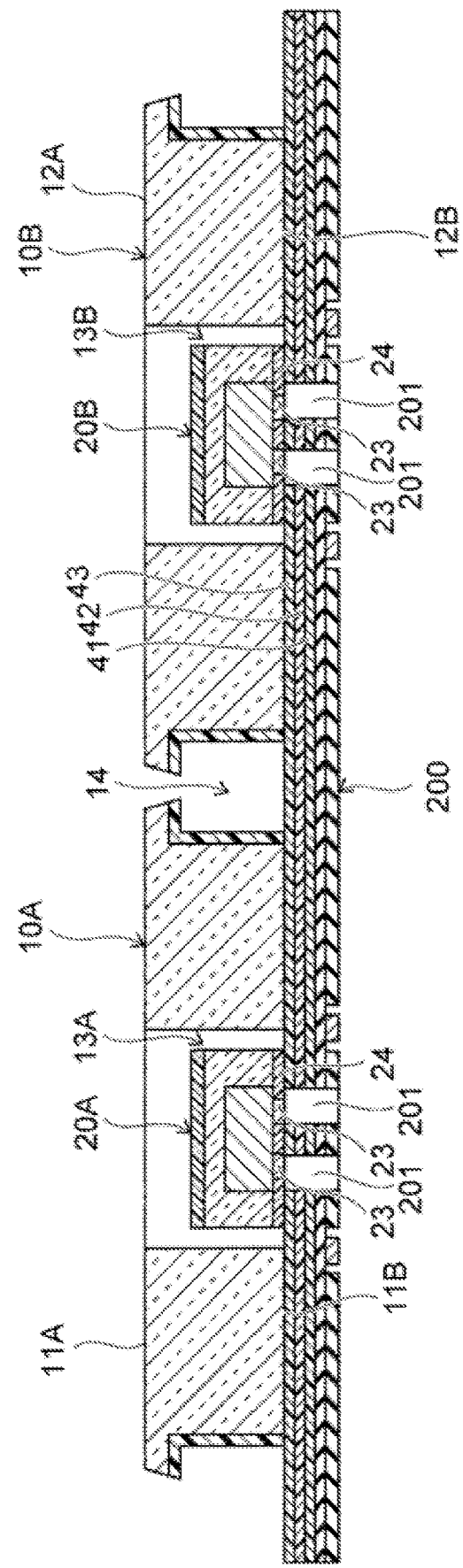
FIG. 14 is a schematic cross-sectional view showing the method of manufacturing the planar light source according to the first embodiment of the present invention.

After separating the light guide plate 110 into multiple light guide parts 10A and 10B, as shown in FIG. 14, light sources 20A and 20B are disposed in the holes 13A and 13B. For example, the lower faces of the cover members 24, which are the lower faces of the light sources 20A and 20B are adhered to the upper face of the second adhesive member 43 exposed in the holes 13A and 13B. The electrodes 23 of the light sources 20A and 20B are aligned with the connection holes 201 of the support member 200. This exposes at least a portion of the lower face of each electrode 23 from the support member 200 via a connection hole 201.

Figure 15:
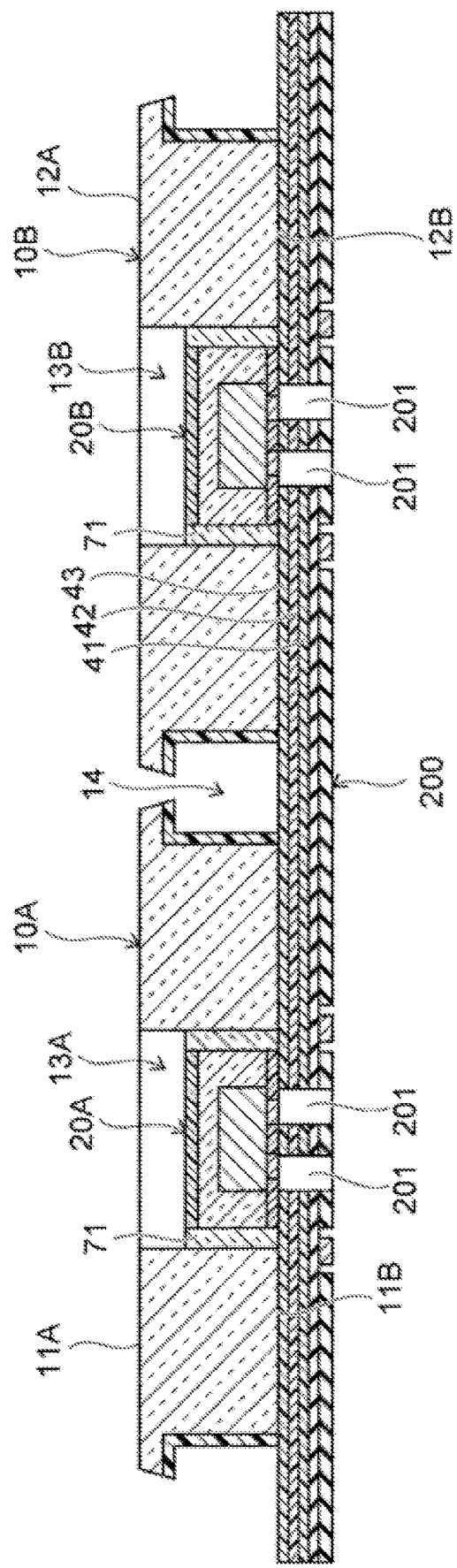
FIG. 15 is a schematic cross-sectional view showing the method of manufacturing the planar light source according to the first embodiment of the present invention.

After disposing the light sources 20A and 20B in the holes 13A and 13B, as shown in FIG. 15, second light transmissive members 71 are formed in the holes 13A and 13B. The second light transmissive member 71 is formed between the lateral face(s) of the light source 20A/20B and the lateral face(s) of the hole 13A/13B. The upper faces of the light sources 20A and 20B are exposed from the second light transmissive members 71. For example, the second light transmissive members 71 are formed by supplying a liquid light transmissive resin to the holes 13A and 13B followed by heating to harden the resin. The light sources 20A and 20B are fixed to the light guide parts 10A and 10B by the second light transmissive members 71.

Figure 16:
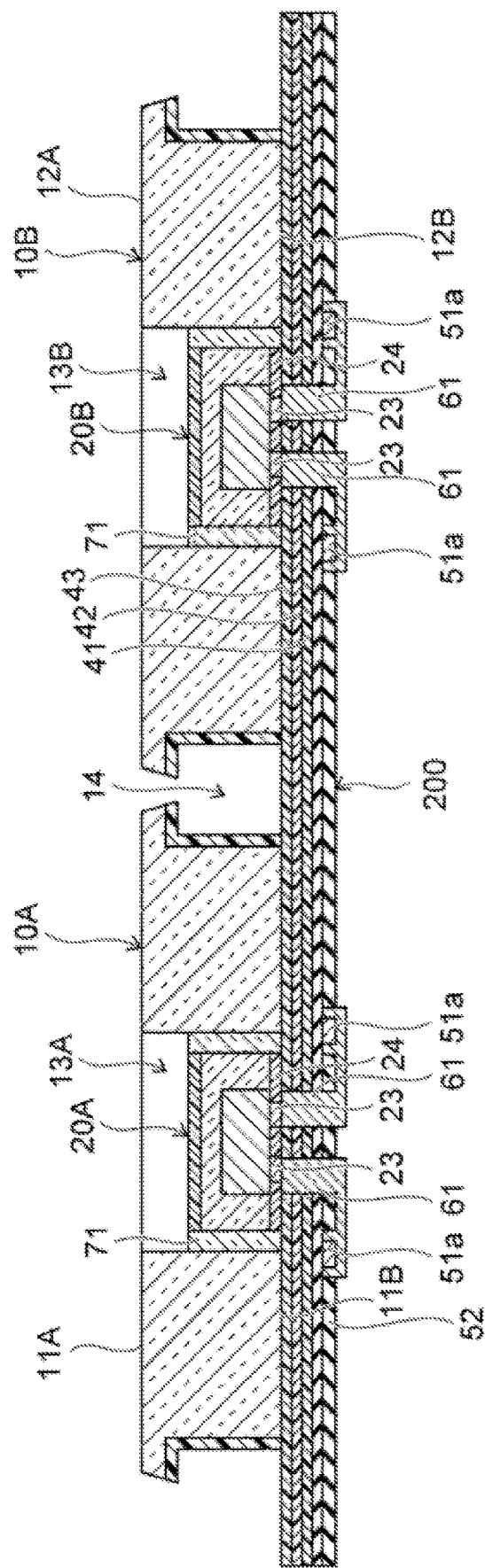
FIG. 16 is a schematic cross-sectional view showing the method of manufacturing the planar light source according to the first embodiment of the present invention.

After forming the second light transmissive members 71, connection members 61 are formed in the connection holes 201. As shown in FIG. 16, the connection members 61 connected to the electrodes 23 of the light sources 20A and 20B can be formed, for example, by supplying a conductive paste in the connection holes 201 followed by heating to harden the paste. The connection members 61 are also formed on the rear face of the wiring substrate 50 and connected to the connection parts 51a of the wiring layer.

The conductive paste is preferably hardened under pressure. This can reduce the air bubbles that remain in the connection members 61. For example, the air bubbles entrained in the conductive paste supplied in the connection holes 201 can be extracted from the conductive paste by allowing the conductive paste to harden under pressure. Reducing the air bubbles remaining in the connection members 61 can improve the reliability of the connection members 61 for electrical connection. Furthermore, the air bubbles located between the conductive paste and the first adhesive member, the second adhesive member and/or the third light reflecting member can be extracted via the conductive paste by hardening the conductive paste under pressure. This can improve the adhesion of the connection members 61 to the first adhesive member, the second adhesive member and/or the third light reflecting member. When the first adhesive member and/or the second adhesive member contains air bubbles before hardening the conductive paste, the air bubbles can be extracted via the conductive paste by hardening the conductive paste under pressure. This can enhance the adhesive strength of the first adhesive member and/or the second adhesive member. When the conductive paste contains a resin and metal particles, the resin volume can be reduced by hardening the conductive paste under pressure. This can increase the volume percent of the metal particles in the connection members 61, thereby improving the reliability of the connection members 61 for electrical connection. In general, the volume of metal particles does not easily change with pressure as compared to resins. The surfaces of the connection members 61 positioned opposite the light guide member may be depressed as a result of the reduced resin volume in the conductive paste. The hardening temperature for the conductive paste is not particularly limited. The hardening temperature for the conductive paste is preferably 40° C. to 130° C., for example. The pressure applied when hardening the conductive paste is not particularly limited. The pressure applied when hardening the conductive paste is preferably 0.15 MPa to 1 MPa, for example. The conductive paste preferably contains an organic solvent. The volatilization of the organic solvent when hardening the conductive paste can facilitate the extraction of air bubbles from the conductive paste. The amount of the solvent contained in the conductive paste is not particularly limited. The amount of the solvent contained in the conductive paste is preferably 0.1 wt % to 10 wt %, for example. The organic material for the solvent contained in the conductive paste is not particularly limited. For the organic solvent contained in the conductive paste, for example, a known material, such as methanol, ethanol, propylene glycol monomethyl ether, propylene glycol monoethyl ether, dipropylene glycol monomethyl ether, cyclopentanone, cyclohexanone, γ-butyrolactone, or the like, can be used.

Figure 17:
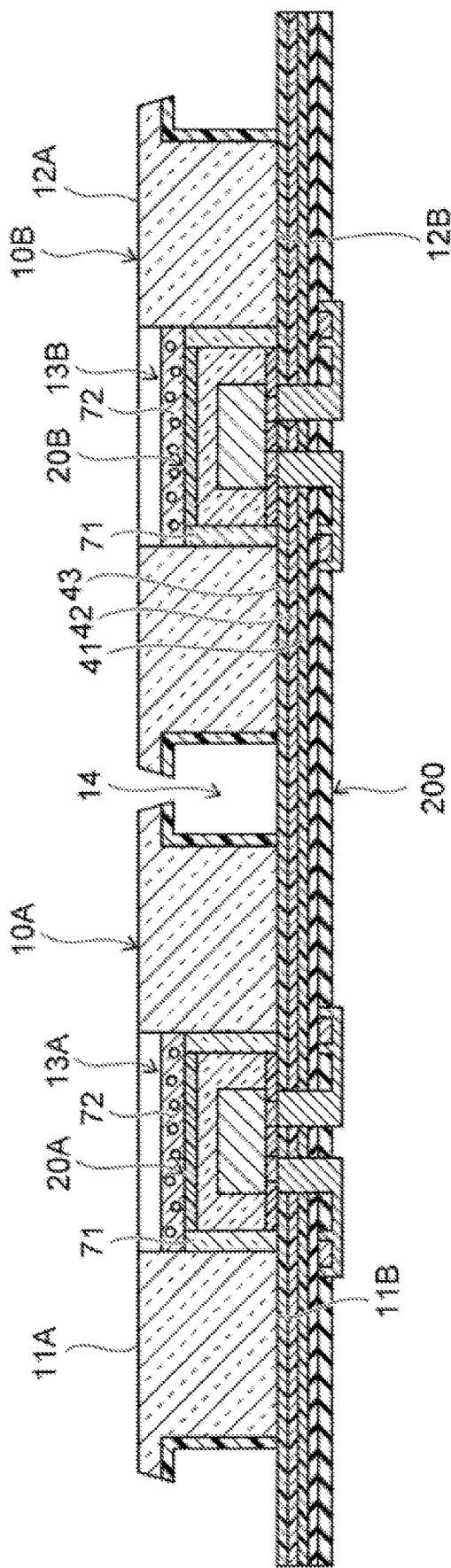
FIG. 17 is a schematic cross-sectional view showing the method of manufacturing the planar light source according to the first embodiment of the present invention.

After forming the connection members 61, as shown in FIG. 17, wavelength conversion members 72 are formed on the light sources 20A and 20B and the second light transmissive members 71 in the holes 13A and 13B. For example, the wavelength conversion members 72 can be formed by supplying a liquid resin containing a phosphor to the holes 13A and 13B followed by heating to harden the resin.

Figure 18:
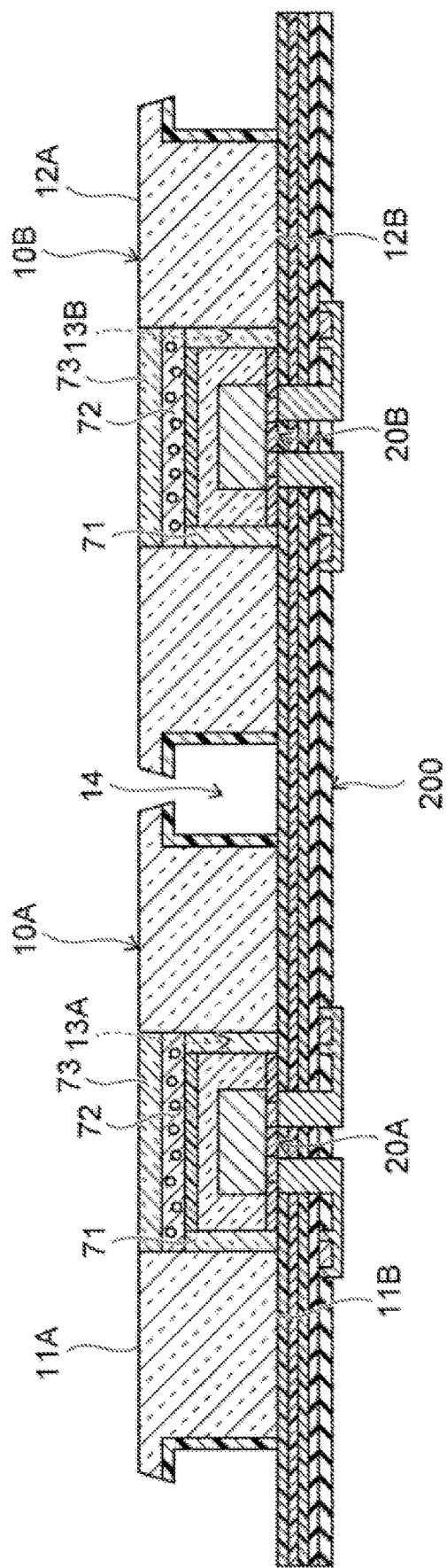
FIG. 18 is a schematic cross-sectional view showing the method of manufacturing the planar light source according to the first embodiment of the present invention.

After forming the wavelength conversion members 72, as shown in FIG. 18, third light transmissive members 73 are formed on the wavelength conversion members 72 in the holes 13A and 13B. For example, the third light transmissive members 73 can be formed by supplying a liquid resin on the wavelength conversion members 72 followed by heating to harden the resin.

Figure 19:
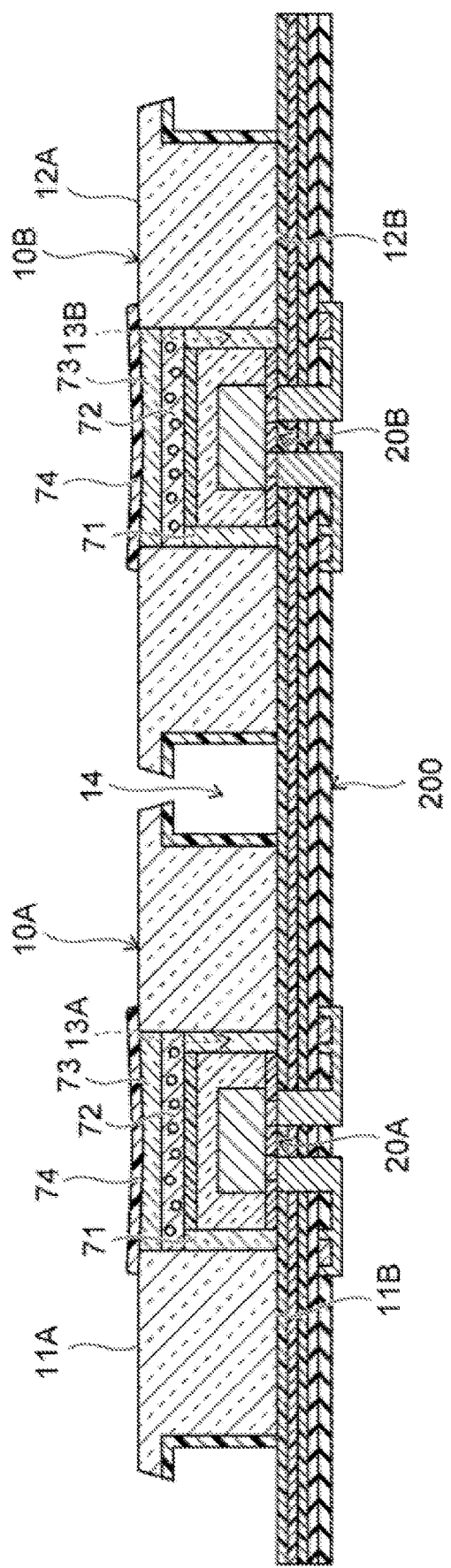
FIG. 19 is a schematic cross-sectional view showing the method of manufacturing the planar light source according to the first embodiment of the present invention.

After forming the third light transmissive members 73, as shown in FIG. 19, second light adjusting members 74 are formed on the third light transmissive members 73. For example, the second light adjusting members 74 can be formed by supplying a liquid resin containing a light diffusing agent followed by heating to harden the resin.

Because the light guide parts 10A and 10B have already been separated by the sectioning groove 14, the warping of the light guide parts 10A and 10B attributable to heat treatments can be reduced when forming the second light transmissive members 71, the connection members 61, the wavelength conversion members 72, the third light transmissive members 73, and the second light adjusting members 74.

Figure 20:
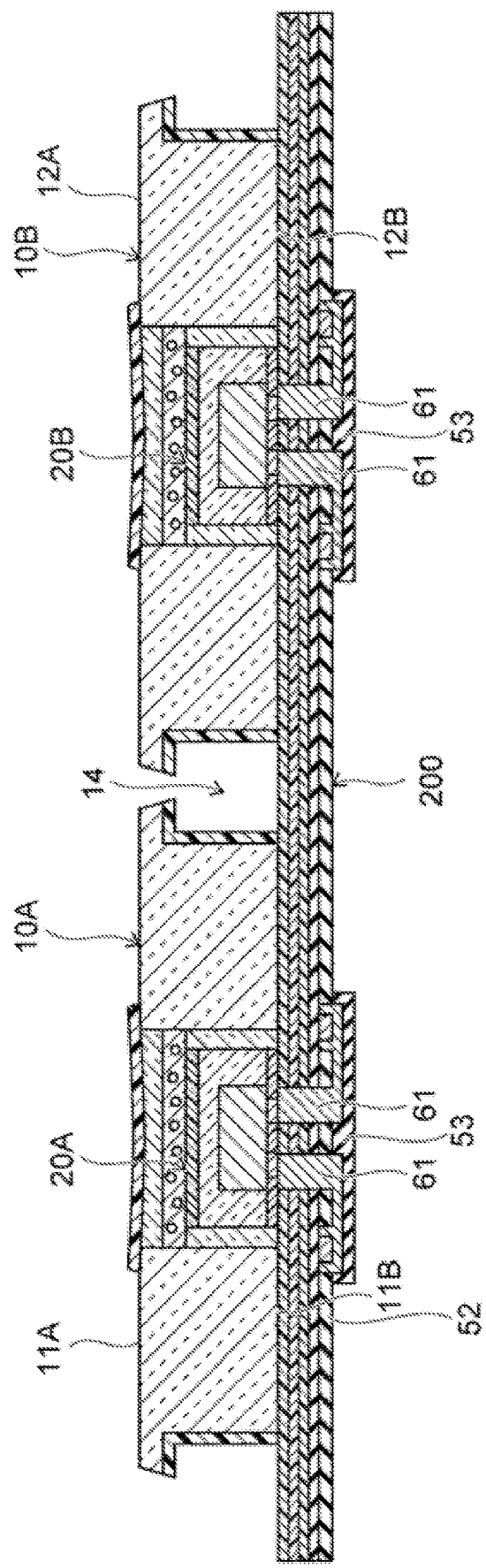
FIG. 20 is a schematic cross-sectional view showing the method of manufacturing the planar light source according to the first embodiment of the present invention.

After forming the second light adjusting members 74, as shown in FIG. 20, an insulation film 53 is formed on the lower face of the support member 200 to cover the connection members 61. The insulation film 53 can be formed by methods, such as printing, potting, spraying, inkjetting, and adhering a resin sheet. Subsequently, the support member 200 is cut into a desired planar size to obtain the planar light source 300 shown in FIG. 2.

Second Embodiment

Figure 21:
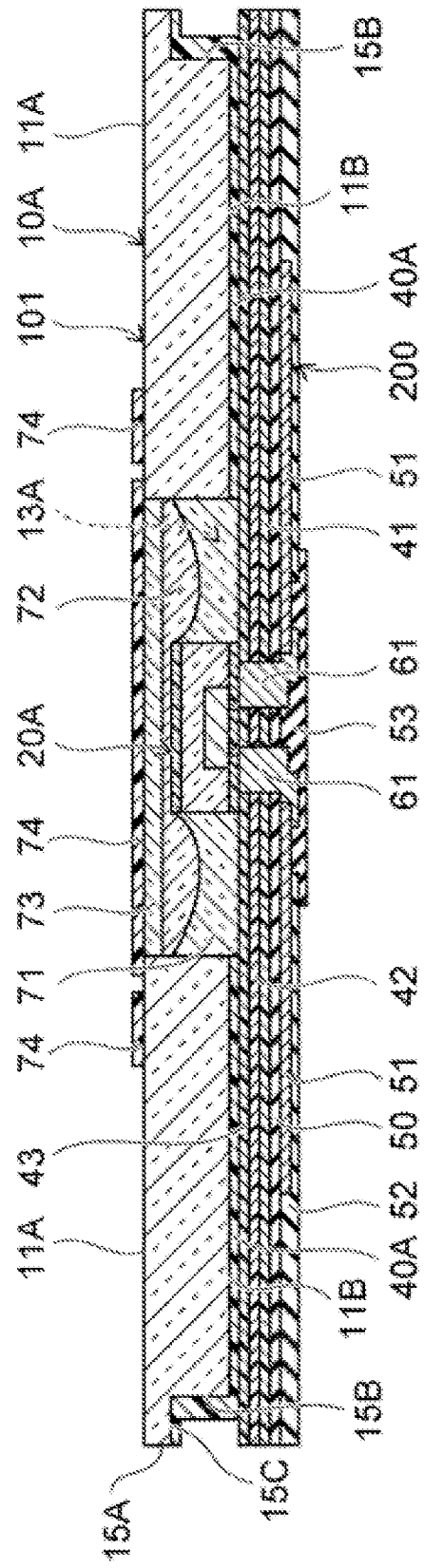
FIG. 21 is a schematic cross-sectional view of a planar light source according to a second embodiment of the present invention.

FIG. 21 is a schematic cross-sectional view of a planar light source according to a second embodiment of the present invention.

The first light guide part 10A, the $1^{st}$ A principal face 11A, the $1^{st}$ B principal face 11B, the first lateral faces 15, the $1^{st}$ A lateral faces 15A, the $1^{st}$ B lateral faces 15B, the $1^{st}$ C lateral faces 15C, the first light reflecting members 40A, the first hole 13A, and the first light source 20A shown in FIG. 21 can be replaced with the second light guide part 10B, the $2^{nd}$ A principal face 12A, the $2^{nd}$ B principal face 12B, the second lateral faces 16, the $2^{nd}$ A lateral faces 16A, the $2^{nd}$ B lateral faces 16B, the $2^{nd}$ C lateral faces 16C, the second light reflecting members 40B, the second hole 13B, and the second light source 20B, respectively.

The first lateral faces 15 of the first light guide part 10A and the second lateral faces 16 of the second light guide part 10B in the second embodiment have similar structure to the first embodiment, and can lessen the luminance decline that can occur along the boundary between two adjacent light guide parts 10A and 10B sectioned by a sectioning groove 14.

In the second embodiment, furthermore, the first light reflecting members 40A disposed on the $1^{st}$ B lateral faces 15B of the first light guide part 10A are extended to the $1^{st}$ B principal face 11B. Similarly, the second light reflecting members 40B disposed on the $2^{nd}$ B lateral faces 16B of the second light guide part 10B are extended to the $2^{nd}$ B principal face 12B. The first light reflecting member 40A and the second light reflecting member 40B disposed on the third light reflecting member 42 can hinder the light propagating through the first light guide part 10A and the second light guide part 10B from reaching and being absorbed by the support member 200.

Figure 22A:
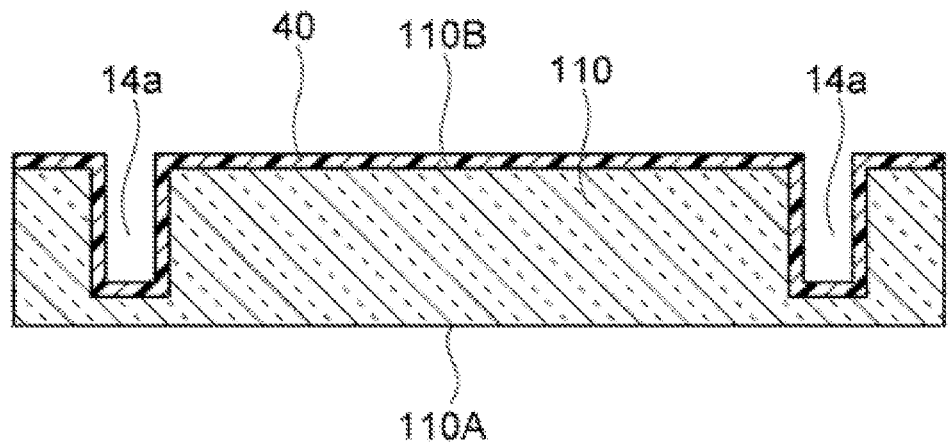
FIG. 22A is a schematic cross-sectional view showing a method of manufacturing a planar light source according to the second embodiment of the present invention.
Figure 22B:
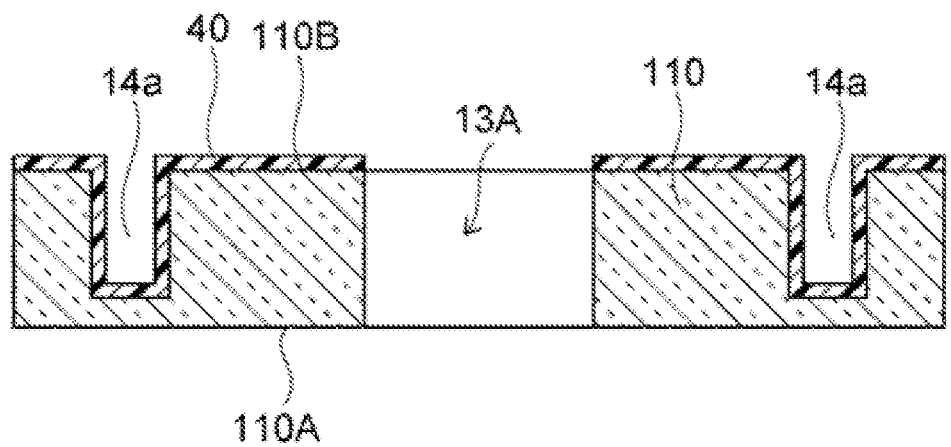
FIG. 22B is a schematic cross-sectional view showing the method of manufacturing the planar light source according to the second embodiment of the present invention.

FIGS. 22A and 22B are schematic cross-sectional views showing a method of manufacturing a planar light source of the second embodiment.

After forming first groove portions 14a in a light guide plate 110, as shown in FIG. 22A, a light reflecting member 40 is disposed continuously on the bottom face and lateral faces of the first groove portions 14a and the second principal face 110B of the light guide plate 110 by, for example, spraying or the like.

Subsequently, as shown in FIG. 22B, a first hole 13A is created in the light guide plate 110. This removes the portion of the light reflecting member 40 on the second principal face 110B where the first hole 13A is located.

Subsequently, the light guide plate 110 is disposed on a support member 200 by adhering the light reflecting member 40 disposed on the second principal face 110B to the second adhesive member 43 of the support member 200. This is followed by the process shown in FIG. 13 onward.

According to the second embodiment, the process can be simplified as compared to the case in which the light reflecting member 40 is selectively formed only in the first groove portions 14a.

Third Embodiment

Figure 23:
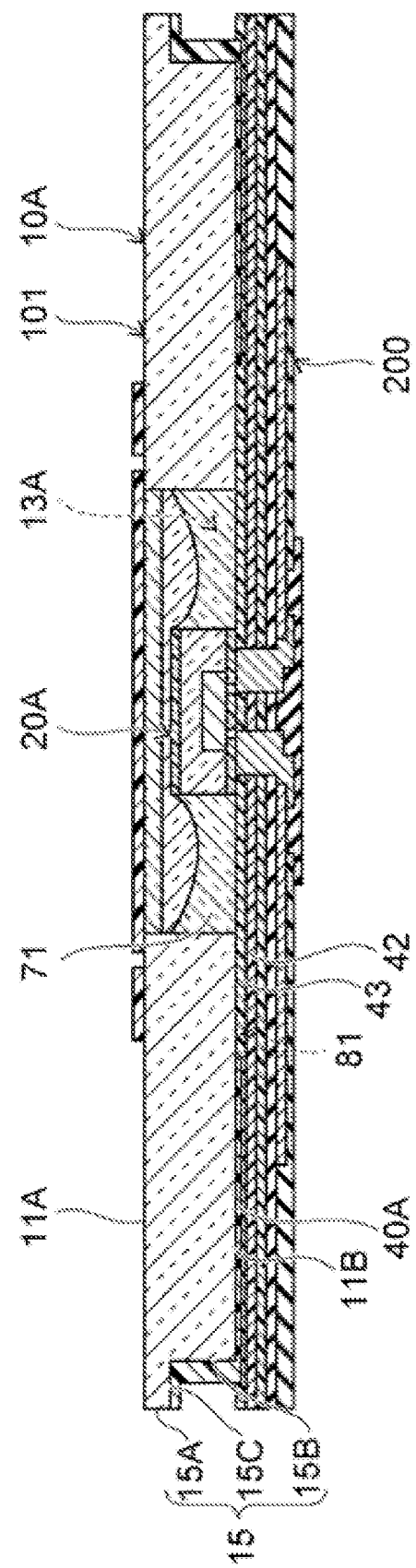
FIG. 23 is a schematic cross-sectional view of a planar light source according to a third embodiment of the present invention.

FIG. 23 is a schematic cross-sectional view of a planar light source according to a third embodiment of the present invention.

Figure 24A:
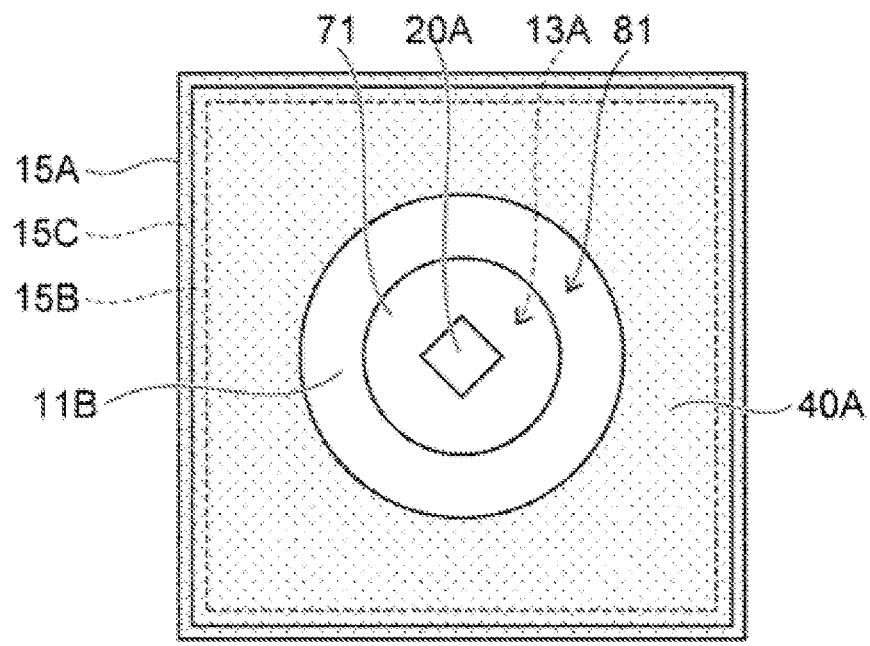
FIG. 24A is a schematic plan view of the B principal face of a light guide part in the planar light source in FIG. 23.
Figure 24B:
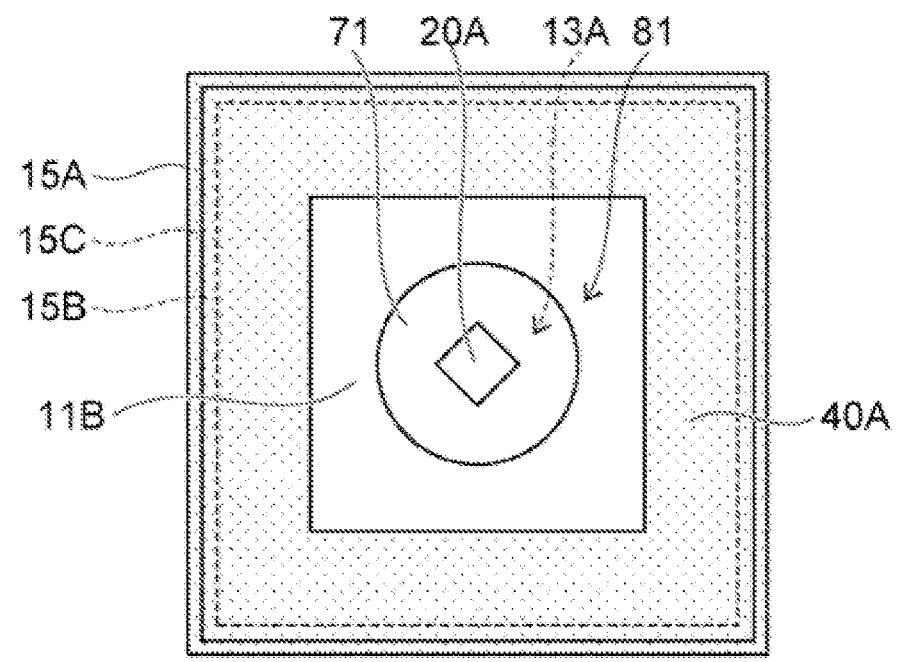
FIG. 24B is a schematic plan view of the B principal face of a light guide part in the planar light source in FIG. 23.

FIGS. 24A and 24B are schematic plan views each showing the $1^{st}$ B principal face 11B of the first light guide part 10A in a planar light source seen through the support member 200.

The first lateral faces 15 of the first light guide part 10A and the second lateral faces 16 of the second light guide part 10B in the third embodiment have similar structure to the first embodiment, and can lessen the luminance decline that can occur along the boundary between two adjacent light guide parts 10A and 10B compartmentalized by a sectioning groove 14.

The third embodiment differs from the second embodiment in that a first opening 81 is created in the first light reflecting member 40A disposed on the $1^{st}$ B principal face 11B in the periphery of the first light source 20A where the first light reflecting member 40A is absent. A second opening 81 is similarly created in the second light reflecting member 40B disposed on the $2^{nd}$ B principal face 12B in the periphery of the second light source 20B where the second light reflecting member 40B is absent.

In FIGS. 24A and 24B, the first light reflecting member 40A is indicated using a dot hatch pattern. The planar shape of the first opening 81 is, for example, a circle as shown in FIG. 24A. The planar shape of the first opening 81 is, for example, a quadrangle as shown in FIG. 24B. The planar shape of the first opening 81 may be an ellipse, or a polygon other than a quadrangle. In a plan view of the $1^{st}$ B principal face 11B of the first light guide part 10A, the first light source 20A and the first hole 13A are located in the first opening 81.

According to the third embodiment, in the area surrounding the first light source 20A, the light advancing towards the $1^{st}$ B principal face 11B is allowed to reach the third light reflecting member 42 through the first opening 81. For example, the diffuse reflectance of the first light reflecting member 40A with respect to the light emitted by the first light source 20A is higher than the diffuse reflectance of the third light reflecting member 42 with respect to the light emitted by the first light source 20A. The specular reflectance of the third light reflecting member 42 with respect to the light emitted by the first light source 20A is higher than the specular reflectance of the first light reflecting member 40A with respect to the light emitted by the first light source 20A. In such a case, the light that reached the third light reflecting member 42 is totally reflected internally by the third light reflecting member 42 and guided through the first light guide part 10A.

The luminance in the area surrounding the first light source 20A tends to be higher than the other areas, and the luminance in the areas near the first lateral faces 15 and the corners tend to be low. According to the third embodiment, by not disposing a high diffuse reflectance first light reflecting member 40A in the area surrounding the first light source 20A, the extraction of the light from the first light source 20A before reaching the first lateral faces 15 and the corners can be reduced. Furthermore, by providing a high specular reflectance third light reflecting member 42 in the area surrounding the first light source 20A, the light from the first light source 20A can be readily guided towards the first lateral faces 15 and the corners. This as a result can reduce the luminance nonuniformity in the light emission face.

Figure 25A:
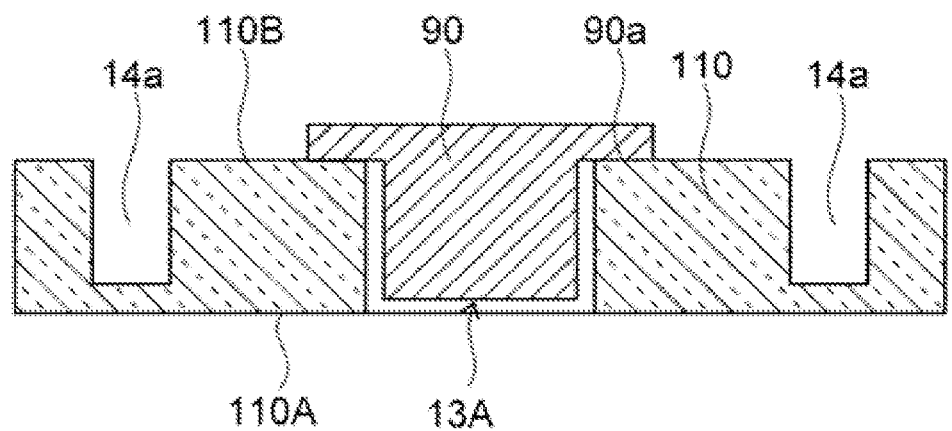
FIG. 25A is a schematic cross-sectional view showing a method of manufacturing a planar light source according to the third embodiment of the present invention.
Figure 25B:
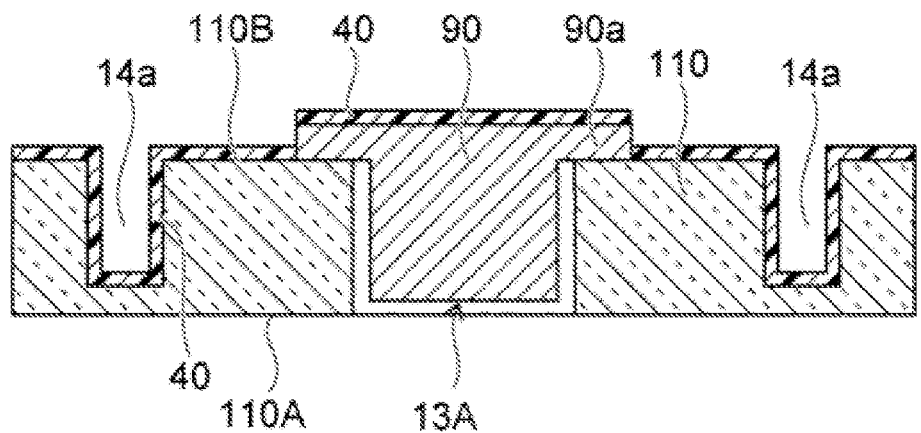
FIG. 25B is a schematic cross-sectional view showing the method of manufacturing the planar light source according to the third embodiment of the present invention.
Figure 25C:
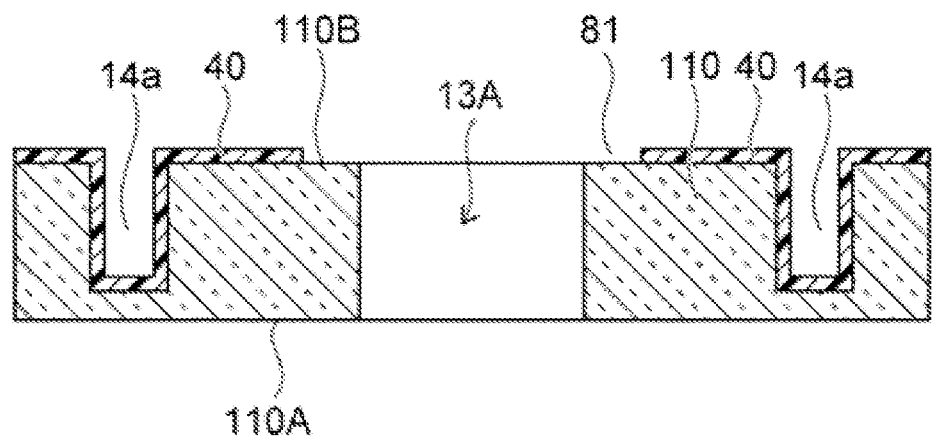
FIG. 25C is a schematic cross-sectional view showing the method of manufacturing the planar light source according to the third embodiment of the present invention.

FIGS. 25A to 25C are schematic cross-sectional views showing a method of manufacturing a planar light source according to the third embodiment.

After forming first groove portions 14a and a first hole 13A in a light guide plate 110, as shown in FIG. 25A, a tool 90 is inserted in the first hole 13A. A part 90a of the tool 90 is positioned on the outside of the first hole 13A to cover the second principal face 110B around the first hole 13A.

In this state, as shown in FIG. 25B, a light reflecting member 40 is formed on the bottom and lateral faces of the first groove portions 14a and the second principal face 110B not covered by the tool 90. The light reflecting member 40 is also formed on the upper face of the tool 90.

By removing the tool 90 from the first hole 13A, as shown in FIG. 25C, the light reflecting member 40 having a first opening 81 in the area of the second principal face 11B around the first hole 13A in which the light reflecting member 40 is not disposed can be obtained.

Subsequently, the light guide plate 110 is disposed on a support member 200 by adhering the light reflecting member 40 disposed on the second principal face 110B to the second adhesive member 43 of the support member 200. This is followed by the process shown in FIG. 13 onward.

FIGS. 26A to 26K are schematic cross-sectional views showing examples of the cross-sectional shape of a sectioning groove 14 in the planar light source according to the respective embodiments.

In each of the examples shown in FIGS. 26A to 26F, the $1^{st}$ B lateral face 15B and the $2^{nd}$ B lateral face 16B are perpendicular to the principal faces 11A, 11B, 12A, and 12B of the light guide parts 10A and 10B. In each of the examples shown in FIGS. 26A to 26D, the $1^{st}$ C lateral face 15C and the $2^{nd}$ C lateral face 16C are in parallel with the principal faces 11A, 11B, 12A, and 12B.

Figure 26A:
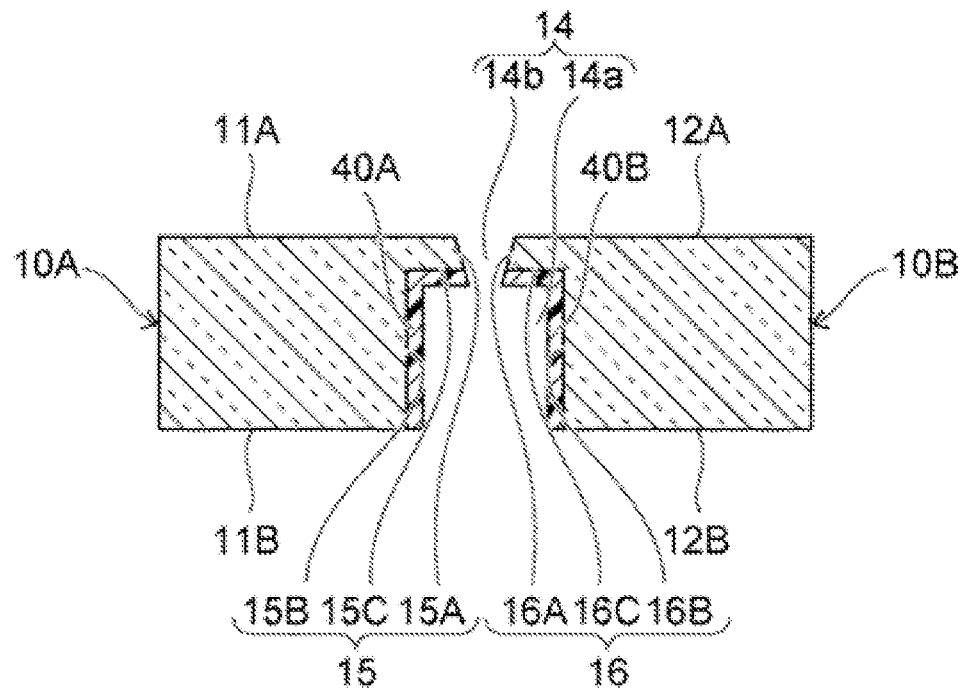
FIG. 26A is a schematic cross-sectional view of an example of the cross-sectional shape of a sectioning groove in the planar light source of an embodiment of the present invention.

In the example shown in FIG. 26A, the $1^{st}$ A lateral face 15A and the $2^{nd}$ A lateral face 16A are oblique to the principal faces 11A, 11B, 12A, and 12B. The $1^{st}$ A principal face 11A and the $1^{st}$ A lateral face 15A are continuous while forming an obtuse angle. The $2^{nd}$ A principal face 12A and the $2^{nd}$ A lateral face 16A are continuous while forming an obtuse angle. The width of the second groove portion 14b gradually decreases from the A principal faces 11A and 12A towards the B principal faces 11B and 12B, and the light exiting the $1^{st}$ A lateral face 15A and the $2^{nd}$ A lateral face 16A is refracted upwards to be extracted. This can lessen the luminance decline in the vicinity of the sectioning groove 14.

Figure 26B:
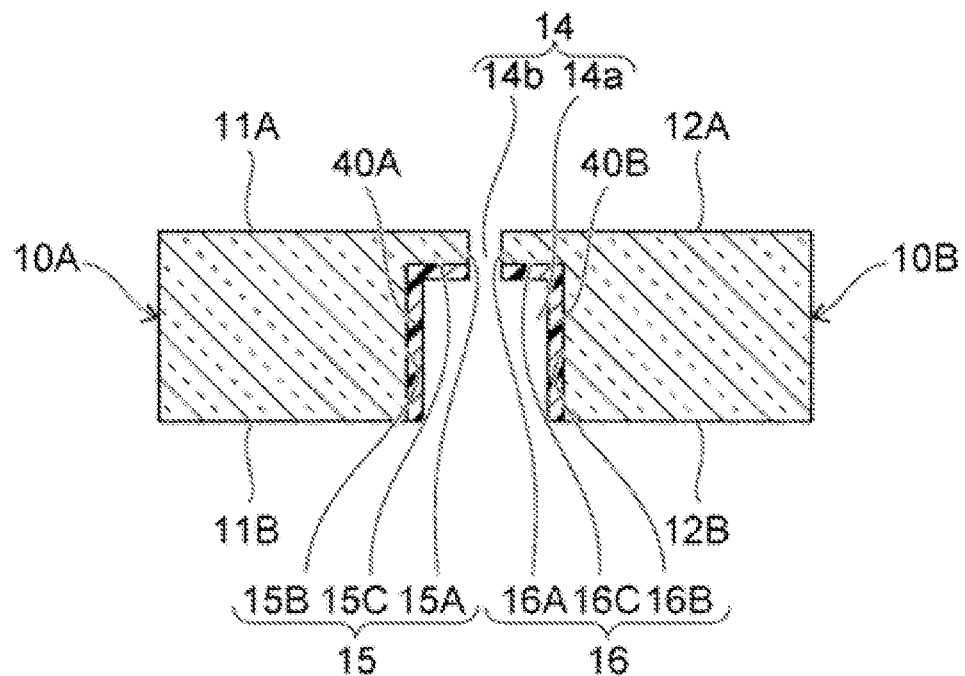
FIG. 26B is a schematic cross-sectional view of an example of the cross-sectional shape of a sectioning groove in the planar light source of an embodiment of the present invention.

As shown in FIG. 26B, the $1^{st}$ A lateral face 15A and the $2^{nd}$ A lateral face 16A can be perpendicular to the principal faces 11A, 11B, 12A, and 12B. This can facilitate the propagation of light between the $1^{st}$ A lateral face 15A and the $2^{nd}$ A lateral face 16A.

Figure 26C:
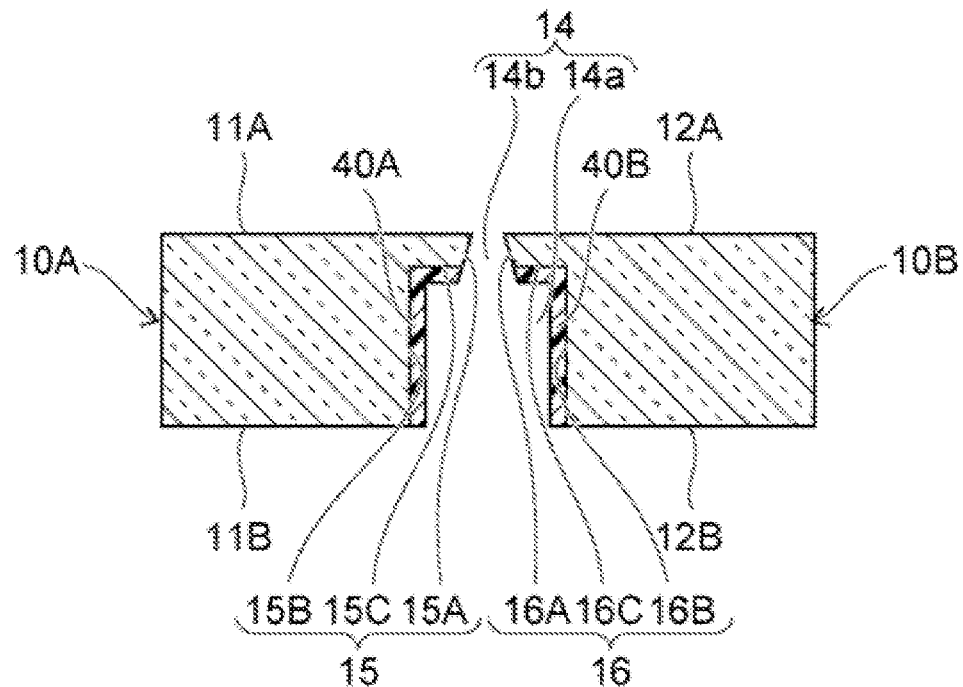
FIG. 26C is a schematic cross-sectional view of an example of the cross-sectional shape of a sectioning groove in the planar light source of an embodiment of the present invention.

In the example shown in FIG. 26C, the $1^{st}$ A principal face 11A and the $1^{st}$ A lateral face 15A are continuous while forming an acute angle. The $2^{nd}$ A principal face 12A and the $2^{nd}$ A lateral face 16A are continuous while forming an acute angle. The width of the second groove portion 14b gradually increases from the A principal faces 11A and 12A towards the B principal faces 11B and 12B to facilitate the propagation of the light entering the $1^{st}$ A lateral face 15A and the $2^{nd}$ A lateral face 16A in the direction parallel to the A principal faces 11A and 12A.

Figure 26D:
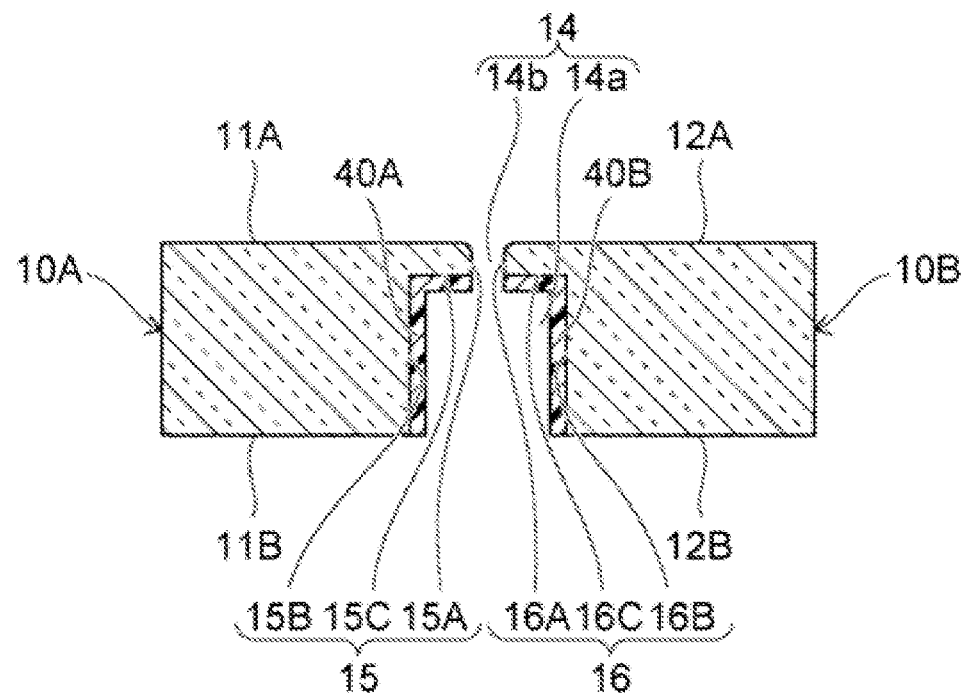
FIG. 26D is a schematic cross-sectional view of an example of the cross-sectional shape of a sectioning groove in the planar light source of an embodiment of the present invention.

In the example shown in FIG. 26D, the corner formed by the $1^{st}$ A principal face 11A and the $1^{st}$ A lateral face 15A is a curved face. The corner formed by the $2^{nd}$ A principal face 12A and the $2^{nd}$ A lateral face 16A is also a curved face. This can facilitate the extraction of light from the corners, thereby lessening the luminance decline in the vicinity of the sectioning groove 14.

Figure 26E:
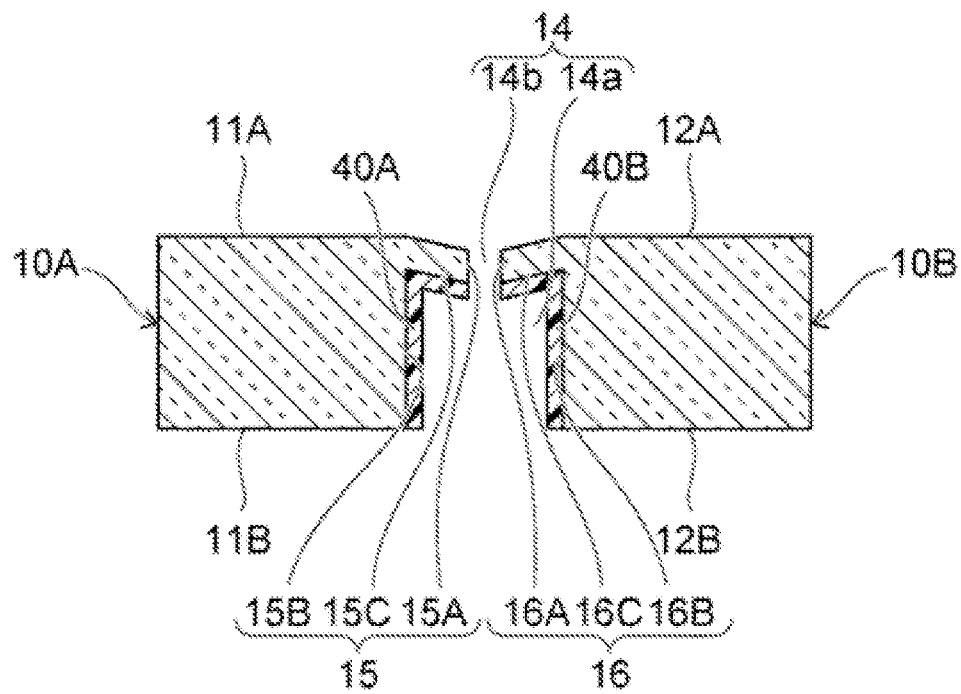
FIG. 26E is a schematic cross-sectional view of an example of the cross-sectional shape of a sectioning groove in the planar light source of an embodiment of the present invention.

In the example shown in FIG. 26E, the $1^{st}$ C lateral face 15C and the $2^{nd}$ C lateral face 16C are oblique to the principal faces 11A, 11B, 12A, and 12B. This allows a portion of the light propagating through the light guide part 10A towards the $1^{st}$ A lateral face 15A and a portion of the light propagating through the light guide part 10B towards the $2^{nd}$ A lateral face 16A to be reflected towards the second groove portion 14b. This can lessen the luminance decline in the vicinity of the sectioning groove 14. The $1^{st}$ B lateral face 15B and the $1^{st}$ C lateral face 15C are continuous while forming an acute angle. The $2^{nd}$ B lateral face 16B and the $2^{nd}$ C lateral face 16C are continuous while forming an acute angle. The portion of the $1^{st}$ A principal face 11A located opposite to the $1^{st}$ C lateral face 15C is also oblique in a similar manner to the $1^{st}$ C lateral face 15C. The portion of the $2^{nd}$ A principal face 12A located opposite to the $2^{nd}$ C lateral face 16C is also oblique in a similar manner to the $2^{nd}$ C lateral face 16C. The oblique faces located opposite to the $1^{st}$ C lateral face 15C and the $2^{nd}$ C lateral face 16C allow the light exiting the oblique faces located opposite to the $1^{st}$ C lateral face 15C and the $2^{nd}$ C lateral face 16C to be refracted upwards to be extracted. This can lessen the luminance decline in the vicinity of the sectioning groove 14.

Figure 26F:
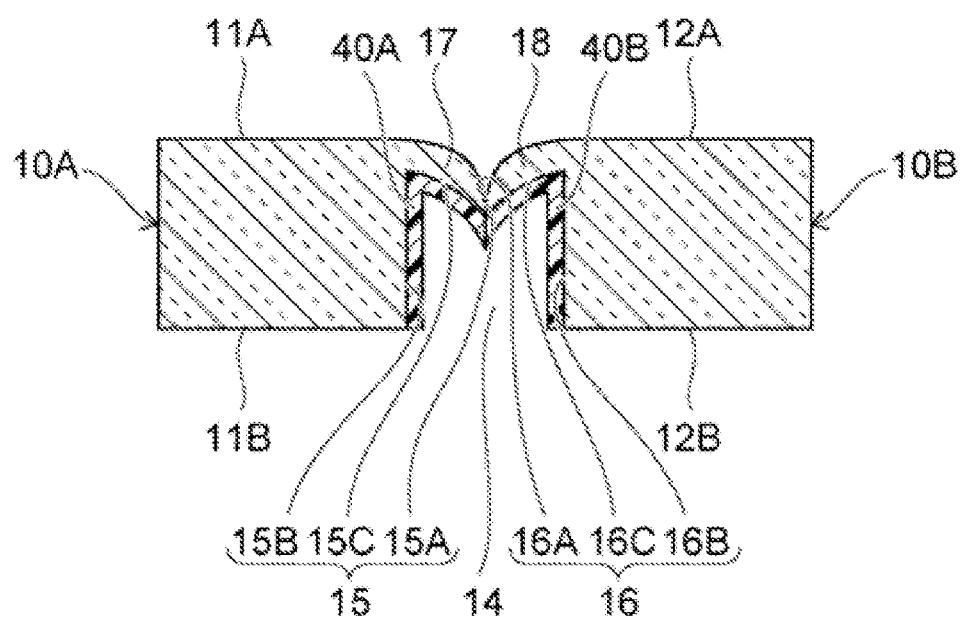
FIG. 26F is a schematic cross-sectional view of an example of the cross-sectional shape of a sectioning groove in the planar light source of an embodiment of the present invention.

In the example shown in FIG. 26F, the $1^{st}$ C lateral face 15C and the face located opposite to the $1^{st}$ C lateral face 15C are oblique to the principal faces 11A and 11B. The $2^{nd}$ C lateral face 16C and the face located opposite to the $2^{nd}$ C lateral face 16C are also oblique to the principal faces 12A and 12B. Furthermore, in this example, at least the $1^{st}$ C lateral face 15C, the face located opposite to the $1^{st}$ C lateral face 15C, the $2^{nd}$ C lateral face 16C, and the face located opposite to the $2^{nd}$ C lateral face 16C are curved faces. Particularly, making the faces located opposite to the $1^{st}$ C lateral face 15C and the $2^{nd}$ C lateral face 16C curved faces can refract a portion of the light propagating through the light guide parts 10A and 10B towards the sectioning groove 14 so as to spread before being extracted. This can lessen the luminance decline in the vicinity of the sectioning groove 14.

The $1^{st}$ A lateral face 15A and the $2^{nd}$ A lateral face 16A are in contact with one another at least in part, which can facilitate the propagation of light between the $1^{st}$ A lateral face 15A and the $2^{nd}$ A lateral face 16A. Other than the $1^{st}$ A lateral face 15A and the $2^{nd}$ A lateral face 16A being in contact with each other such as in this example, the $1^{st}$ A lateral face 15A can be in contact with the face located opposite to the $2^{nd}$ C lateral face 16C, and the $2^{nd}$ A lateral face 16A can be in contact with the face located opposite to the $1^{st}$ C lateral face 15C.

In the thickness direction of the first light guide part 10A, the distance between the $1^{st}$ C lateral face 15C and the face located opposite to the $1^{st}$ C lateral face 15C becomes smaller as the distance to the $1^{st}$ A lateral face 15A decreases. In other words, the thickness of the first protruded part 17 in the thickness direction of the first light guide part 10A becomes smaller as the distance to the sectioning groove 14 decreases. The distance between the $2^{nd}$ C lateral face 16C and the face located opposite to the $2^{nd}$ C lateral face 16C also becomes smaller as the distance to the $2^{nd}$ A lateral face 16A decreases. In other words, the thickness of the second protruded part 18 in the thickness direction of the second light guide part 10B becomes smaller as the distance to the sectioning groove 14 decreases. Because the thicknesses of the first protruded part 17 and the second protruded part 18 become smaller towards the sectioning groove 14, a portion of the light propagating through the first light guide part 10A towards the $1^{st}$ A lateral face 15A and a portion of the light propagating through the light guide part 10B towards the $2^{nd}$ A lateral face 16A can be readily extracted from the faces located opposite to the first lateral face 15C and the $2^{nd}$ C lateral face 16C. This can lessen the luminance decline in the vicinity of the sectioning groove 14.

Figure 26G:
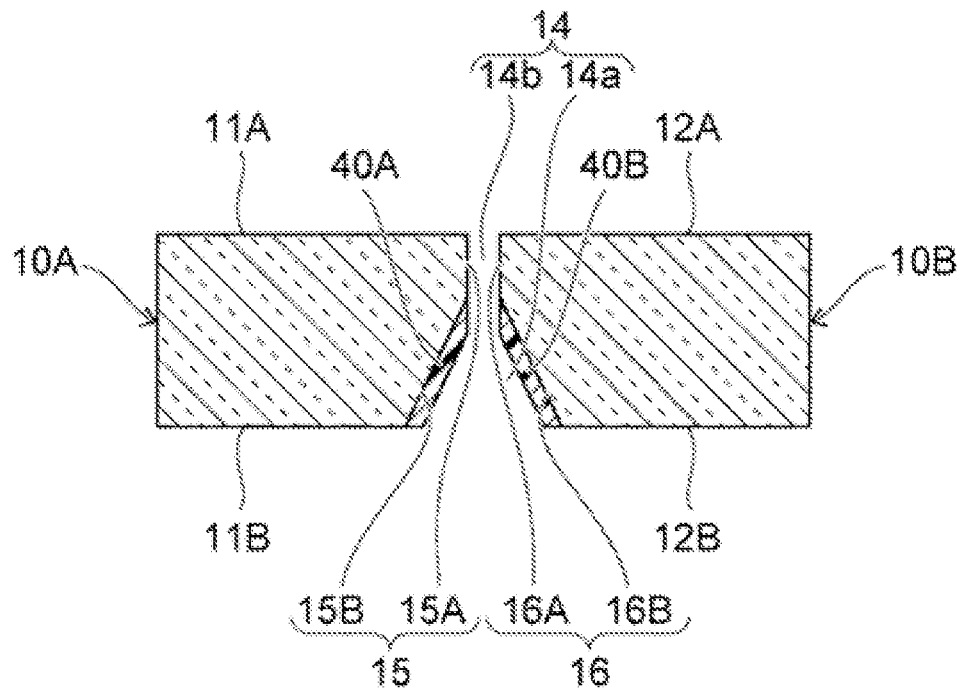
FIG. 26G is a schematic cross-sectional view of an example of the cross-sectional shape of a sectioning groove in the planar light source of an embodiment of the present invention.

In the example shown in FIG. 26G, the $1^{st}$ B lateral face 15B and the $2^{nd}$ B lateral face 16B are oblique to the principal faces 11A, 11B, 12A, and 12B. The width of the first groove portion 14a defined by the $1^{st}$ B lateral face 15B and the $2^{nd}$ B lateral face 16B gradually increases from the second groove portion 14b towards the B principal faces 11B and 12B. This allows a portion of the light propagating through the light guide parts 10A and 10B towards the sectioning groove 14 to be reflected towards the A principal faces 11A and 12A to be extracted therethrough. This can lessen the luminance decline in the vicinity of the sectioning groove 14. The $1^{st}$ A lateral face 15A and the $2^{nd}$ A lateral face 16A are perpendicular to the principal faces 11A, 11B, 12A, and 12B, and can facilitate the propagation of light between the $1^{st}$ A lateral face 15A and the $2^{nd}$ A lateral face 16A. In this embodiment, the lateral face 15 has no stepped part between the $1^{st}$ A lateral face 15A and the $1^{st}$ B lateral face 15B, and the lateral face 16 has no stepped part between the $2^{nd}$ A lateral face 16A and the $2^{nd}$ B lateral face 16B.

Figure 26H:
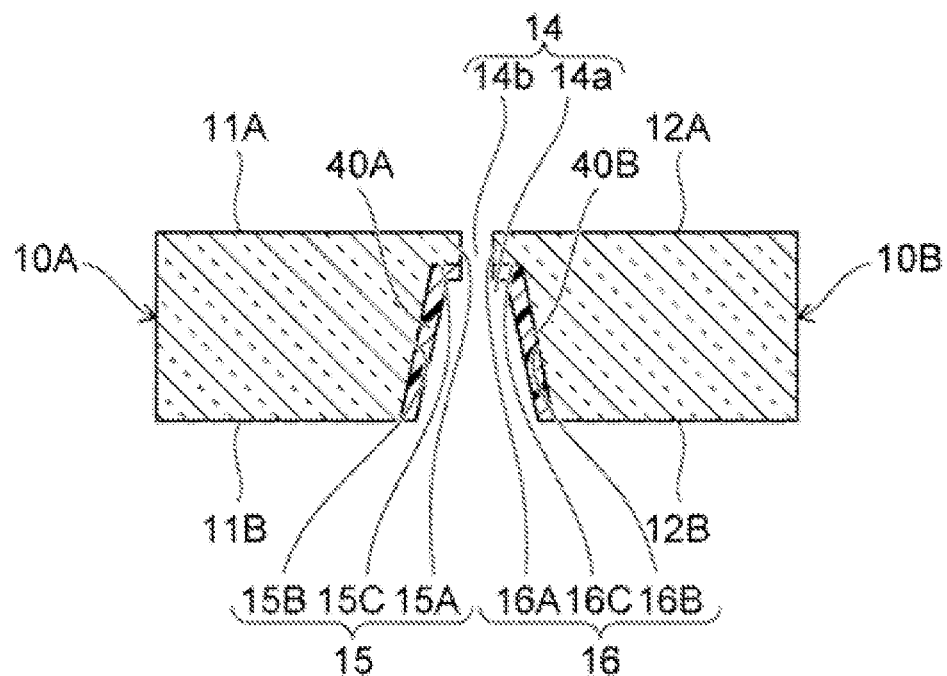
FIG. 26H is a schematic cross-sectional view of an example of the cross-sectional shape of a sectioning groove in the planar light source of an embodiment of the present invention.

The structure shown in FIG. 26H corresponds to the structure shown in FIG. 26G in which the $1^{st}$ C lateral face 15C is located between the $1^{st}$ A lateral face 15A and the $1^{st}$ B lateral face 15B, and the $2^{nd}$ C lateral face 16C is located between the $2^{nd}$ A lateral face 16A and the $2^{nd}$ B lateral face 16B. Having the $1^{st}$ C lateral face 15C and the $2^{nd}$ C lateral face 16C can readily reflect a portion of the light propagating between the $1^{st}$ A lateral face 15A and the $2^{nd}$ A lateral face 16A towards the A principal faces 11A and 12A, further lessening the luminance decline in the vicinity of the sectioning groove 14.

Figure 26I:
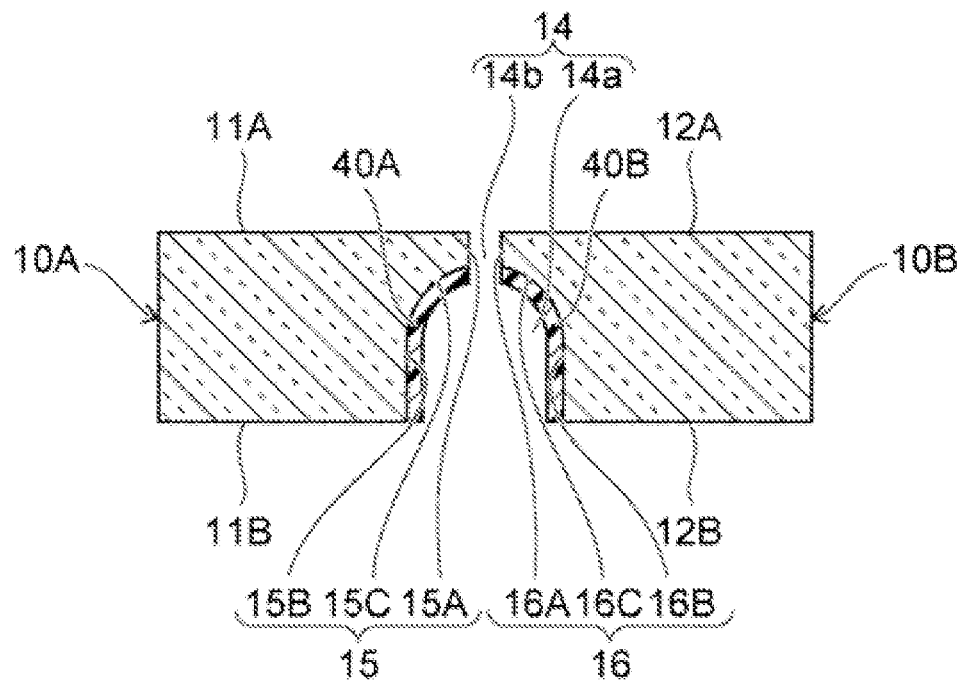
FIG. 26I is a schematic cross-sectional view of an example of the cross-sectional shape of a sectioning groove in the planar light source of an embodiment of the present invention.
Figure 26J:
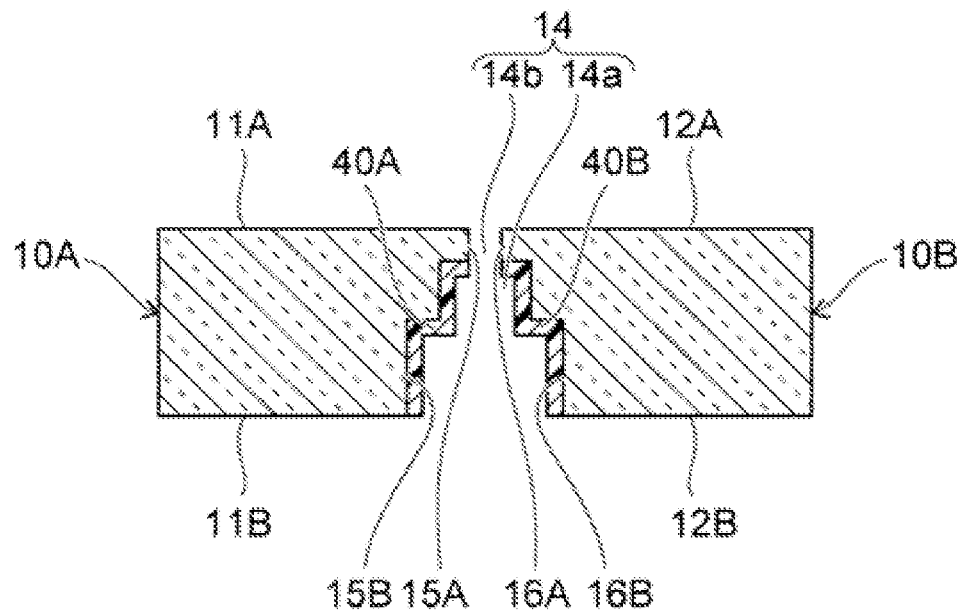
FIG. 26J is a schematic cross-sectional view of an example of the cross-sectional shape of a sectioning groove in the planar light source of an embodiment of the present invention.

In the example shown in FIG. 26I, the first groove portion 14a has an inverse U shaped cross section where the $1^{st}$ C lateral face 15C and the $2^{nd}$ C lateral face 16C are curved faces. The light propagating through the light guide parts 10A and 10B towards the sectioning groove 14 can be scattered when reflected by the curved faces. This can decrease the light that is totally reflected internally by the A principal faces 11A and 12A, thereby increasing the amount of the light extracted to the outside and lessening the luminance decline in the vicinity of the sectioning groove 14.

There may be multiple stepped parts between the $1^{st}$ A lateral face 15A and the $1^{st}$ B lateral face 15B, and between the $2^{nd}$ A lateral face 16A and the $2^{nd}$ B lateral face 16B. In the example shown in FIG. 26J, two stepped parts are provided between the $1^{st}$ A lateral face 15A and the $1^{st}$ B lateral face 15B, and other two stepped parts are provided between the $2^{nd}$ A lateral face 16A and the $2^{nd}$ B lateral face 16B. Providing multiple stepped parts in this manner can facilitate the scattering of the light propagating through the light guide parts 10A and 10B towards the sectioning groove 14. This can reduce the amount of the light totally reflected by the A principal faces 11A and 12A to thereby increase the amount of the light being extracted. This can lessen the luminance decline in the vicinity of the sectioning groove 14.

The embodiments described above are examples in which the $1^{st}$ A lateral face 15A is continuous with the $1^{st}$ A principal face 11A, the $1^{st}$ B lateral face 15B is continuous with the $1^{st}$ B principal face 11B, the $2^{nd}$ A lateral face 16A is continuous with the $2^{nd}$ A principal face 12A, and the $2^{nd}$ B lateral face 16B is continuous with the $2^{nd}$ B principal face 12B.

Figure 26K:
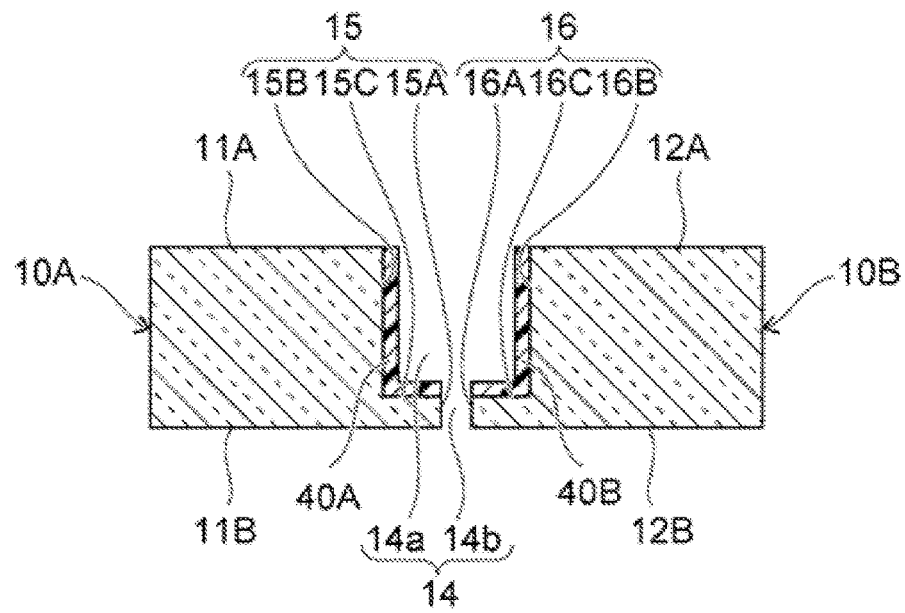
FIG. 26K is a schematic cross-sectional view of an example of the cross-sectional shape of a sectioning groove in the planar light source of an embodiment of the present invention.

As shown in FIG. 26K, conversely, the $1^{st}$ A lateral face 15A may be continuous with the $1^{st}$ B principal face 11B, the $1^{st}$ B lateral face 15B continuous with the $1^{st}$ A principal face 11A, the $2^{nd}$ A lateral face 16A continuous with the $2^{nd}$ B principal face 12B, and the $2^{nd}$ B lateral face 16B continuous with the $2^{nd}$ A principal face 12A. In other words, the second groove portion 14b formed between the $1^{st}$ A lateral face 15A and the $2^{nd}$ A lateral face 16A is located between a support member 200 and a first groove portion 14a. The first groove portion 14a is open on the $2^{nd}$ A principal face 11A and the $2^{nd}$ A principal face 12A side.

In this case, after disposing a light guide plate 110 on a support member 200, the second groove portion 14b is formed by inserting a cutting tool in the first groove portion 14a to cut the portion of the light guide plate 110 connected under the first groove portion 14a.

The inside of the first groove portion 14a may be filled with the light reflecting members 40A and 40B. In this case, however, because the $1^{st}$ B lateral face 15B of the first light guide part 10A and the $2^{nd}$ B lateral face 16B of the second light guide part 10B are connected to each other via the light reflecting members 40A and 40B that fill the first groove portion 14a, the light guide member might warp. Accordingly, it is preferable to provide a space (air layer) between the $1^{st}$ B lateral face 15B and the $2^{nd}$ B lateral face 16B.

The sectioning groove 14 shown in FIG. 26K corresponds to a structure obtained by turning the sectioning groove 14 shown in FIG. 26B upside down. In addition, any of the sectioning groove 14 shown in the other drawings, FIGS. 26A and 26C to 26J, turned upside down can be applied to the planar light source of this embodiment. Even in these cases, the amount of the light propagating between the adjacent light guide parts 10A and 10B sectioned by the sectioning groove 14 can be adjusted by changing the cross-sectional shape of the sectioning groove 14 and the percent distribution of the light reflecting members 40 disposed on the first lateral face 15 and the second lateral face 16.

Fourth Embodiment

Figure 27:
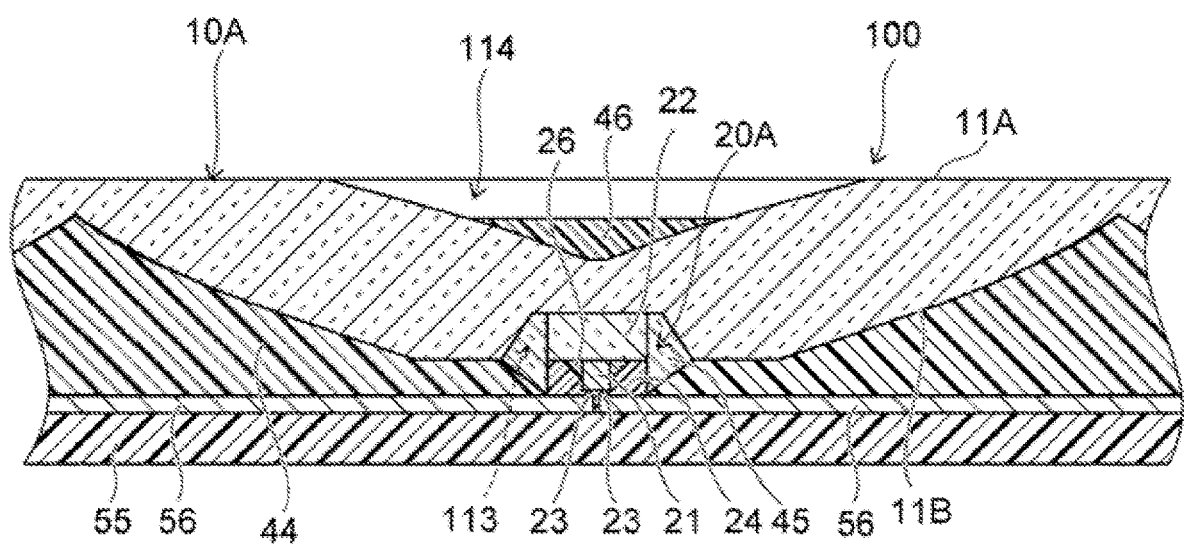
FIG. 27 is a schematic cross-sectional view of the portion of a planar light source according to a fourth embodiment of the present invention where a light source is disposed.

FIG. 27 is a schematic cross-sectional view of the portion of the planar light source according to a fourth embodiment of the present invention where a first light source 20A is disposed and the surrounding portion.

The first light guide part 10A, the $1^{st}$ A principal face 11A, the $1^{st}$ B principal face 11B, and the first light source 20A shown in FIG. 27 can be replaced with the second light guide part 10B, the $2^{nd}$ A principal face 12A, the $2^{nd}$ B principal face 12B, and the second light source 20B, respectively.

The first light source 20A includes a light emitting element 21, a first light transmissive member 22, a cover member 24, an adhesive member 26, and electrodes 23. The cover member 24 is disposed on the lateral faces and the lower face of the light emitting element 21. The first light transmissive member 22 is disposed on the light emitting element 21 and the cover member 24. The light emitting element 21 is adhered to the first light transmissive member 22 by using the light transmissive adhesive member 26. The cover member 24 covers the lateral faces and the lower faces of the adhesive member 26 and the light emitting element 21. The lower faces of the electrodes 23 are exposed from the cover member 24.

The first light guide part 10A has, as the first hole, a first recess 113 that is open on the first principal face 11B side. In this embodiment, the first recess 113 is a truncated cone shaped space, but can be a truncated polygonal pyramid shaped space, such as a truncated square pyramid, truncated hexagonal pyramid, or the like. The first light source 20A is disposed in the first recess 113. A third light transmissive member 45 is disposed between the lateral face of the first recess 113 and the lateral faces of the first light source 20A. The third light transmissive member 45, for example, is a resin member having light transmissivity with respect to the light emitted by the first light source 20A.

A second recess 114 is formed in the first light guide part 10A on the $1^{st}$ A principal face 11A side at the position that opposes the first recess 113. The second recess 114 can have, for example, a conical shape, a polygonal pyramid shape, such as a square pyramid, hexagonal pyramid, or the like, a truncated conical shape, a truncated polygonal pyramidal shape, such as a truncated square pyramid, truncated hexagonal pyramid, or the like. A light adjusting member 46 is disposed in the second recess 114. The light adjusting member 46 is constructed in a similar manner as the light adjusting member 74 described earlier.

A light reflecting member 44 is disposed on the $1^{st}$ B principal face 11B of the first light guide part 10A. The light reflecting member 44, for example, is a resin member containing a light diffusing agent. The light reflecting member 44 is also disposed on the lower face of the third light transmissive member 45.

The light emitting module 100 further includes a wiring layer 56 in addition to the constituents described above. The wiring layer 56 is disposed on the lower face of the light reflecting member 44 and the lower face of the cover member 24. A pair of wiring layers 56 is disposed in correspondence with the pair of positive and negative electrodes 23 of the first light source 20A, each wiring layer 56 being connected to an electrode 23. A wiring substrate 55 is adhered to the wiring layers 56.

Some of the light guide parts in the light emitting module 100 have peripheral portions not adjacent to other light guide parts via sectioning groove 14. In the peripheral portions, light reflecting members may be disposed also on the $1^{st}$ A lateral faces 15A and the $2^{nd}$ A lateral faces 16A. For example, in FIG. 2, a light reflecting member may be disposed on the $1^{st}$ A lateral face 15A in the peripheral portion at the left edge of the first light guide part 10A, and on the $2^{nd}$ A lateral face 16A in the peripheral portion at the right edge of the second light guide part 10B.

Figure 28A:
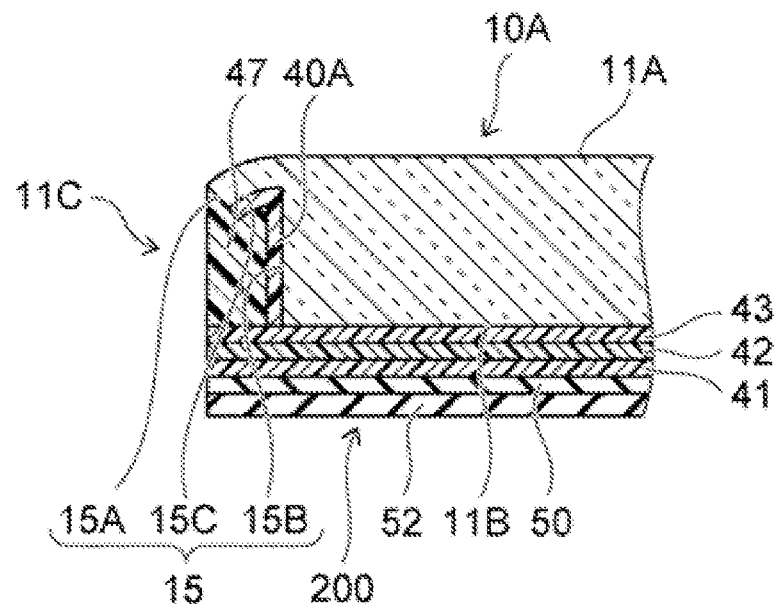
FIG. 28A is a schematic cross-sectional view of an example of a peripheral portion of a planar light source according to an embodiment of the present invention.

FIG. 28A is a schematic cross-sectional view of an example of the peripheral portion 11C of, for example, a first light guide part 10A. In the peripheral portion 11C, the first light reflecting member 40A described earlier is disposed on the $1^{st}$ B lateral face 15B and the $1^{st}$ C lateral face 15C. Furthermore, a light reflecting member 47 (hereinafter referred to as the fourth light reflecting member 47) is disposed on the $1^{st}$ A lateral face 15A. In other words, the fourth light reflecting member 47 is disposed on the support member 200 so as to cover the $1^{st}$ A lateral face 15A and the first light reflecting member 40A. In a plan view, the support member 200 extends outward from the $1^{st}$ B lateral face 15B so as to overlap the $1^{st}$ A lateral face 15A and the $1^{st}$ C lateral face 15C. At the extended portion of the support member 200, the fourth light reflecting member 47 is disposed on the second adhesive member 43, which is the uppermost layer of the support member 200. The material for the fourth light reflecting member 47 can be the same as that of the first light reflecting member 40A.

For example, at the first lateral face 15 of a first light guide part 10A adjacent to a second light guide part 10B (the first lateral face 15 on the right side of the first light guide part 10A in FIG. 2), a portion of the light from the first light source 20A in the first light guide part 10A that has advanced towards the first lateral face 15 is diffuse reflected by the first light reflecting member 40A disposed on the first lateral face 15 and returns to the first light guide part 10A. Furthermore, a portion of the light from the first light source 20A that has advanced towards the first lateral face 15 and transmitted through the first light reflecting member 40A is diffuse reflected by the second light reflecting member 40B disposed on the second lateral face 16 of the adjacent second light guide part 10B and returns to the first guide part 10A. In other words, the area of a light guide part near the lateral face that is adjacent to another light guide part receives the light that returns from the light reflecting members 40A and 40B.

As shown in FIG. 28A, in the peripheral portion 11C not adjacent to any light guide part, the two light reflecting members, i.e., the first light reflecting member 40A and the fourth light reflecting member 47, can also reflect some light back to the first light guide part 10A. This can reduce the luminance variation between the area near the first lateral face 15 of the first light guide part 10A where is adjacent to the second light guide part 10B and the area in the peripheral portion 11C that is not adjacent to any light guide part.

Figure 28B:
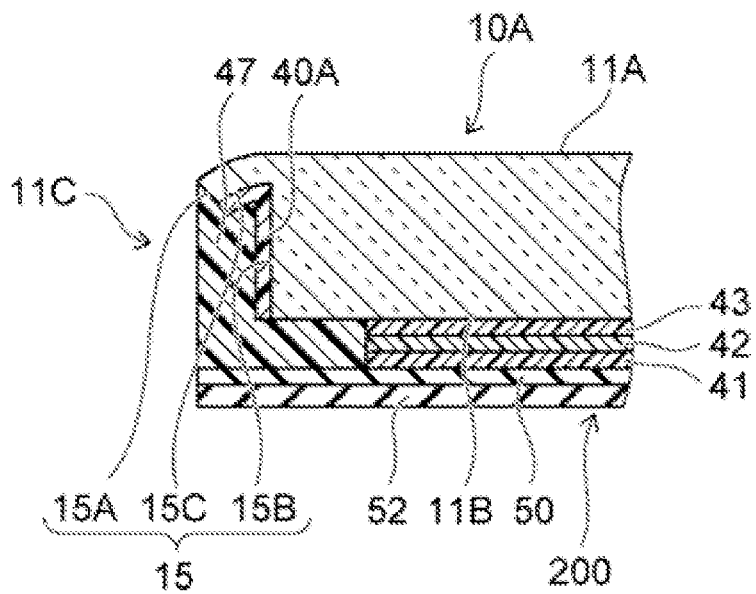
FIG. 28B is a schematic cross-sectional view of an example of a peripheral portion of a planar light source according to an embodiment of the present invention.

As shown in FIG. 28B, in the peripheral portion 11C, the ends of the first adhesive member 41, the third light reflecting member 42, and the second adhesive member 43 can be positioned closer to the first light source 20A than the $1^{st}$ B lateral face 15B of the first light guide part 10A is. This positions a portion of the fourth light reflecting member 47 between the wiring substrate 50 and a portion of the $1^{st}$ B principal face 11B of the first light guide part 10A where is exposed from the first adhesive member 41, the third light reflecting member 42, and the second adhesive member 43.

Covering the ends of the first adhesive member 41 and the second adhesive member 43 with the fourth light reflecting member 47 so as not to be exposed from the planar light source can hinder dust from adhering to the ends of the first adhesive member 41 and the second adhesive member 43. This can also hinder the light from leaking from the ends of the first adhesive member 41, the third light reflecting member 42, and the second adhesive member 43.

FIG. 29 is a schematic cross-sectional view of an example of the peripheral portion 12C of, for example, a second light guide part 10B.

As shown in FIG. 1, the planar light source 300 in a plan view is a square having four sides, and the wiring substrate 50 is also a square having four sides in a plan view. A terminal part 400 for connecting an external circuit to the wiring layer of the wiring substrate 50 is provided in the vicinity of one of the sides of the wiring substrate 50, for example. The peripheral portion 12C of the second light guide part 10B is positioned near the side of the wiring substrate 50 where the terminal part 400 is provided.

In the peripheral portion 12C, the second light reflecting member 40B described earlier is disposed on the $2^{nd}$ B lateral face 16B and the $2^{nd}$ C lateral face 16C. Furthermore, a light reflecting member 48 (hereinafter referred to as the fifth light reflecting member 48) is disposed on the $2^{nd}$ A lateral face 16A. The fifth light reflecting member 48 is disposed on the wiring substrate 50 and covers the $2^{nd}$ A lateral face 16A and the second light reflecting member 40B. The material for the fifth light reflecting member 48 can be the same as that of the second light reflecting member 40B.

In the peripheral portion 11C shown in FIG. 28A or 28B, the fourth light reflecting member 47 and the support member 200 can be provided such that their end faces are aligned, i.e., coplanar. This can be accomplished by cutting the fourth light reflecting member 47 and the support member 200 together. In contrast, as shown in FIG. 29, at the peripheral portion 12C, the wiring substrate 50 and the insulation film 52 extend out from the second lateral face 16, and the terminal part 400 is disposed on the extended part of the wiring substrate 50. Accordingly, the wiring substrate 50 cannot be cut on the outside of the second lateral face 16. As such, the fifth light reflecting member 48 formed on the second lateral face 16 is not cut, either. The fifth light reflecting member 48 is formed by supplying a resin with fluidity onto the wiring substrate 50 and hardened as is. Accordingly, the fifth light reflecting member 48 has a convex curved face.

In the peripheral portion 12C, similar to the example shown in FIG. 28B, the ends of the first adhesive member 41, the third light reflecting member 42, and the second adhesive member 43 are positioned closer to the second light source 20B than the $2^{nd}$ B lateral face 16B of the second light guide part 10B is. A portion of the fifth light reflecting member 48 is disposed between the wiring substrate 50 and a portion of the $2^{nd}$ B principal face 12B of the second light guide part 10B where is exposed from the first adhesive member 41, the third light reflecting member 42, and the second adhesive member 43.

Figure 30:
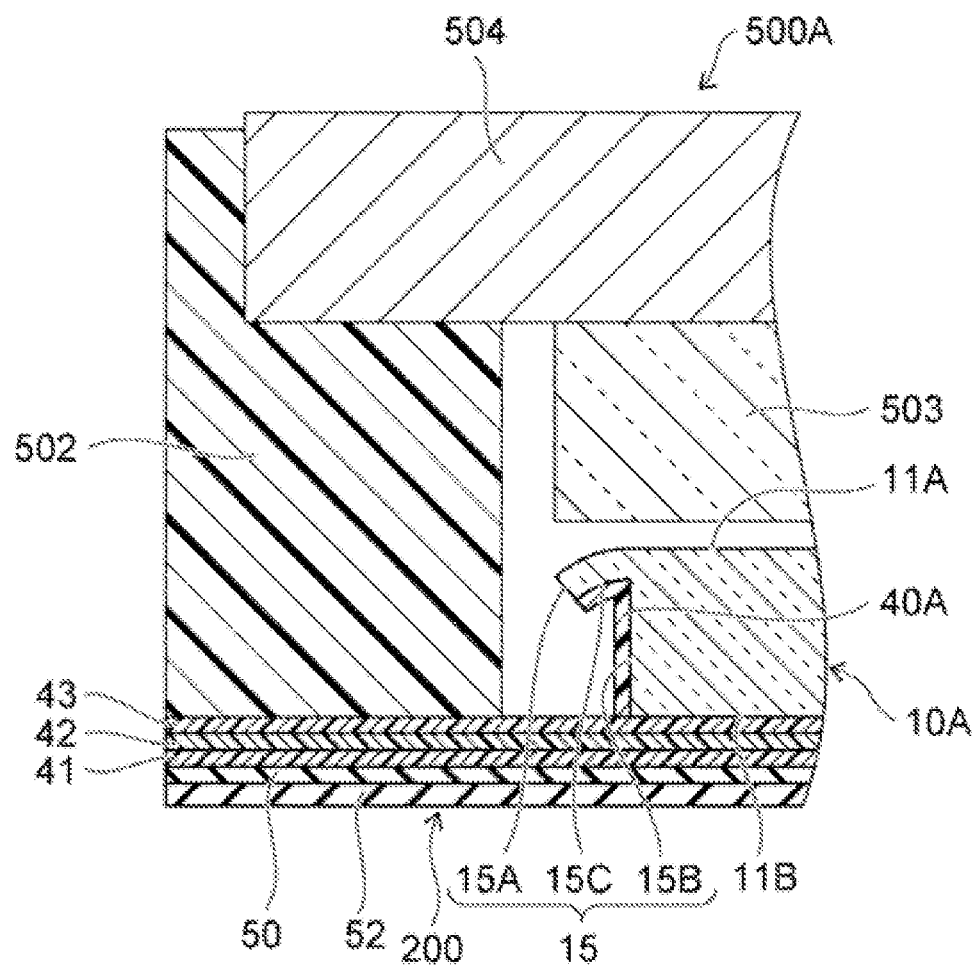
FIG. 30 is a schematic cross-sectional view of an example of a peripheral portion of a display device that includes a planar light source according to an embodiment of the present invention.

FIG. 30 is a schematic cross-sectional view of an example of a peripheral portion of a display device 500A that includes a planar light source according to an embodiment of the present invention. FIG. 30 shows a peripheral portion of a first light guide part 10A. The vicinity of the peripheral portion of a second light guide part 10B is constructed in a similar manner as the vicinity of the peripheral portion of the first light guide part 10A.

The display device 500A includes a planar light source according to any of the embodiments described earlier, an optical sheet 503, a liquid crystal panel 504, and a frame 502. The planar light source functions as the backlight for the display device 500A.

The support member 200 extends out from the peripheral portion of the first light guide part 10A (the peripheral portion of the second light guide part 10B), and the frame 502 is disposed on the second adhesive member 43, which is the uppermost layer of the support member 200 in the extended portion. The lower face of the frame 502 is adhered to the second adhesive member 43. The frame 502 is disposed outward from the peripheral portion of the first light guide part 10A (the peripheral portion of the second light guide part 10B). In other words, the first light guide part 10A (the second light guide part 10B) is positioned in the area surrounded by the frame 502. The frame 502 is formed of a white resin member having reflectivity, or a black resin member having light shielding (absorbing) properties, with respect to the light exiting the planar light source.

The optical sheet 503 is disposed above the first light guide part 10A (the second light guide part 10B) in the area surrounded by the frame 502. The optical sheet 503 faces the A principal faces 11A and 12A of the light guide parts 10A and 10B. The optical sheet 503, for example, includes a plurality of light diffuser sheets and a plurality of prism sheets.

A liquid crystal panel 504 is disposed on the optical sheet 503. The optical sheet 503 is disposed between the planar light source and the liquid crystal panel 504. The lower face of the liquid crystal panel 504 in the peripheral portion is in contact with the frame 502.

Figure 31:
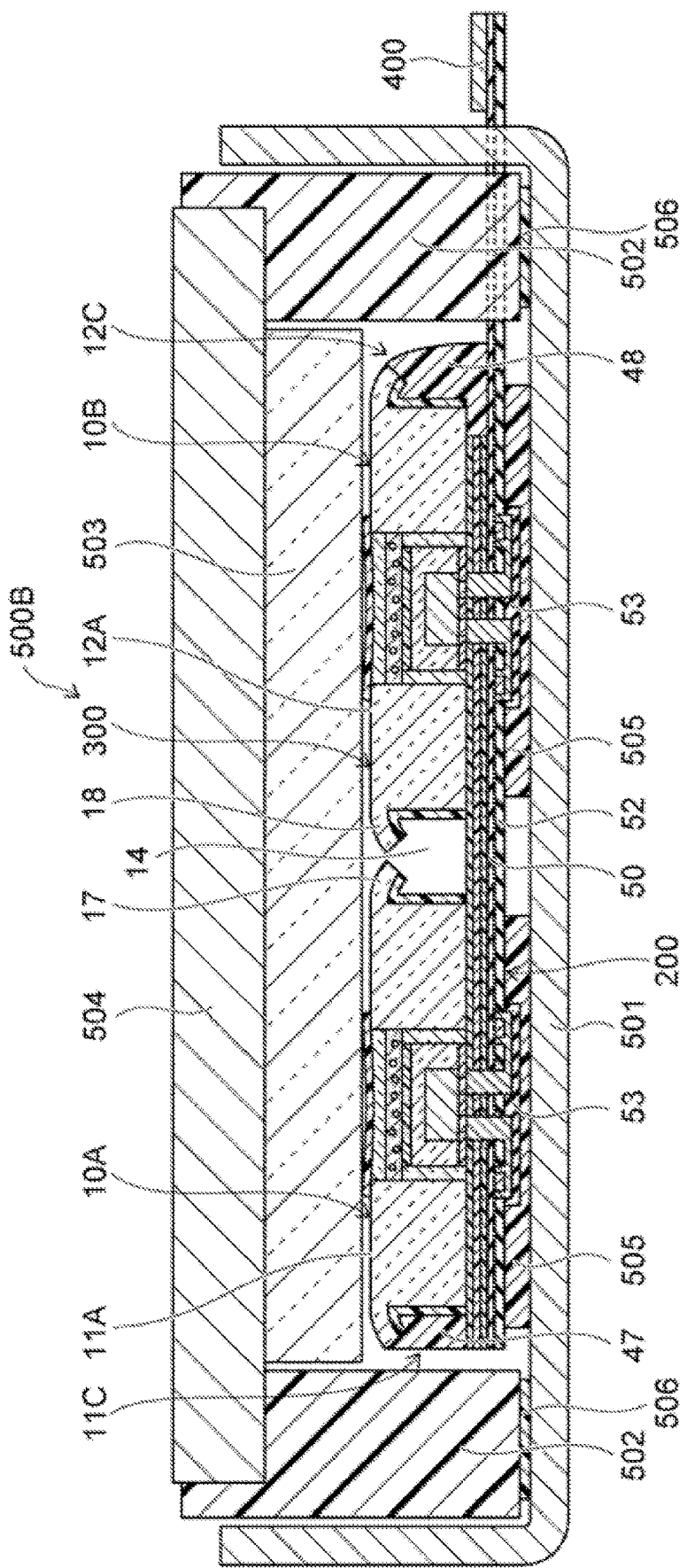
FIG. 31 is a schematic cross-sectional view of a display device that includes a planar light source according to an embodiment of the present invention.

FIG. 31 is a schematic cross-sectional view of a display device 500B that includes a planar light source according to an embodiment of the present invention.

The display device 500B includes a planar light source according to any of the embodiments described earlier, a housing 501, a frame 502, an optical sheet 503, and a liquid crystal panel 504. The planar light source functions as the backlight for the display device 500B.

The planar light source is disposed on the bottom face of the housing 501 via an adhesive member 505. The support member 200 of the planar light source is adhered to the upper face of the adhesive member 505, and the lower face of the adhesive member 505 is adhered to the bottom face of the housing 501. The housing 501, for example, is formed of a metal such as aluminum, stainless steel, or the like. Alternatively, the housing 501 is formed of a resin.

The frame 502 is disposed on the bottom face of the housing 501 via an adhesive member 506. The frame 502 is disposed outward of the peripheral portion 11C of the first light guide part 10A and the outer peripheral portion 12C of the second light guide part 10B. In other words, the first light guide part 10A and the second light guide part 10B are located in the area surrounded by the frame 502. The frame 502 is disposed between the lateral faces of the housing 501 and the outer peripheral portions 11C and 12C of the light guide parts 10A and 10B.

The optical sheet 503 is disposed on or above the light guide parts 10A and 10B inward of the frame 502. The optical sheet 503 faces the A principal faces 11A and 12A of the light guide parts 10A and 10B. The optical sheet 503, for example, includes a plurality of light diffuser sheets and a plurality of prism sheets.

The liquid crystal panel 504 is disposed on or above the optical sheet 503. The optical sheet 503 is disposed between the planar light source and the liquid crystal panel 504. The lower face of the liquid crystal panel 504 in the peripheral portion is in contact with the frame 502.

The peripheral portion 11C of the first light guide part 10A in the planar light source shown in FIG. 31, for example, has the structure shown in FIG. 28A. Alternatively, the peripheral portion 11C of the first light guide part 10A may have the structure shown in FIG. 28B.

The peripheral portion 12C of the second light guide part 10B, for example, has the structure shown in FIG. 29. Accordingly, the wiring substrate 50 extends out from the peripheral portion 12C. The wiring substrate 50 extends outward from the peripheral portion 12C through the opening formed in the frame 502 and the opening formed in the housing 501. A terminal part 400 is disposed on the portion of the wiring substrate 50 extended out from the housing 501.

Fifth Embodiment

Figure 32:
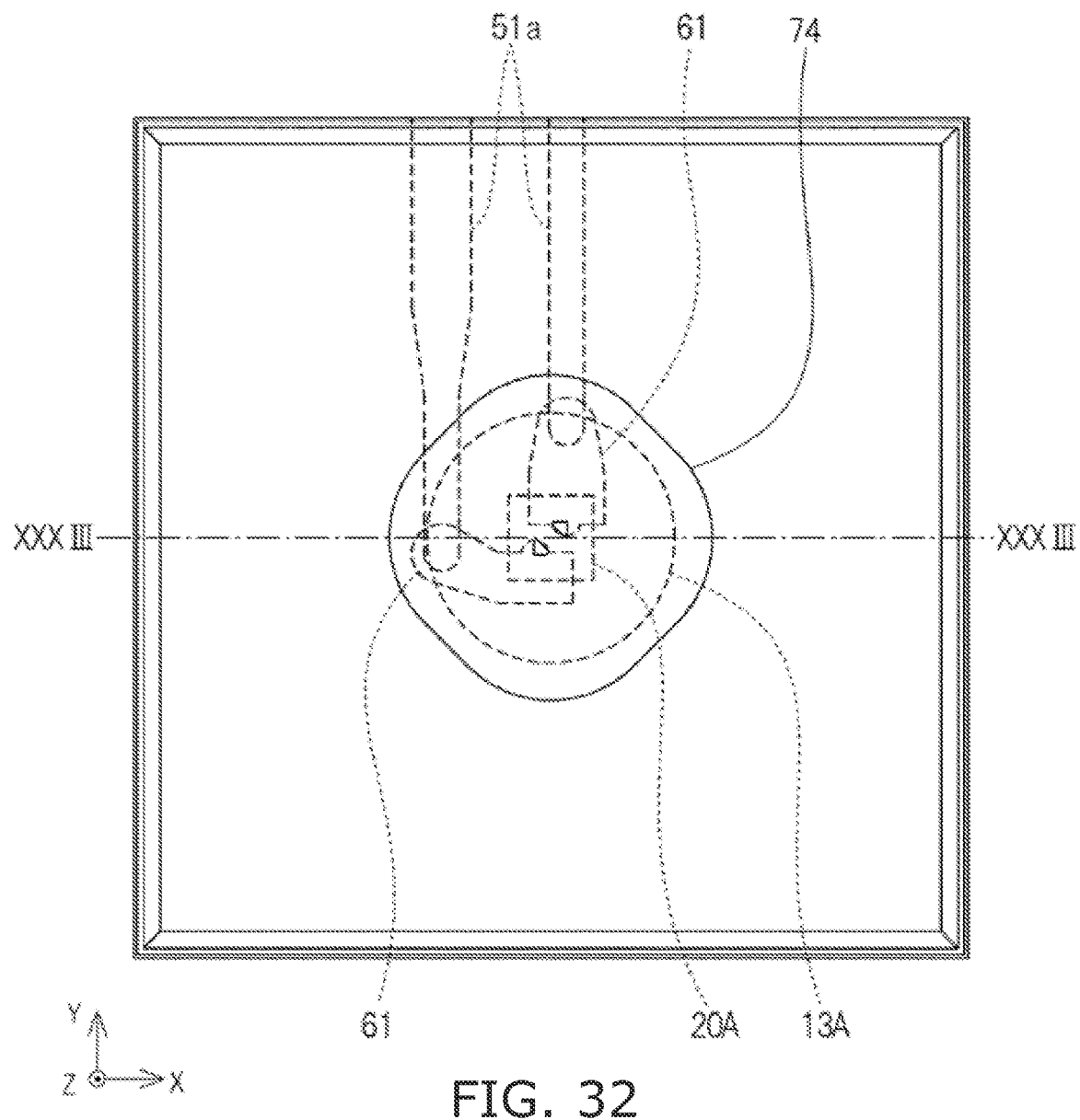
FIG. 32 is a schematic plan view of a planar light source according to a fifth embodiment.
Figure 33:
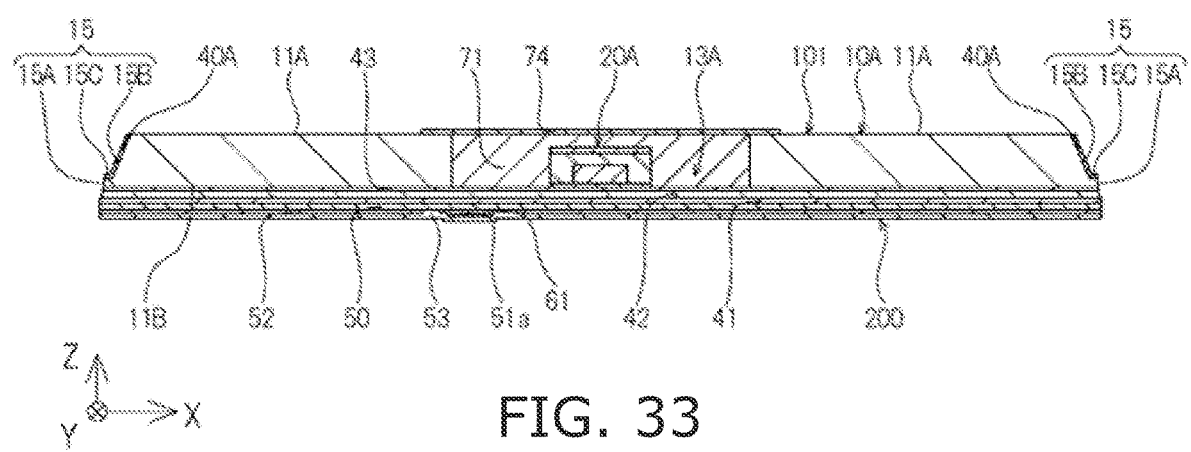
FIG. 33 is a schematic cross-sectional view taken along line XXXIII-XXXIII in FIG. 32.
Figure 34A:
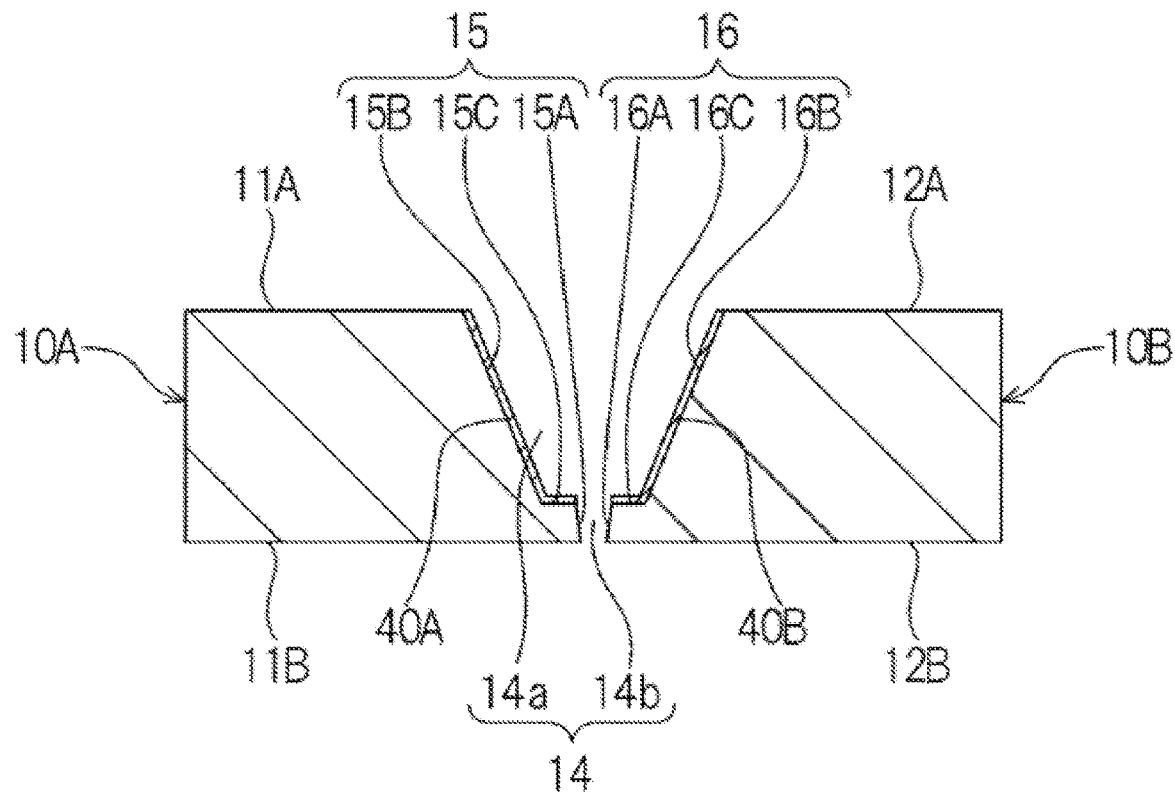
FIG. 34A is a schematic cross-sectional view of a sectioning groove in the planar light source according to the fifth embodiment of the present invention.

FIG. 32 is a schematic plan view of the portion of a planar light source according to a fifth embodiment of the present invention where a first light source 20A is disposed and the surrounding area. FIG. 33 is a schematic cross-sectional view of the portion of the planar light source of the fifth embodiment where the first light source 20A is disposed and the surrounding portion, taken along line XXXIII-XXXIII in FIG. 32. FIG. 34A is a schematic cross-sectional view showing a cross-sectional shape of a sectioning groove 14 in the planar light source according to the fifth embodiment.

As shown in FIG. 33, a single layer of a second light transmissive member 71 is disposed in the first hole 13A without disposing a wavelength conversion member or a third light transmissive member. The second light adjusting member 74 is disposed in contact with the second light transmissive member 71. The second light transmissive member 71 can contain a phosphor or a light diffusing agent as described above. The second light transmissive member 71 when containing a phosphor can function as a wavelength conversion member. The second light transmissive member 71 when containing a light diffusing agent can change a portion of the light from the first light source 20A advancing in the X direction and/or Y direction into the light that advances in the Z direction. This makes it easier to reduce the luminance nonuniformity in the light emission face.

As shown in FIG. 34A, the $1^{st}$ A lateral face 15A is continuous with the $1^{st}$ B principal face 11B, the $1^{st}$ B lateral face 15B is continuous with the $1^{st}$ A principal face 11A, the $2^{nd}$ A lateral face 16A is continuous with the $2^{nd}$ B principal face 12B, and the $2^{nd}$ B lateral face 16B is continuous with the $2^{nd}$ A principal face 12A. The second groove portion 14b defined by the $1^{st}$ A lateral face 15A and the $2^{nd}$ A lateral face 16A is located between the support member 200 and the first groove portion 14a. The first groove portion 14a is open on the $1^{st}$ A principal face 11A and the $2^{nd}$ A principal face 12A side. The $1^{st}$ B lateral face 15B and the $2^{nd}$ B lateral face 16B of the fifth embodiment are oblique to the principal faces 11A, 11B, 12A, and 12B. For example, the width of the first groove portion 14a gradually increases from the B principal faces 11B and 12B towards the A principal faces 11A and 12A. By suitably selecting the cross-sectional shape of the sectioning groove 14, the amount of light propagating between the light guide parts 10A and 10B can be adjusted.

Figure 34B:
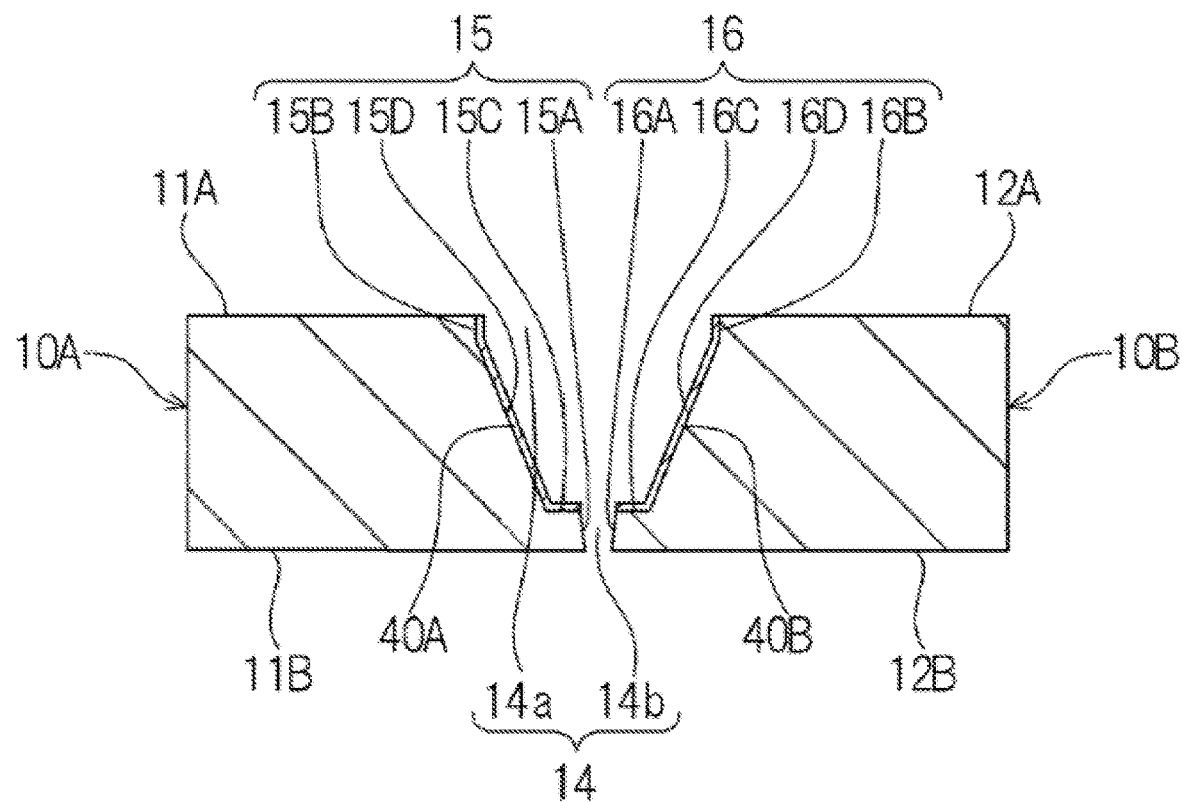
FIG. 34B is a schematic cross-sectional view of an example of the cross-sectional shape of a sectioning groove in a planar light source according to an embodiment of the present invention.

As shown in FIG. 34B, the first lateral face 15 has a $1^{st}$ A lateral face 15A, a $1^{st}$ B lateral face 15B, a $1^{st}$ C lateral face 15C, and a $1^{st}$ D lateral face 15D. Similarly, the second lateral face 16 has a $2^{nd}$ A lateral face 16A, a $2^{nd}$ B lateral face 16B, a $2^{nd}$ C lateral face 16C, and a $2^{nd}$ D lateral face 16D. The $1^{st}$ A lateral face 15A is continuous with the $1^{st}$ B principal face 11B, and the $1^{st}$ B lateral face 15B is continuous with the $1^{st}$ A principal face 11A. The $1^{st}$ C lateral face 15C and the $1^{st}$ D lateral face 15D are positioned between the $1^{st}$ A lateral face 15A and the $1^{st}$ B lateral face 15B. The $1^{st}$ C lateral face 15C is continuous with the $1^{st}$ A lateral face 15A, and the $1^{st}$ D lateral face 15D is continuous with the $1^{st}$ B lateral face 15B. The $2^{nd}$ A lateral face 16A is continuous with the $2^{nd}$ B principal face 12B, and the $2^{nd}$ B lateral face 16B is continuous with the $2^{nd}$ A principal face 12A. The $2^{nd}$ C lateral face 16C and the $2^{nd}$ D lateral face 16D are positioned between the $2^{nd}$ A lateral face 16A and the $2^{nd}$ B lateral face 16B. The $2^{nd}$ C lateral face 16C is continuous with the $2^{nd}$ A lateral face 16A, and the $2^{nd}$ D lateral face 16D is continuous with the $2^{nd}$ B lateral face 16B. The $1^{st}$ B lateral face 15B and the $2^{nd}$ B lateral face 16B are perpendicular to the principal faces 11A, 11B, 12A, and 12B of the light guide parts 10A and 10B. This can reduce the variation in the width of the first groove portion 14a defined by the $1^{st}$ B lateral face 15B and the $2^{nd}$ B lateral face 16B in the thickness direction of the first light guide part 10A. The reduced width variation of the first groove portion 14a can facilitate the reduction of the luminance nonuniformity per emission region. The $1^{st}$ D lateral face 15D and the $2^{nd}$ D lateral face 16D are oblique to the principal faces 11A, 11B, 12A, and 12B. For example, the width between the $1^{st}$ D lateral face 15D and the $2^{nd}$ D lateral face 16D gradually increases from the B principal faces 11B and 12B to the A principal faces 11A and 12A. By suitably selecting the cross-sectional shape of the sectioning groove 14, the amount of light propagating between the light guide parts 10A and 10B can be adjusted.

FIGS. 35A to 35E are schematic cross-sectional views showing an example of a method of manufacturing a planar light source according to the fifth embodiment.

Figure 35A:
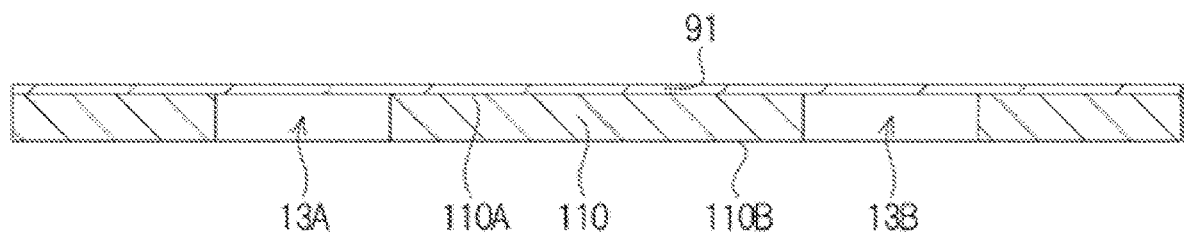
FIG. 35A is a schematic cross-sectional view showing a method of manufacturing a planar light source according to the fifth embodiment of the present invention.
Figure 35B:
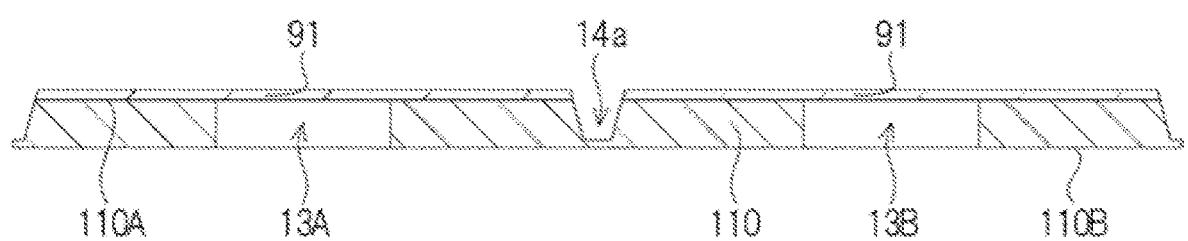
FIG. 35B is a schematic cross-sectional view showing the method of manufacturing the planar light source according to the fifth embodiment of the present invention.
Figure 35C:
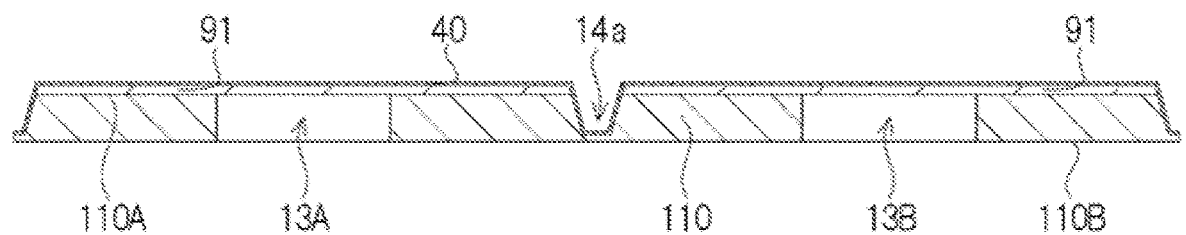
FIG. 35C is a schematic cross-sectional view showing the method of manufacturing the planar light source according to the fifth embodiment of the present invention.
Figure 35D:
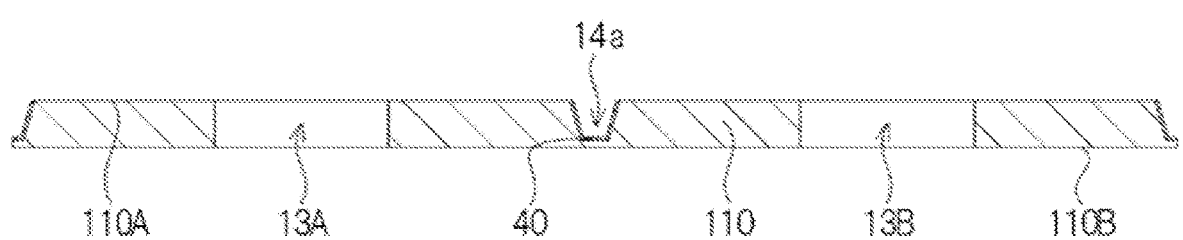
FIG. 35D is a schematic cross-sectional view showing the method of manufacturing the planar light source according to the fifth embodiment of the present invention.

After forming a first hole 13A and a second hole 13B in a light guide plate 110 as shown in FIG. 5, a first member 91 that covers the first principal face 110A of the light guide plate 110 is formed as shown in FIG. 35A. The first member 91 covers the opening of the first hole 13A on the first principal face 110A side, and the opening of the second hole 13B on the first principal face 110A side. In this state, as shown in FIG. 35B, a first groove portion 14a is formed in the light guide plate 110. When forming the first groove portion 14a in the light guide plate 110, a portion of the first member 91 is removed. This makes it easier to cover the portion of the first principal face 110A located around the first groove portion 14a with the first member 91 as shown in FIG. 35B. Subsequently, as shown in FIG. 35C, a light reflecting member 40 that covers the bottom face and the lateral faces of the first groove portion 14a is formed. The light reflecting member 40 is formed to cover at least a portion of the first member 91. Removing the first member 91 from the light guide plate 110 can make the area of the first principal face 110A around the first groove portion 14a free of the light reflecting member 40 as shown in FIG. 35D. This can facilitate the extraction of the light from the first light source 20A through the area of the first principal face 11 around the first groove portion 14a.

The material for the first member 91 is not particularly limited. A preferable material for the first member 91 is a removable sheet that includes an adhesive layer at least on one face that is functional such that the tackiness decreases when subjected to a temperature change or irradiation of light. For example, the adhesive layer preferably contains a foaming agent that foams when heated. By heating the adhesive layer, the first member 91 can be easily peeled off of the light guide plate 110. A commercially available product may be used for such a removable sheet. Examples of removable sheets include thermosensitive adhesive sheets manufactured by NITTA Corporation.

Figure 35E:
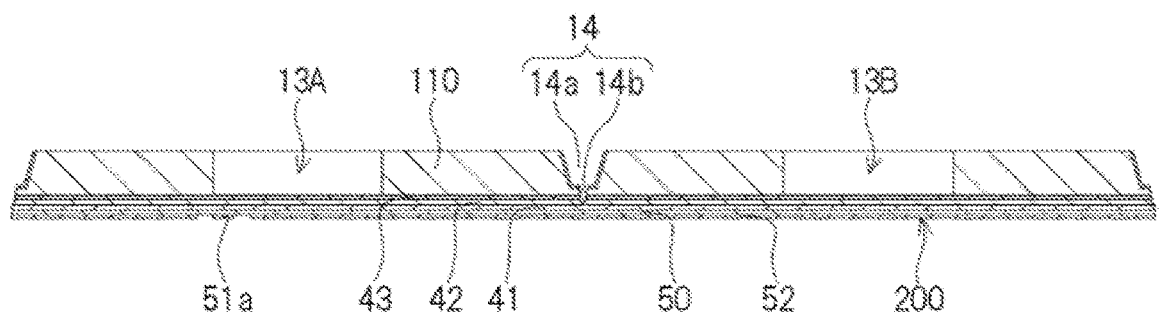
FIG. 35E is a schematic cross-sectional view showing the method of manufacturing the planar light source according to the fifth embodiment of the present invention.

After forming the light reflecting member 40 that covers the bottom face and the lateral faces of the first groove portion 14a, a light guide plate is disposed on a support member. After disposing the light guide plate 110 on the support member 200, as shown in FIG. 35E, a second groove portion 14b is formed by removing the portion of the light guide plate 110 connected under the first groove portion 14a. Known methods, such as grinding, laser processing, or the like can be used to remove the portion of the light guide plate 110 connected under the first groove portion 14a. When using a grinding method, an ultrasonic cutter, rotary blade, or the like can be used. This is followed by the process shown in FIG. 14 onward. The timing of the process for forming a second groove portion 14b is not limited to that described above. For example, the process for forming a second groove portion 14b may be performed subsequent to disposing light sources in the holes, or subsequent to forming a second light transmissive member in the holes.

Sixth Embodiment

Figure 36:
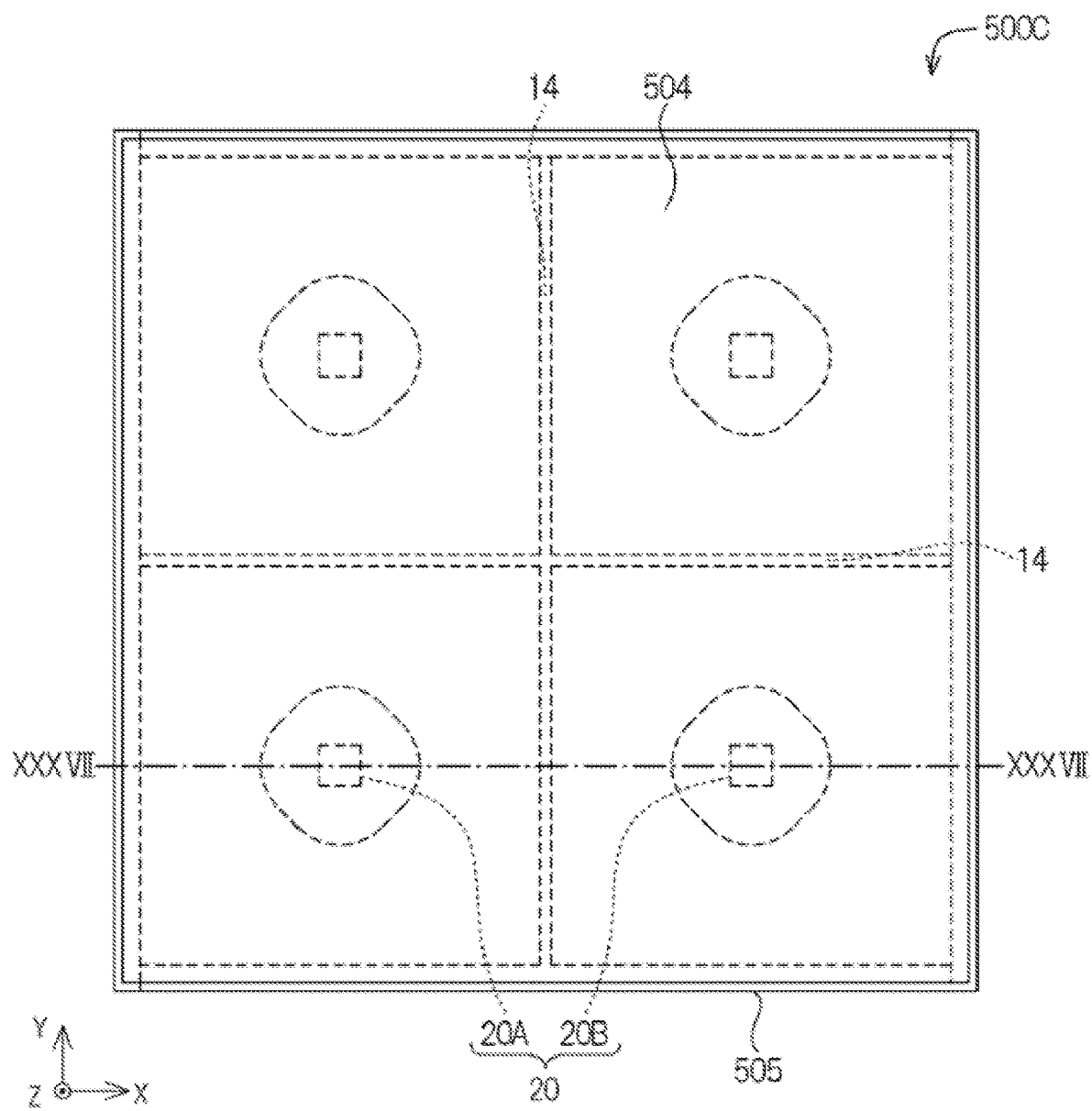
FIG. 36 is a schematic plan view of an example of a display device that includes a planar light source according to an embodiment of the present invention.
Figure 37:
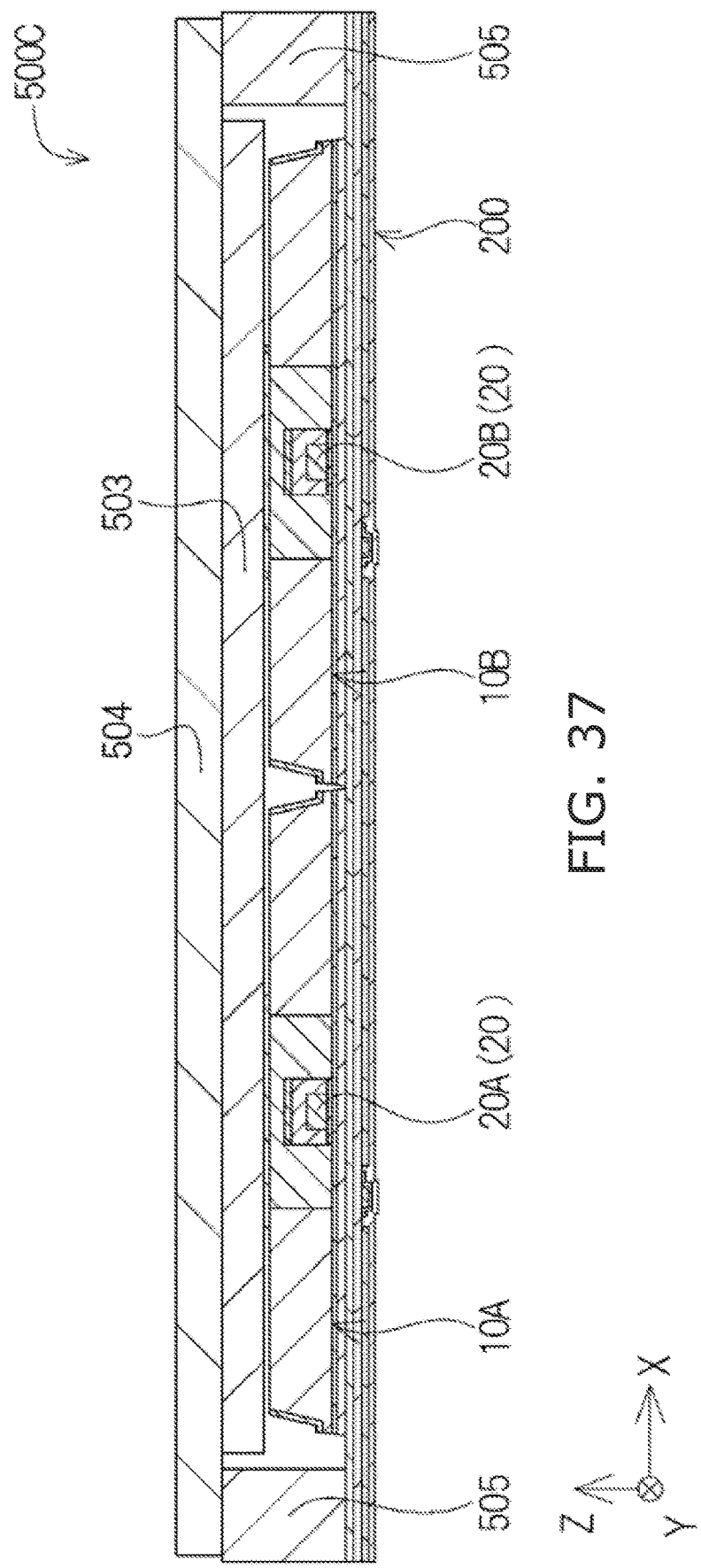
FIG. 37 is a schematic cross-sectional view taken along line XXXVII-XXXVII in FIG. 36.
Figure 38:
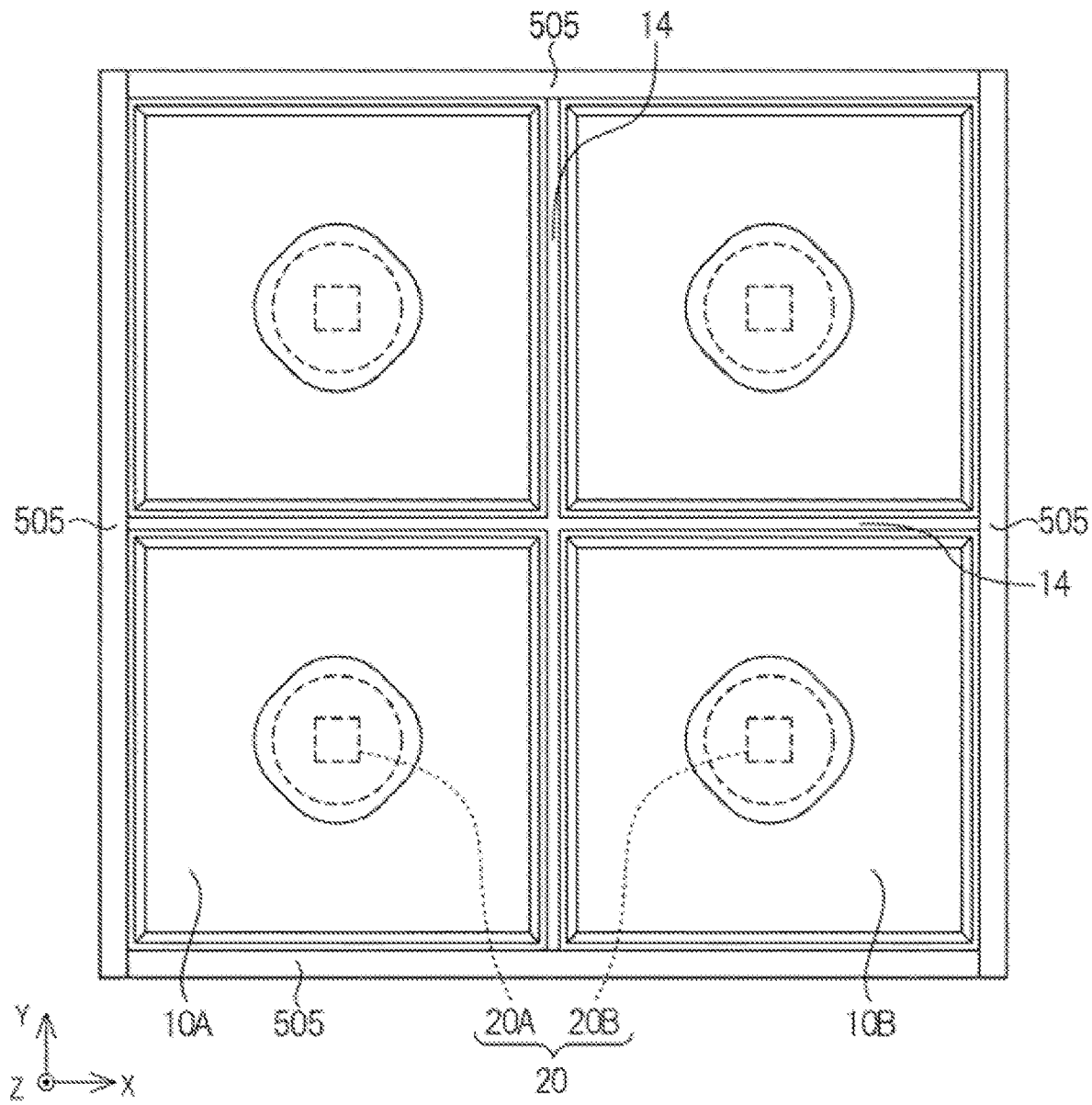
FIG. 38 is a schematic plan view of the display device in FIG. 36 in that the optical sheet and the liquid crystal panel are omitted.

FIG. 36 is a schematic plan view of a display device 500C that includes a planar light source according to an embodiment of the present invention. FIG. 37 is a schematic cross-sectional view taken along line XXXVII-XXXVII in FIG. 36. FIG. 38 is a schematic plan view of the display device 500C in FIG. 36 except that the optical sheet 503 and the liquid crystal panel 504 are omitted.

The display device 500C includes a planar light source according to one of the embodiments described earlier, an optical sheet 503, a liquid crystal panel 504, and retaining members 505. The planar light source functions as the backlight for the display device 500C.

As shown in FIG. 37, the support member 200 has an extended portion extending outward from the peripheral portion of the first light guide part 10A (the peripheral portion of the second light guide part 10B). In the display device 500C, the retaining members 505 are disposed on the extended portion of the support member 200. The retaining members 505 can be fixed to the support member 200 using an adhesive or the like. The retaining members 505 are disposed outward of the peripheral portion of the first light guide part 10A (the peripheral portion of the second light guide part 10B). The retaining members 505 may be provided as multiple members as shown in FIG. 36, or may be provided as a single member.

As shown in FIG. 38, portions of the retaining members 505 extending in the Y direction and portions of the sectioning groove 14 extending in the X direction overlap in the X direction. This can hinder the planar light source from bending along the X direction. A portion of the sectioning groove 14 extending in the X direction is preferably interposed along the X direction between the retaining members 505 extending in the Y direction. This can hinder the planar light source from bending along the X direction. Portions of the retaining members 505 extending in the X direction and portions of the sectioning groove 14 extending in the Y direction overlap in the Y direction. This can hinder the planner light source from bending along the Y direction. A portion of the sectioning grove 14 extending in the Y direction is preferably interposed in the Y direction between portions of the retaining members 505 extending in the X direction. This can hinder the planar light source from bending along the Y direction. As shown in FIG. 38, the retaining members 505 preferably enclose the light guide parts 10A and 10B in a plan view. This can hinder the deformation of the planar light source.

A material more resistant to deformation by external forces than the wiring substrate 50 of the planar light source is used for the retaining members 505. For the retaining members 505, for example, a thermoplastic resin, such as acrylic, polycarbonate, cyclic polyolefin, polyethylene terephthalate, or polyester, a thermosetting resin, such as epoxy or silicone, or glass can be used. The material for the retaining members 505 may be the same as that of the light guide parts 10A and 10B.

Seventh Embodiment

Figure 39:
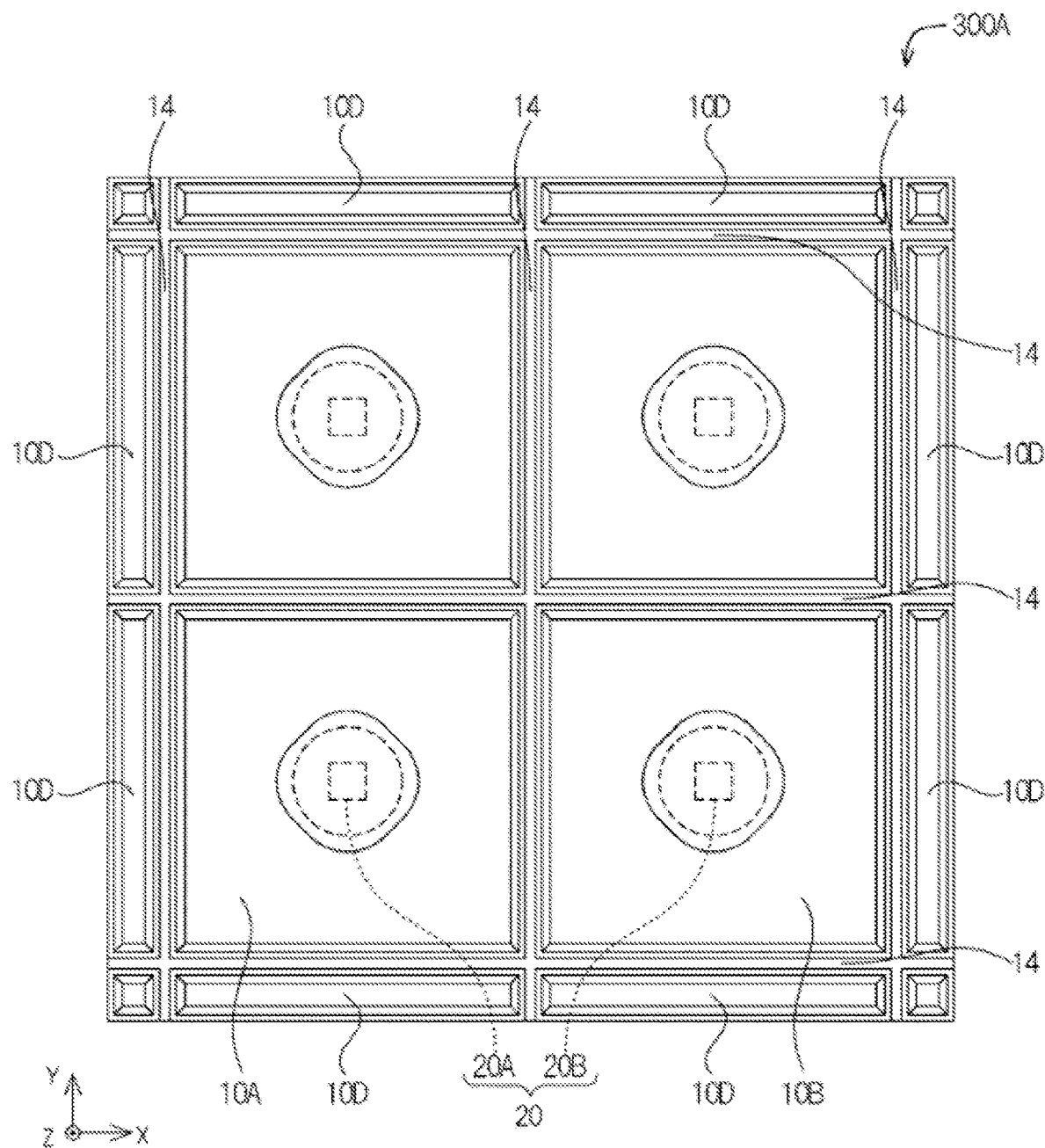
FIG. 39 is a schematic plan view of an example of a planar light source according to an embodiment of the present invention.
Figure 40:
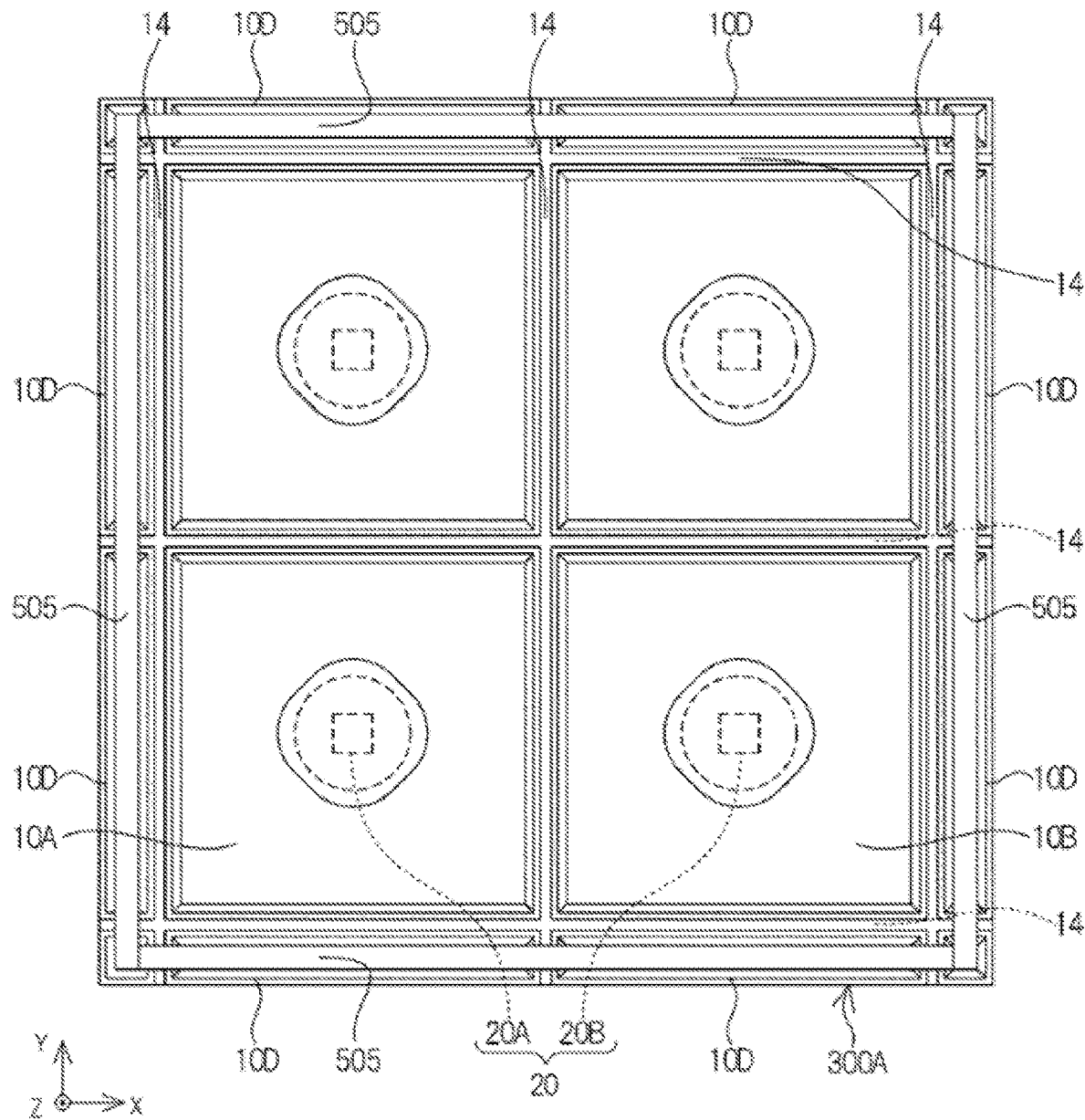
FIG. 40 is a schematic plan view of an example of a planar light source and a retaining member according to an embodiment of the present invention.
Figure 41:
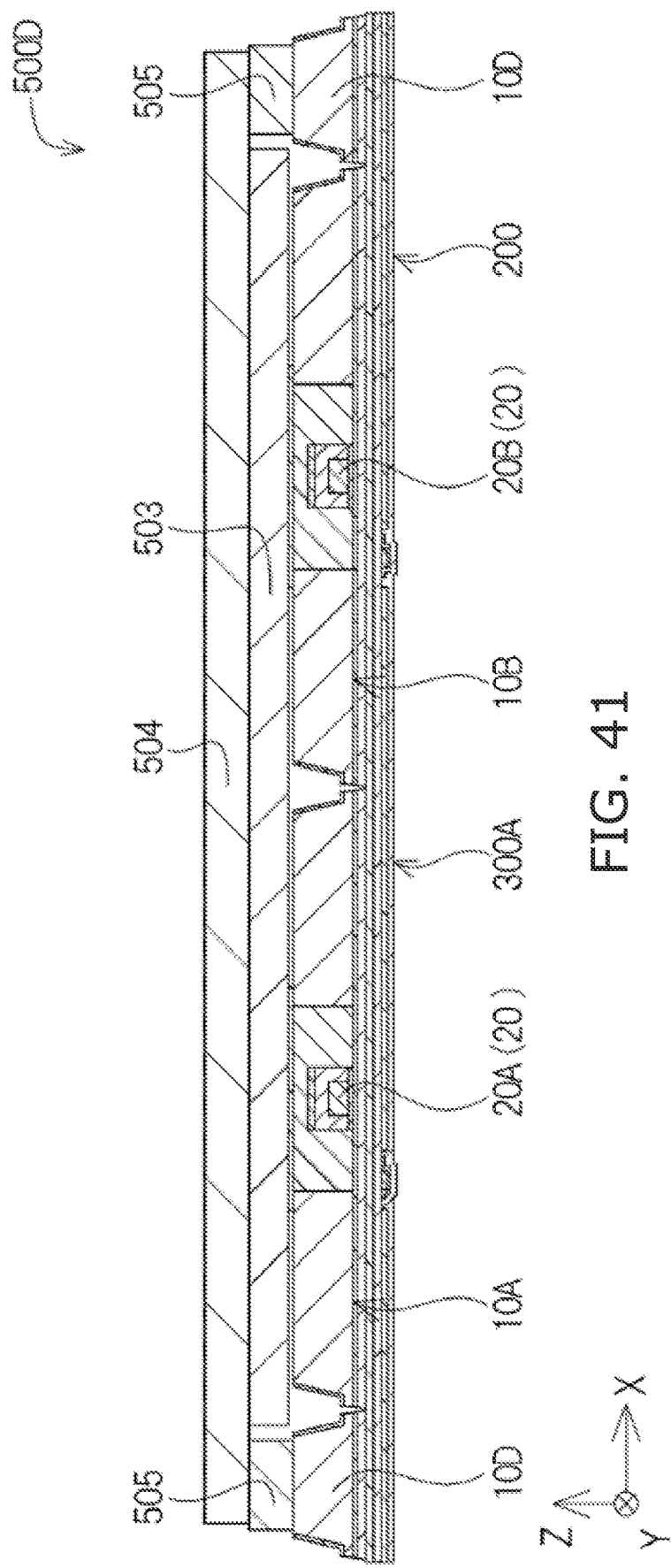
FIG. 41 is a schematic cross-sectional view of an example of a display device that includes a planar light source according to an embodiment of the present invention.
Figure 42:
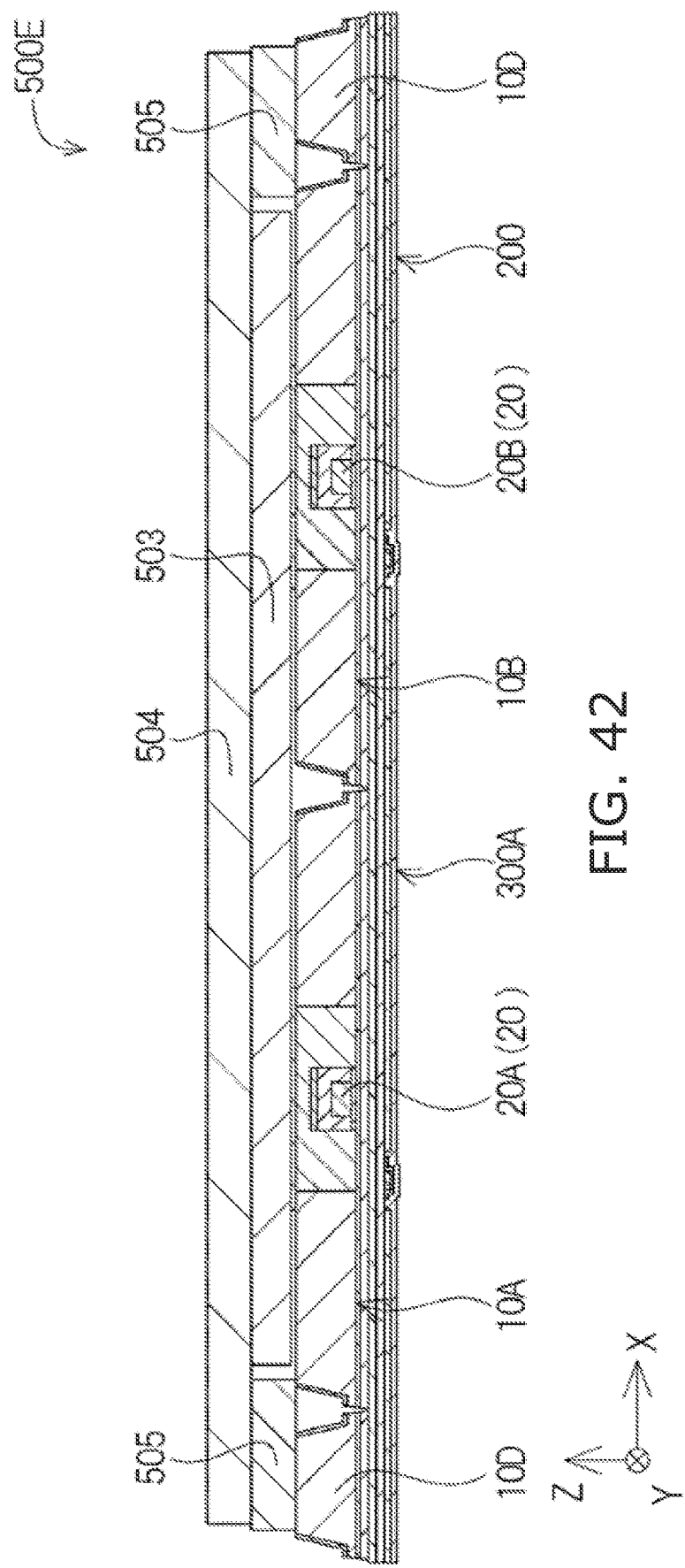
FIG. 42 is a schematic cross-sectional view of an example of a display device that includes a planar light source according to an embodiment of the present invention.

FIG. 39 is a schematic plan view of a planar light source 300A according to an embodiment of the present invention. FIG. 40 is a schematic plan view showing the planar light source 300A and the retaining members 505. FIG. 41 is a schematic cross-sectional view of a display device 500D that includes the planar light source 300A. FIG. 42 is a schematic cross-sectional view of a variation of the display device 500D.

The display device 500D includes a planar light source 300A, an optical sheet 503, a liquid crystal panel 504, and retaining members 505. The planar light source 300A functions as the backlight for the display device 500D.

As shown in FIG. 39, the planar light source 300A may include a plurality of peripheral light guide parts 10D positioned outward of the peripheral portions of the first light guide parts 10A (the peripheral portions of the second light guide parts 10B). The peripheral light guide parts 10D can be formed, for example, by using portions of the light guide plate 110 when the light guide plate 110 is compartmentalized by the sectioning groove 14. As shown in FIG. 39, the peripheral light guide parts 10D are separated by the sectioning groove 14.

In the case in which the planar light source 300A includes a plurality of peripheral light guide parts 10D extending on the outside of the peripheral portions of the first light guide parts 10A (the peripheral portions of the second light guide parts 10B), as shown in FIGS. 40 and 41, the retaining members 505 are disposed on the peripheral light guide parts 10D. The planar light source preferably has the retaining members 505 that straddle multiple peripheral light guide parts 10D as shown in FIG. 40. This can hinder the planar light source 300A from bending. Alternatively, as in the case of a display device 500E shown in FIG. 42, the retaining members 505 may be disposed on the first light guide parts 10A and the peripheral light guide parts 10D. This can hinder the planar light source 300A from bending. In the case in which the planar light source 300A includes no peripheral light guide parts 10D, the retaining members 505 may be disposed to straddle multiple light guide parts located in the peripheral area of the planar light source. This can hinder the planar light source from bending.

In the description, a $1^{st}$ A principal face might occasionally be referred to as a $1^{st}$ first principal face. A $1^{st}$ B principal face might occasionally be referred to as a $1^{st}$ second principal face. A $2^{nd}$ A principal face might occasionally be referred to as a $2^{nd}$ first principal face. A $2^{nd}$ B principal face might occasionally be referred to as a $2^{nd}$ second principal face. A $1^{st}$ A lateral face might occasionally be referred to as a $1^{st}$ first lateral face. A $1^{st}$ B lateral face might occasionally be referred to as a $1^{st}$ second lateral face. A $1^{st}$ C lateral face might occasionally be referred to as a $1^{st}$ third lateral face. A $1^{st}$ D lateral face might occasionally be referred to as a $1^{st}$ fourth lateral face. A $2^{nd}$ A lateral face might occasionally be referred to as a $2^{nd}$ first lateral face. A $2^{nd}$ B lateral face is occasionally referred to as a $2^{nd}$ second lateral face. A $2^{nd}$ C lateral face might occasionally be referred to as a $2^{nd}$ third lateral face. A $2^{nd}$ D lateral face might occasionally be referred to as a $2^{nd}$ fourth lateral face.

According to an embodiment of the present invention, a light emitting module includes a light source part that includes a first light source and a second light source; a light guide member that includes a first light guide part having a $1^{st}$ first principal face, a $1^{st}$ second principal face located opposite to the $1^{st}$ first principal face, first lateral faces positioned between the $1^{st}$ first principal face and the $1^{st}$ second principal face, and a first hole in which the first light source is positioned, and a second light guide part having a $2^{nd}$ first principal face, a $2^{nd}$ second principal face located opposite to the $2^{nd}$ first principal face, second lateral faces positioned between the $2^{nd}$ first principal face and the $2^{nd}$ second principal face, at one side of the second light guide part, the second lateral faces face the first lateral faces, and a second hole in which the second light source is disposed; and a light reflecting member disposed between the first lateral faces and the second lateral faces. The first lateral faces include a $1^{st}$ first lateral face and a $1^{st}$ second lateral face. The second lateral faces include a $2^{nd}$ first lateral face and a $2^{nd}$ second lateral face at one side of the second light guide part, the $2^{nd}$ first lateral face faces the $1^{st}$ first lateral face, and the $2^{nd}$ second lateral face faces the $1^{st}$ second lateral face. The light reflecting members are disposed on at least one of the $1^{st}$ second lateral faces or the $2^{nd}$ second lateral faces while exposing the $1^{st}$ first lateral faces and the $2^{nd}$ first lateral faces. The distance between the $1^{st}$ first lateral face and the $2^{nd}$ first lateral face is smaller than the distance between the $1^{st}$ second lateral face and the $2^{nd}$ second lateral face.

As shown in FIG. 34B, the first lateral face 15 has a $1^{st}$ first lateral face, a $1^{st}$ second lateral face, a $1^{st}$ third lateral face, and a $1^{st}$ fourth lateral face. Similarly, the second lateral face 16 has a $2^{nd}$ first lateral face, a $2^{nd}$ second lateral face, a $2^{nd}$ third lateral face, and a $2^{nd}$ fourth lateral face.

Certain embodiments of the present invention have been described in the foregoing with reference to specific examples. However, the present invention is not limited to the specific examples. All forms implementable by a person skilled in the art by suitably making design changes based on any of the embodiments disclosed above also fall within the scope of the present invention so long as they encompass the subject matter of the present invention. Furthermore, various modifications and alterations within the spirit of the present invention that could have been made by a person skilled in the art should be considered as falling within the scope of the present invention.

What is claimed is:

1. A light emitting module comprising:
a light source part comprising a first light source and a second light source;
a light guide member comprising:
  a first light guide part having a $1^{st}$ A principal face, a $1^{st}$ B principal face located opposite to the $1^{st}$ A principal face, a first lateral face positioned between the $1^{st}$ A principal face and the $1^{st}$ B principal face, and a first hole in which the first light source is disposed; and
  a second light guide part having a $2^{nd}$ A principal face, a $2^{nd}$ B principal face located opposite to the $2^{nd}$ A principal face, a second lateral face positioned between the $2^{nd}$ A principal face and the $2^{nd}$ B principal face, the second lateral face facing the first lateral face, and a second hole in which the second light source is disposed; and
a light reflecting member disposed between the first lateral face and the second lateral face, wherein:
the first lateral face includes a $1^{st}$ A lateral face and a $1^{st}$ B lateral face,
the second lateral face includes a $2^{nd}$ A lateral face facing the $1^{st}$ A lateral face, and a $2^{nd}$ B lateral face facing the $1^{st}$ B lateral face,
the light reflecting member includes a first light reflecting member disposed on the $1^{st}$ B lateral face and a second light reflecting member disposed on the $2^{nd}$ B lateral face,
an air layer is located between the first light reflecting member and the second light reflecting member,
the $1^{st}$ A lateral face and the $2^{nd}$ A lateral face are exposed from the light reflecting member, and
a distance between the $1^{st}$ A lateral face and the $2^{nd}$ A lateral face is smaller than a distance between the $1^{st}$ B lateral face and the $2^{nd}$ B lateral face.

2. The light emitting module according to claim 1, wherein:
the first light source is positioned on a $1^{st}$ B principal face side,
the $1^{st}$ A lateral face is continuous with the $1^{st}$ A principal face,
the $1^{st}$ B lateral face is continuous with the $1^{st}$ B principal face,
the second light source is positioned on a $2^{nd}$ B principal face side,
the $2^{nd}$ A lateral face is continuous with the second A principal face, and
the $2^{nd}$ B lateral face is continuous with the $2^{nd}$ B principal face.

3. The light emitting module according to claim 2, wherein:
the first light reflecting member extends to the $1^{st}$ B principal face, and
the second light reflecting member extends to the $2^{nd}$ B principal face.

4. The light emitting module according to claim 3, wherein:
the first light reflecting member disposed on the $1^{st}$ B principal face has a first opening around the first light source where the first light reflecting member is absent, and
the second light reflecting member disposed on the $2^{nd}$ B principal face has a second opening around the second light source where the second light reflecting member is absent.

5. The light emitting module according to claim 1, wherein the $1^{st}$ A lateral face and the $2^{nd}$ A lateral face are in contact with air.

6. The light emitting module according to claim 1, wherein:
the first lateral face includes a $1^{st}$ C lateral face positioned between the $1^{st}$ A lateral face and the $1^{st}$ B lateral face, and
the first light reflecting member is disposed on the $1^{st}$ B lateral face and the $1^{st}$ C lateral face.

7. The light emitting module according to claim 1, wherein:
the second lateral face includes a $2^{nd}$ C lateral face positioned between the $2^{nd}$ A lateral face and the $2^{nd}$ B lateral face, and
the second light reflecting member is disposed on the $2^{nd}$ B lateral face and the $2^{nd}$ C lateral face.

8. The light emitting module according to claim 1, wherein:
a length of the $1^{st}$ B lateral face in a thickness direction of the first light guide part is larger than a length of the $1^{st}$ A lateral face in the thickness direction of the first light guide part, and
a length of the $2^{nd}$ B lateral face in a thickness direction of the second light guide part is larger than a length of the $2^{nd}$ A lateral face in the thickness direction of the second light guide part.

9. The light emitting module according to claim 1, wherein the light reflecting member is a resin member containing a light diffusing agent.

10. A planar light source comprising:
a wiring substrate, and
the light emitting module according to claim 1 disposed on the wiring substrate such that the $1^{st}$ B principal face and the $2^{nd}$ B principal face the wiring substrate.

* * * * *